(12) United States Patent
Petropoulakis et al.

(10) Patent No.: US 7,761,506 B2
(45) Date of Patent: Jul. 20, 2010

(54) GENERIC OBJECT-BASED RESOURCE-SHARING INTERFACE FOR DISTANCE CO-OPERATION

(75) Inventors: Lykourgos Petropoulakis, Midlothian (GB); Bruce Stephen, Glasgow (GB)

(73) Assignee: University of Strathclyde, Glasgow (GB)

( * ) Notice: Subject to any disclaimer, the term of this patent is extended or adjusted under 35 U.S.C. 154(b) by 708 days.

(21) Appl. No.: 10/483,703

(22) PCT Filed: Jul. 8, 2002

(86) PCT No.: PCT/GB02/03120

§ 371 (c)(1),
(2), (4) Date: Jul. 20, 2004

(87) PCT Pub. No.: WO03/007151

PCT Pub. Date: Jan. 23, 2003

(65) Prior Publication Data

US 2004/0249885 A1    Dec. 9, 2004

(30) Foreign Application Priority Data

Jul. 13, 2001    (GB)    ................................. 0117077.8

(51) Int. Cl.
G06F 15/16    (2006.01)
(52) U.S. Cl. ........................................ 709/204; 709/205
(58) Field of Classification Search ................. 709/204, 709/205

See application file for complete search history.

(56) References Cited

U.S. PATENT DOCUMENTS 5,422,912 A * 6/1995 Asser et al. ................. 375/350
5,572,643 A * 11/1996 Judson ........................ 709/218
5,758,110 A * 5/1998 Boss et al. ................... 715/751
5,844,553 A * 12/1998 Hao et al. .................... 715/733
5,964,836 A    10/1999 Rowe et al.

(Continued)

OTHER PUBLICATIONS

Khalil Drira, Thierry Villemur, Véronique Baudin, and Michel Diaz; *A Multi-Paradigm Layered Architecture for Synchronous Distance Learning*; IEEE; 2000, pp. 158-165.

(Continued)

*Primary Examiner*—Nathan Flynn
*Assistant Examiner*—Jeong S Park
(74) *Attorney, Agent, or Firm*—Alston & Bird LLP

(57) ABSTRACT

A computer program interface for permitting multiple users to share a single copy of a computer program is described. The program interface is written in Java 1.2 or a later version and C++ and permits users who have browser programs enabled in Java to interact with the user interface. The system can be used in a variety of modes which includes a shared mode to allow multiple users to use the system, although other modes include use by a single user. In the shared mode two or more users share the same copy of software interactively over the Internet or an Intranet connection. In one embodiment during the sharing activity only one user, designated the active user, interacts directly with the computer program and the other users, designated passive user, observe what the active user does and what results are produced in response to the active user's activities. The user interface allows intercommunication between users and allows passive users to assume the role of an active user and vice versa but there is only one active use at any time. In another embodiment more than one active user can share a program which permits real-time interaction for example in game playing or co-design. Various aspects of the invention including graphical and command-time user new interface programs are described.

22 Claims, 72 Drawing Sheets

U.S. PATENT DOCUMENTS

| | | | |
|---|---|---|---|
| 6,074,432 A * | 6/2000 | Guccione | 717/108 |
| 6,343,313 B1 * | 1/2002 | Salesky et al. | 709/204 |
| 6,761,636 B2 * | 7/2004 | Chung et al. | 463/42 |
| 2002/0165922 A1 * | 11/2002 | Wei | 709/205 |

OTHER PUBLICATIONS

K. Maly, H. Abdel-Wahab, C. Wild, C.M. Overstreet, A. Gupta, A. Abdel-Hamid, S. Ghanem, A. Gonzalez and X. Zhu; *IRI-h, A Java-Based Distance Education System: Architecture and Performance*; ACM Joural of Educational Resources in Computing; Spring 2001; Article #16, pp. 1-15; vol. 1, No. 1 (XP-002253034).

International Search Report for PCT/GB02/03120, completed Sep. 2, 2002.

Merlin Hughes, Michael Shoffner, Derek Hammer and Umesh Bellur; *Chapter 2—The Java Security Model and Chapter 18—Client/Server Internet Applications*; Complete Guide to Networking, Streams and Distributed Computing—Java Network Programming—Java 2; 1999; pp. 17-25 and 361-373; Manning Publication Co. Greenwich, CT.

\* cited by examiner

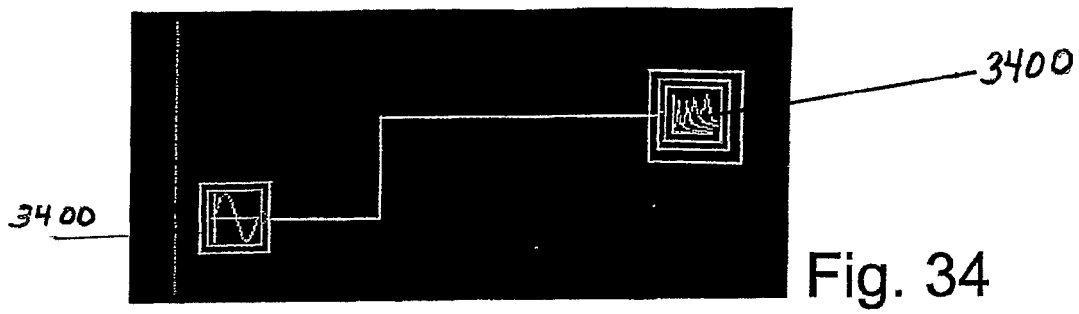

Fig. 34

```
-<Workspace>
 -<Module variable="jscopeOCT0494">
    <Position y="32" x="354" />
    <Reverse>false</Reverse>
    <Data>scope</Data>
    <Function arguments="1">jscope</Function>
  </Module>
 -<Module variable="webchirpOCT1310">
    <Position y="154" x="150" />
    <Reverse>false</Reverse>
    <Data>chirp</Data>
   -<Function arguments="0">
      webchirp
      <Argument index="3">0</Argument>
      <Argument index="2">'linear'</Argument>
      <Argument index="1">50</Argument>
      <Argument index="0">5</Argument>
    </Function>
  </Module>
 -<Connector>
  -<Source>
     <Module>webchirpOCT1310</Module>
     <Location y="174" x="190" />
     <Port>0</Port>
    </Source>
  -<Destination>
     <Module>jscopeOCT0494</Module>
     <Location y="52" x="354" />
     <Port>0</Port>
    </Destination>
  </Connector>
</Workspace>
```

Fig. 35

```
# # This code is automatically generated
# # by J-Sim. Do not modify.
# # Lykourgos Petropopulakis, Bruce Stephen
# Copyright © University of Strathclyde 1999, 2000, 2001 webchirpOCT1310=webchirp(5, 50, 'linear', 0);
jscopeOCT0494=jscope(webchirpOCT1310)
```

Fig. 36

```
- <DialogRoot width="180" height="300" title="Signal_Generator">
 -<JComponent class="javax.swing.JPanel" name="JPanel01">
 [+]<Method name="setBounds">
  + <Method name="setLayout">
  + <Method name="add">
  + <Method name="add">
  + <Method name="add">
  + <Method name="add">
  - <Method name="add">
    -<JComponent class="javax.swing.JLabel" name="JLabel03">
     + <Method name="setBounds">
     - <Method name="setText">
        <Variable class="java.lang.String"
          name="Path">"Frequency"</Variable>
      </Method>
    </JComponent>
  </Method>
  + <Method name="add">
  + <Method name="add">
  + <Method name="add">
 </JComponent>
 <OctaveFunctionArgument source="JTextField01" action="getText" reaction="setText"
   index="2" />
 <OctaveFunctionArgument source="JTextField02" action="getText" reaction="setText"
   index="1" />
 <OctaveFunctionArgument source="JTextField03" action="getText" reaction="setText"
   index="0" />
 <OctaveFunctionArgument source="JComboBox01" action="getSelectedItem"
   reaction="setSelectedItem" index="3" />
</DialogRoot>
```

Fig. 46

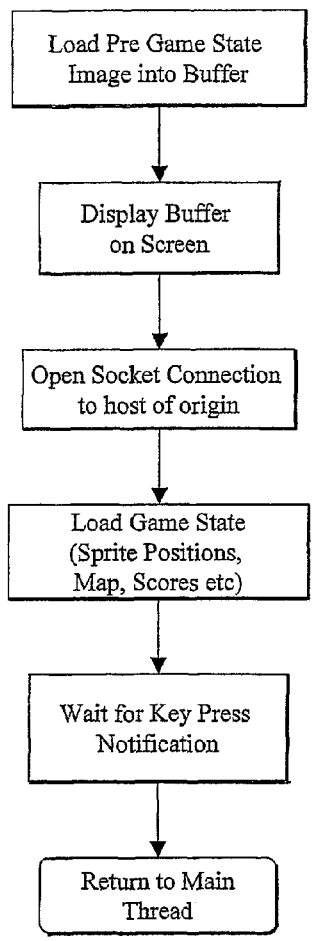
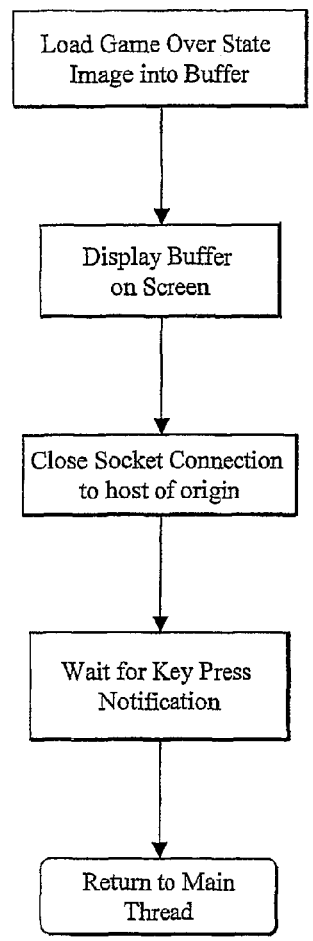
Fig. 60                    Fig. 61

GENERIC OBJECT-BASED RESOURCE-SHARING INTERFACE FOR DISTANCE CO-OPERATION

BACKGROUND OF THE INVENTION

1) Field of the Invention

The present invention relates to a system and a method for permitting software to be shared over a network, for example the Internet or an Intranet. The invention also relates to a computer program interface which allows multiple users to share copies of the same software in real-time. The system and interface are particularly, but not exclusively, suitable for use in education, especially in distance learning, in sharing real-time applications such as game playing and co-designing.

2) Description of Related Art

In many applications, for example in distance learning, it is desirable to have a system where software packages can be used and shared over the Internet for distance learning purposes. This is especially true for computer-aided design packages, such as Matlab (trademark), AutoCAD (trademark) and Octave (trademark). Many of these software packages are available for use for Unix, Linux, NT and Windows-based systems. Although some software packages permit distance learning, the existing packages, such as Matlab, can only be used over the Internet in a single-user mode, that is only a single user can use a single copy of the software at any one time.

It is desirable to allow multiple users to have access to a single copy of a software program at the same time; this would be particularly useful for teaching purposes and other co-operation purposes, such as game playing and working on a common design, whether over the Internet or an Intranet. It is also desirable that any such software which is useable over the Internet or Intranet does not require any additional software but only the use of simple browsers, such as Netscape navigator and Internet Explorer, and furthermore, it is also desirable that the access of multiple users is not impeded by any problems arising from bandwidth considerations and sending graphics files across Internet connections. It is also desirable to be able to provide a graphic-user interface (GUI) environment which is compatible with existing simulation/CAD packages, such as Octave and Matlab, and which can be used as a GUI for such systems to enable a similar Internet/Intranet user interactive functionality.

It is also desirable to allow an arbitrarily large number of multiple users to share the same program in real-time through multicasting and to take turns in controlling the software, especially simultaneously, as in game playing but hitherto this has not been possible in a generic and unified manner across non-homogeneous operating systems and for low capacity networks. The data transfer required is too high for existing network capacity and any sharing is slow and normally requires common operating platforms. It is generally not possible for users to share a design or a game if different software runs on different machines for example Computer Aided Design (CAD) software.

BRIEF SUMMARY OF THE INVENTION

An object of the present invention is to obviate or mitigate at least one of the disadvantages of existing interfaces.

A further object of the present invention is to provide a generic object-based resource sharing interface for distance co-working.

This is achieved in the broadest sense by providing a computer program interface written in Java and C++ which allows a plurality of users to access the same computer program over the Internet or Intranet using a simple browser in a variety of different platform systems. Preferably the interface is written in Java 1.2 or a later version and C++, and the browser is also in Java 1.2 or a later version enabled. Alternatively, the code means may be written in an earlier Java version. Also the browser can be an earlier Java enabled version. The system can be used in a variety of modes which includes a shared mode to allow multiple users to use the system, although other modes include use by a single user. In such a situation, when multiple users use the system, one user is designated the 'active user' and the other users 'passive users'. Active and passive users can exchange positions but there is only one active user at a time.

In the shared mode two or more users share the same copy of software interactively over the Internet or an Intranet connection but during the sharing activity only one user (the active user) interacts directly with the computer program and the other passive users observe what the active user does and what results are produced in response to the active user's activities.

The user interface allows intercommunication between users and allows passive users to assume the role of an active user and vice versa. A passive user obtains control (becomes an active use) only when an active user relinquishes control. Switching between active users and passive users happens without loss of data or interruption in the functionality of the software and is completely transparent to the users. This is particularly useful in a tutor/student arrangement where a student may be in need of assistance, in which case the tutor requires to take over and explain how a design may be effected.

In one aspect of the present invention a single user may be linked to the system but the user can be joined by other users at any time.

In another aspect of the present invention, there is provided a software sharing system comprising:

a server having at least one computer program to be shared by at least two user machines;

at least one computer coupled to said server for receiving said computer program for use by said user machines;

said system including computer readable code means for identifying which of said user machines is an active user and for permitting said active user to interact with said shared computer program;

said computer readable code means being written in Java for identifying all of said other user machines as passive users, all of said user machines having a browser program which is Java enabled stored therein;

said passive users being able to view operations by said active user interacting with said computer programs, and said computer readable code means having user selection code means receptive to a signal for an active user to change to a passive user state and for a passive user to change status to an active user state, only one user being permitted to have an active user state at any one time.

Preferably the computer readable code means is written in Java 1.2 or later versions and C++. Conveniently the browser program is Java 1.2 or later version enabled.

Alternatively, the code means may be written in an earlier Java version. Also the browser can be an earlier Java enabled version where suitable plug-ins exist.

According to a further aspect of the present invention, there is provided a computer program product comprising:

a computer useable medium having computer readable code means embodied in said medium for sharing at least one computer program stored in a first location with at least one user machine located at a second location, whereby the shared program is useable at said first and second locations;

said computer program product having computer readable code means written in Java for:

identifying all users who log-on and wish to share the program;

allocating only one user as a controlling or active user and permitting only said controlling or active user to interact with said shared program;

interacting with a browser program stored on each user machine, each browser program being Java;

identifying all other logged-on users as passive users who may view operations by said active user interacting with said share program, and responding to a signal from an active user to relinquish control of said shared program and to a signal from a first passive user to move to an active user state and interact with said shared computer program.

Preferably, the computer readable code means are enabled in Java 1.2 or a later version and C++.

Preferably also the browser program is Java 1.2 or a later version enabled.

Alternatively, the code means may be written in an earlier Java version. Also the browser can be an earlier Java enabled version.

Preferably, the computer program product is stored on a server. Preferably also, the computer program product is on an encoded disk, for example a CD, DVD or other optically encoded disk. Alternatively, the computer program product may be on a hard disk and the computer readable code means may be downloaded by users remotely.

The shared software can be of any type and it can provide output which may be of textual or graphic type. This is possible because the computer program is of generic nature and therefore capable of handling any type of output equally well.

Conveniently, the computer program product readable code means permits a plurality of users to share the same application program so that the interaction of one user is broadcast to all other logged-on users at the same time.

Advantageously, the computer program product has application in distance co-working, particularly education.

According to a further aspect of the present invention, there is provided a workstation for sharing a computer program with a plurality of user machines coupled to said workstation, said workstation having said shared program stored therein, computer readable code means stored in said workstation for receiving requests from user machines which wish to share said program, each user machine having a browser program enabled in Java therein for communicating with said workstation, said code means being written in Java for identifying each user and allocating a status to each user, said status being of a first type where only one user, denoted as an active user, is permitted to interact with said shared program, or of a second type where the other users, denoted as passive users, are not permitted to interact with the shared program but can monitor the interaction of the active user with the shared program, said code means being responsive to a first signal from an active user to relinquish interaction and to a second signal from the first passive user to change to active user status.

Conveniently, the workstation and servers are coupled by TCP/IP connections.

Conveniently, the computer code means is written in Java 1.2 or later version and C++.

Conveniently also the browser program is Java 1.2 or later version enabled.

Alternatively, the code means may be written in an earlier Java version. Also the browser can be an earlier Java enabled version.

According to a further aspect of the present invention, there is provided a computer program interface for allowing a plurality of user machines to access the same computer program on a server over a network using a browser in a variety of different platforms, said computer program interface having computer readable code means enabled in Java for:

permitting remote operational control of said server by any one of said plurality of user machines, each of which has a browser enabled in Java, only one user machine being able to assume control at one time, and said machine in control being designated the active user.

permitting user machines to assume and relinquish control of the computer program using browser programs stored in their computers, and broadcasting the result of the interaction between said active user and the computer program to all user machines in substantially real-time.

Conveniently, the computer readable code means is written in Java 1.2 or a later version and C++.

Conveniently, also the browser program is Java 1.2 or later version enabled.

Alternatively, the code means may be written in an earlier Java version. Also the browser can be an earlier Java enabled version.

In another aspect of the invention there is provided a program and system for sharing software between at least two user machines, one user machine being designated an active user machine and the other user machine being designated an active user machine or a passive user machine, whereby when the other user machine is an active user machine both user machines appear to be using the software at substantially the same time.

According to this aspect of the present invention there is provided a software sharing system comprising:

a server having at least one computer program to be shared by at least two user machines;

said system including computer readable code means for identifying at least one of the user machines as an active user machine and the other user machine as an active user machine or a passive user machine, all of said user machines having a browser program which is Java enabled stored therein, each of said active user machines being able to interact with said shared program in substantially real-time, the result of each interaction by an active user being broadcast to all user machines in substantially real time.

Preferably there are at least two active user machines. Conveniently the computer readable code means is written in Java 1.2 or a later version and C++. Conveniently also the browser program is Java enabled.

Alternatively, the code means may be written in an earlier Java version. Also the browser can be an earlier Java enabled version.

According to a further aspect of the invention there is provided a computer program for sharing software between at least two user machines, one user machine being designated an active user machine and the other being designated an active or passive user machine, said computer program having computer readable code means written in Java and C++ for sharing software between said active user machine and the other of the active and passive user machines, whereby when said at least two user machines are active user machines said shared program is accessible by each user machine and the result of said interaction with one user machine is broadcast to substantially all user machines simultaneously so that all active user machines appear to be interacting in substantially real time.

The software sharing program may be located in a server machine, a client machine or both. The software for sharing may also be downloadable from a server by a client to load on the client machine and allow immediate interaction between the machines.

The software sharing program may permit two or more active user machines to play a game substantially simultaneously or to allow co-design of a product for example a car or a building.

BRIEF DESCRIPTION OF THE SEVERAL VIEWS OF THE DRAWINGS

These and other aspects of the invention will become apparent from the following description, when taken in combination with the accompanying drawings, in which:

FIG. 34 is a simulation of a signal generator module connected to an output plot module to explain code generation;

FIG. 35 is an XML representation of the modules shown in FIG. 23;

FIG. 36 is a table depicting the Matlab code generated to represent the simulation of FIG. 23

FIG. 46 is an XML document that displays the layout of a properties dialog;

FIGS. 59,60,61 depict flowcharts of the splash screen state, pre-game state and game over state for the client;

DETAILED DESCRIPTION OF THE INVENTION

Before a detailed description of the embodiments of the invention with reference to the drawings is given, a brief overview of the functionality and general properties of the invention will be described.

The system user interface has a distributed architecture, which acts as an intermediary between remote Internet or Intranet client machines and server applications located on a central (or series of central) host machine(s). The software is written in Java 1.2 or later version and C++, and requires Java enabled browsers for its functionality. No copy of the server application need reside in a client machine.

The software interface provides a number of functions:

a) It permits remote operational control of server applications by any of the remote clients—known as the active user or active client.

b) It allows remote observation of the activities of the active user and the response of the server application due to these activities, by any number of chosen clients (known as passive users or passive clients).

c) It enables real-time interaction between client machines;

d) It facilitates remote real-time control switching between clients to assume (or relinquish) the role of active user of the server application.

e) No copy of the server application need reside in a client machine;

f) Only a browser—at the client end—is required to enable communications between clients and server(s). In a preferred arrangement the browser must be Java enabled.

g) The system supports cross-platform operations between several existing operating systems.

Figure 1:
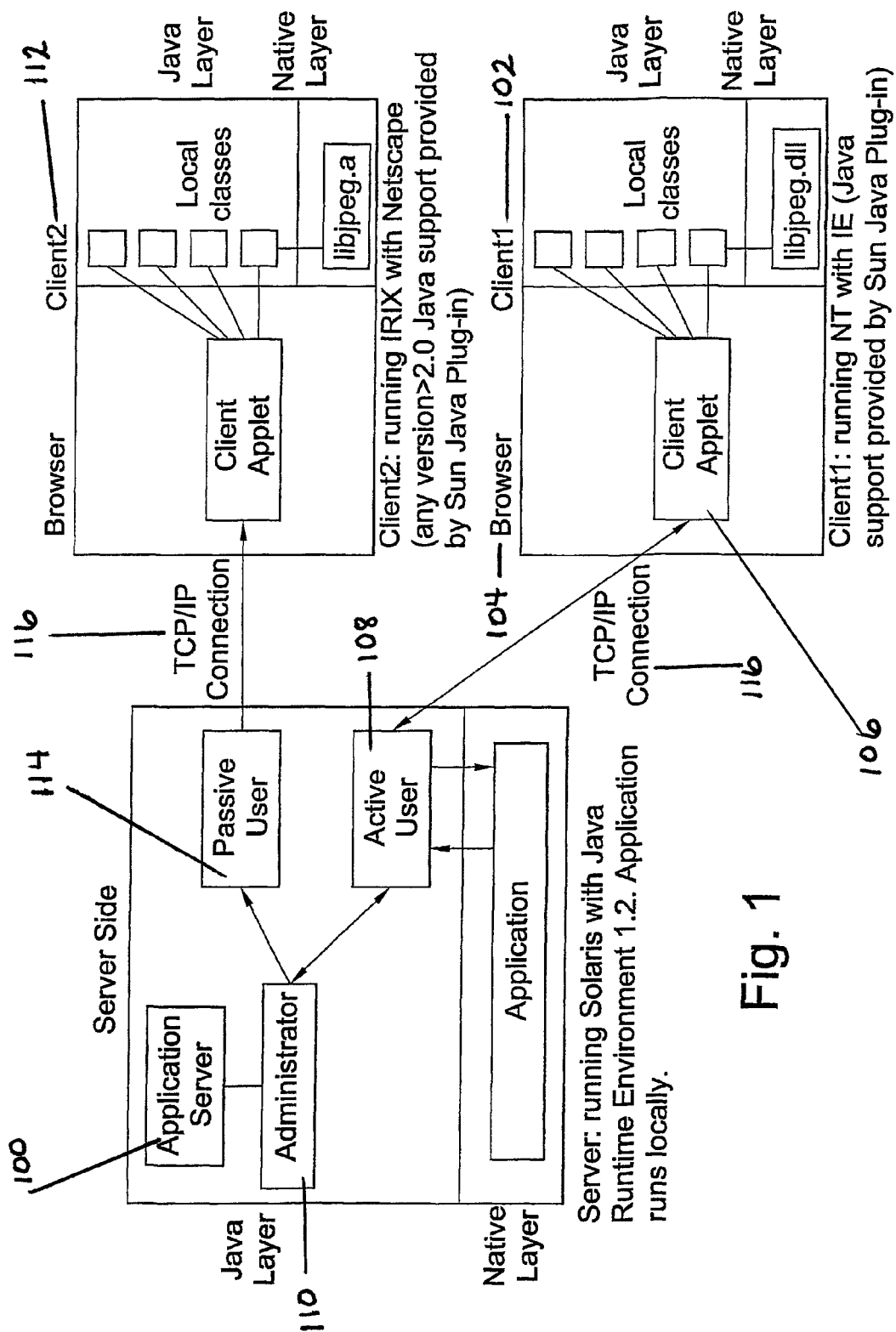
FIG. 1 is a schematic representation of a resource-based interface system in accordance with an embodiment of the present invention.

Reference is now made to the developed software, an overview of which is diagrammatically illustrated in FIG. 1 and which is divided into two parts:

a) Server side: The server software must operate on a server computer (or computers), hosting the server application software.

b) Client side: The client software can operate on any computer, which connects to the server through Internet or Intranet connections with the purpose of using a server application remotely.

The current development is capable of supporting cross-platform operating systems for which Java 1.2 or a later version releases or where suitable plug-ins exist or can be made available. This could include Sun Solaris (Sparc and x86), Unix, Linux, MS-Windows, SGI Irix, FreeBSD, Hewlett Packard HP-UX, Compaq Tru64 and IBM AIX.

Referring to FIG. 1, on our server Sun workstation, the Application Server 100 Java object runs continuously "listening" for connections. On PC machine "Client1" 102 the user points the web browser 104 (Internet Explorer or similar) to the web page on the server containing the client Java applet. The ensuing execution of the applet 106 produces a page—displayed on Client1—and the Java applet produces a login dialog requiring user name and type as described below. On submission of this information a connection with the server is established. If the user is an Active User (determined through the password) the Application Server object creates an ActiveUser and an Administrator objects 108, 110. The Administrator is effectively a dynamic lookup table of all the users connected to this session. The users' names are actually being used to enable the server to pass on to clients the commands, which the Active User issues to the system and also the responses, which the application provides as a result of these commands.

Hence, on Client2 machine 112, the user is initialised in a similar way to that of Client1. The only difference is that when the ApplicationServer accepts the connection, it initialises a PassiveUser object 114 to handle the connection with Client2.

ActiveUser objects and PassiveUser objects differ in that a PassiveUser has no control of the server application. The PassiveUser only receives the output from the ActiveUser copy of the application and cannot interact in anyway with it except to terminate a session or save a plot to file in a JPEG format.

In a typical multiple user session, commands entered into the browser console on the Active User client machine are sent to the server machine, where the ActiveUser object is listening for commands. When a command is received it is passed to the input stream of the Process object. The output (if any) from a command is copied from the Process input stream to the output stream of the Active user's connection and also to every output stream held in the Administrator object (i.e. copied to all the Passive users connected to this session) i.e. a multicasting operation ensues.

The Active User's client machine, after executing a command listens to the connection for the response. If there is a response, it reads it and then allows the Active user to enter another command (exactly like an ordinary computer console). The Passive user's client machine has nothing else to do but to listen permanently to the connection for output from the server application. The Passive user can of course log out if desired. There is also the ability (not shown in the figure) to communicate with other clients for the purpose of exchanging information or to request Active User status.

If such status is granted then the positions of Active and Passive users are interchanged in real-time without any loss of data.

In case where information other than commands to the server application is transmitted, for example to send plot data to clients or audio or image files to the server (for use in image processing applications, for example), appropriate headers are used to denote this to the system.

The system can also handle the submission of files for batch execution of multiple commands just as though they were given to the system from a keyboard.

As shown in FIG. 1, the connections between the machines are currently standard TCP/IP connections 116 common in Internet-based communications. The number of users on the system at anyone time is limited only by licenses or network capacity.

This generic structure, which has been developed principally mostly for distance-learning educational purposes, has been tested using several commercial software structures such as Matlab, GNU Octave, LabView, etc. Several modes of operation have been developed and several client types are supported. These are as follows:

Single User Mode:

This mode allows a single client to remotely operate an individual copy of a proprietary application over Intranet or Internet connections through the use of a Java-enabled browser. Output from the application operated by the user is produced on the browser of the user. In this mode, no other users are allowed to observe the activities of the user or the responses of the application as a result of these activities.

Teaching-by-Showing Mode:

In this mode an active user can operate the proprietary application remotely, whilst a number of passive users, for example 50 or more, can observe the activities of the active user and the responses produced by the remotely-controlled application. Under this mode only one active user has full control of the remote application for the full duration of a teaching-by-showing session. This mode supports two different client types:

1. The "Tutor" client: This is an active user who has full control of a remotely-hosted application and who can pass information to several passive users (students). Output from a single copy of proprietary software operated by the Tutor is multicast to all users along with all corresponding input, plots and any other data produced directly by the Tutor or by the remotely-controlled application as a result of the Tutor's activities, as required.

2. The "Student" client: This is a passive user who, through a Java-enabled browser, is presented with an interface that allows him/her to join or leave the teaching-by-showing session. The client is not, however, permitted any other interaction with the remotely control application. Since passive users will normally attend a "teaching-by-showing" process, there is no need for them to participate. Plots and other data received from Tutors can still be manipulated by the Student and saved to disk.

The Shared Mode:

This allows multiple users to use a single copy of the proprietary application and observe the output regardless of who is providing the input (i.e. who is the active user). Control of input can be switched between users although one particular user (usually the first to join the session) has overriding control and can "grab" control when desired. A switch on the browser enables the active and passive mode manifestation by, respectively, enabling or blocking the ability to send input from a given client side user-interface (CSUI). Toggling the active/passive switch either polls the active user in the session for control of the remote application or offers control of the application to any of the currently passive users in the session.

No active user role can be assumed by a passive user before control has been relinquished by the existing active user—the only exception is a user with overriding control. The shared mode supports three different client types:

1. The "Supervised" client: This client has full control of their own individual remote application. When a Supervised user requests assistance, then control of the application can pass over to a Supervisor user, together with a history of the actions of the supervised user. The original user then becomes a passive user, unable to provide input to their copy of the application. The Supervisor can then advise the user of the best action to take or provide any other assistance as necessary. Upon completion, control is then passed back to the original Supervised user.

Control of a Supervised user's copy of a remotely-controlled application is governed only by the Supervisor i.e. a Supervisor decides whose copy of the software he/she is going to control and when he/she is going to take/abandon control of it.

2. The "Supervisor" client: A Supervisor user can oversee a number (class) of Supervised users. A Supervisor user need not have initiated any of the applications that his/her students are using. Instead, the supervisor who has a list corresponding to the names of the students he/she is the designated supervisor of, can take control of the input and output of a any one of the aforementioned student's copy of an application.

3. The "Sharing" client: This type of client has overall control of a remote application and chooses to share it on equal terms with other Sharing clients for the purpose of, for example, exchanging ideas over a common project, testing some software or finalising designs. Control of input can be switched between users although one particular user (usually the first to join the session) has overriding control and can "grab" control when desired.

These modes and the corresponding client types lead to four types of session being hosted by the system.

1. Single user sessions where an individual user is connected.

2. A teaching-by-showing session where a single tutor user broadcasts to multiple student users. 3. A supervised session where supervised users have access to a single supervisor.

4. Co-operating session where remotely located users are co-working using the same application.

In the multi-user situations mentioned, communication is available by means of a text messaging system allowing supervised users to notify their supervisor(s) of difficulties or for passive users to ask questions from active users and other passive users (if necessary). Sessions are entirely self-contained; users can only communicate with other users in the same session. No control of software belonging to other sessions is permitted. In multitasking operating systems, it is possible however, for a user to have logged in to two different sessions at the same time and operate in both of them independently.

In addition to the generic structure already described, there are provided specific user interfaces for Matlab and Gnu Octave software. These are currently known as J-Sim (for Java Simulation) and Web-Class. The structure of these developments together with their common generic features explained so far is described below in detail.

J-Sim is a Graphic User Interface (GUI) for Using and Sharing Octave/Matlab Simulation Environments over Internet and Intranet connections.

Block-based simulation applications are increasingly favoured over traditional command line driven modelling tools. Such environments affect the flexibility of modelling but permit rapid prototyping and interactive testing/redesign of simulations within an intuitive graphical interface. Specialised applications may not need the full power and flexibility of a command line driven simulation tool, For Engineering and Digital Signal Processing (DSP) purposes simulation packages such as Matlab, Lab View, MatrixX, GNU Octave are commonly used. The J-Sim development described here uses the generic structure described above with reference to FIG. 1 to effect the client-server communications and additionally provides a GUI interface, which can be a substitute for the Simulink environment of Matlab. Further, the J-Sim interface offers functionality not available by Simulink, whilst it is also compatible with GNU-Octave and provides a GUI interface for this package as well.

Figure 2:
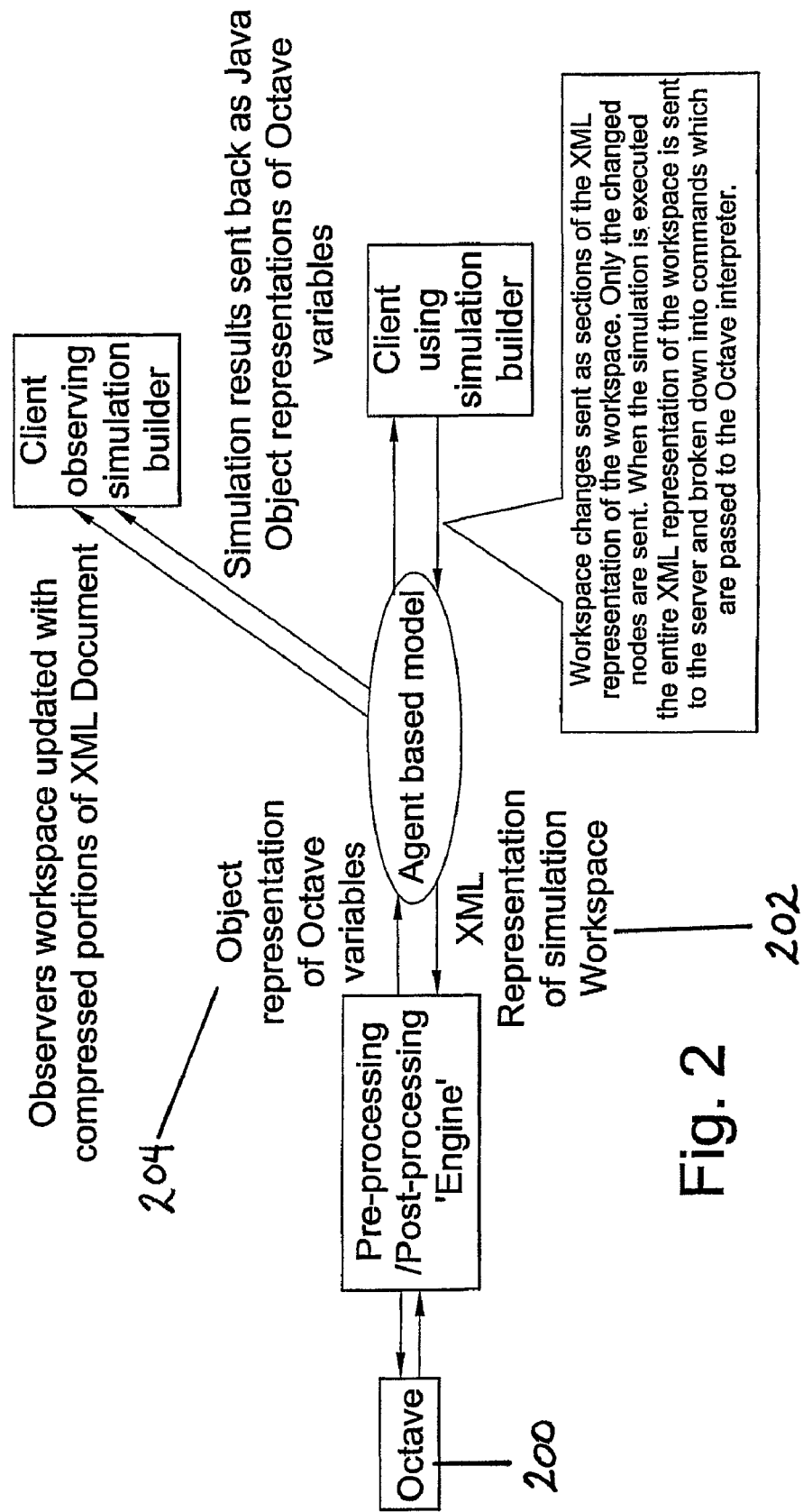
FIG. 2 is a schematic representation of the functionality of the server side for use with the interface system of FIG. 1.

FIG. 2 illustrates schematically the functionality of the server side used with the system of FIG. 1 and the following description explains the operation of the generic client-server communication structure and also the development pertaining to the GUI environment of J-Sim.

The J-Sim GUI interface is implemented on the client side. To use the interface, the server application must be either Matlab or GNU Octave 200 and certain procedures must be activated in addition to the already explained functionality of the generic interface.

The Server side system, after handling and connecting the clients, is primarily responsible for connecting to the native application (e.g. Matlab or GNU Octave) responsible for carrying out the numeric calculations associated with mathematical simulations. Both Matlab and Octave are command line driven applications and they both rely on scripts for user-defined simulations (known as "M-files") as an alternative to entering multiple instructions on the command line.

When a simulation is initiated at the client side, the client software generates an XML representation of the workspace 202, which it sends back to the server. XML is particularly suited to this type of application as it provides a logical representation of hierarchically stored data—in this case a workspace, its child blocks and connectors and their child attributes. The server processes the XML representation of the simulation workspace and from it generates an array of commands to be sequentially executed by the native application of choice (e.g. Matlab/GNU Octave). Multiple users can run simulations independently of each other using a single copy of the application as batch execution of commands can be used.

Output from the native application is parsed and stored in object wrappers 204 representing variables in the simulation, which are then added to a table storing all variables in the simulation and their values.

Figure 3:
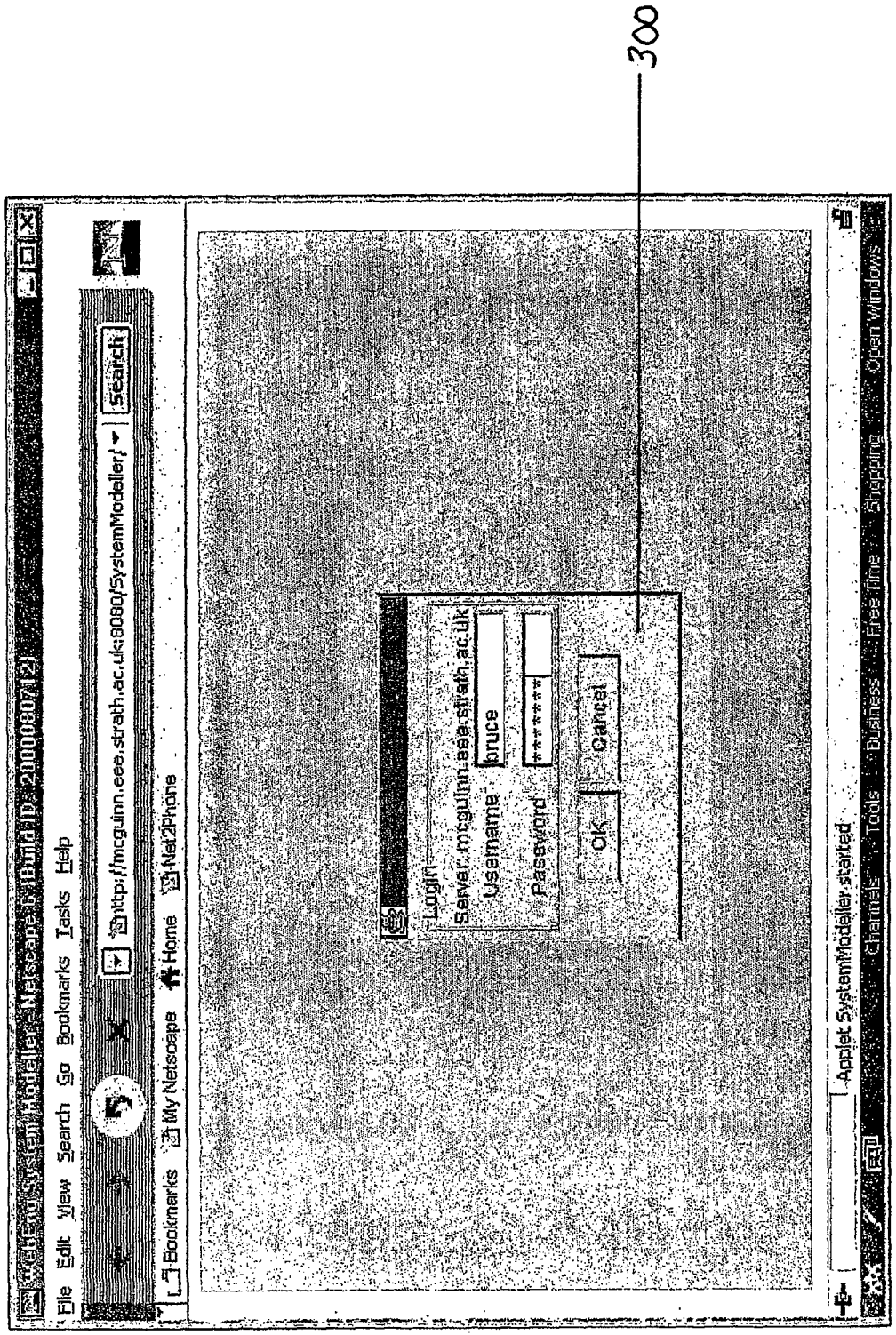
FIG. 3 depicts a screen display on the client's (user) side of a typical log-in procedure when an active user logs into a server over the Internet.

Client applets run in Java 1.2 or later version enabled web-browsers. Users are faced with a log in screen 300 shown in FIG. 3 before commencing a session, prompting them for user name and password. The first user who logs into a session becomes the active user—an active client consists of both a toolbox 400 and a workspace 402 and the passive client consists only of a workspace as best seen in FIG. 4.

Figure 4:
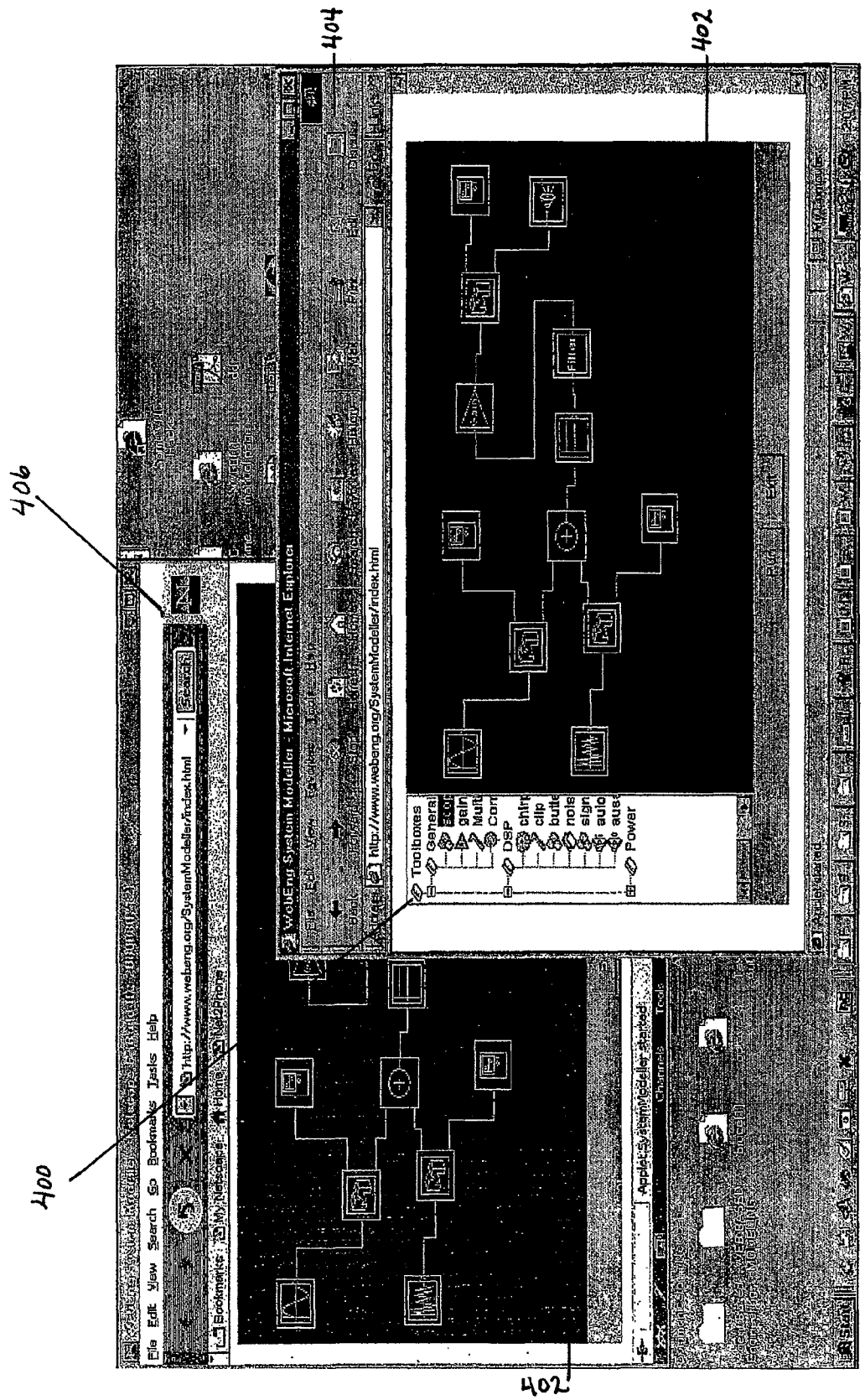
FIG. 4 depicts a screen display showing the display of a typical active user display in the foreground and a passive user display in the background.

In FIG. 4 the passive client 404 is in the background executing in a Netscape 6 browser and the active client 406 is in the foreground executing in an Internet Explorer 5 browser.

When a log-in procedure starts, the client applet connects to the server and reads a configuration file containing details of all the graphic modules available for use in simulations; the configuration file can be edited/added to as required. Modules are stored as individual archives at the server side and downloaded and loaded onto the client if specified in the configuration file. The archives containing the modules also contain icons for representing the graphic blocks both in the tool palette and on the workspace of the client machine. They are also used in forming XML documents from which a property's dialog can be dynamically generated. This format is intended to be as extensible and flexible as possible, allowing users to tailor their own modules around self-authored M-files.

Figure 5:
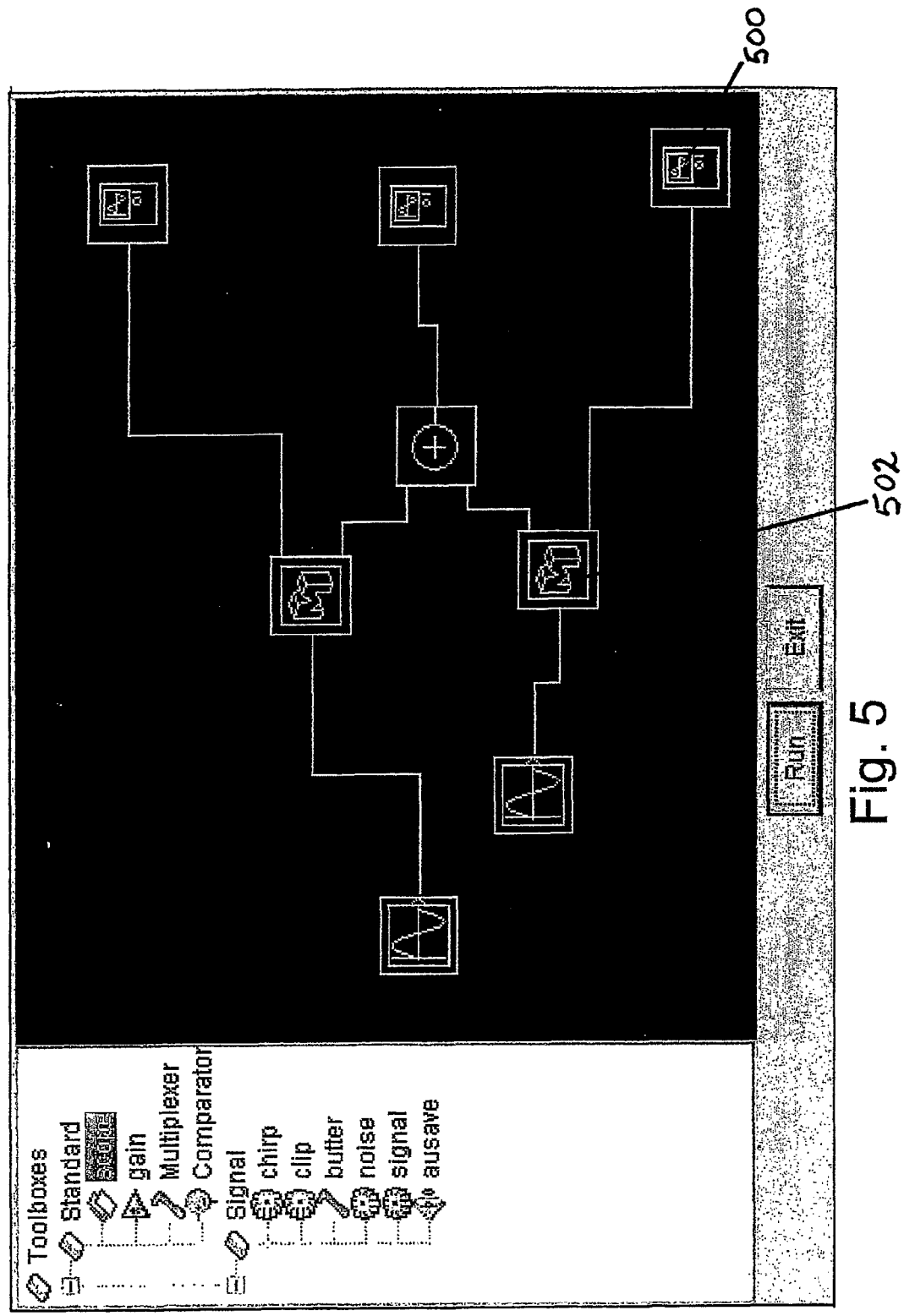
FIG. 5 is a more detailed view of the screen display of the active user details shown in FIG. 4.

Reference is now made to FIG. 5 which illustrates a more detailed view of the active user details shown in FIG. 4. As the simulation is constructed the passive users have their workspaces updated with every 15 repaints of the active user's workspace (this can be adjusted if necessary). The advantage of broadcasting workspace updates as serialized objects is that it not only consumes less bandwidth than sending an image of the workspace, it also allows the passive users to interact with the workspace in their own applets, for example inspecting property dialogs etc.

Figure 6:
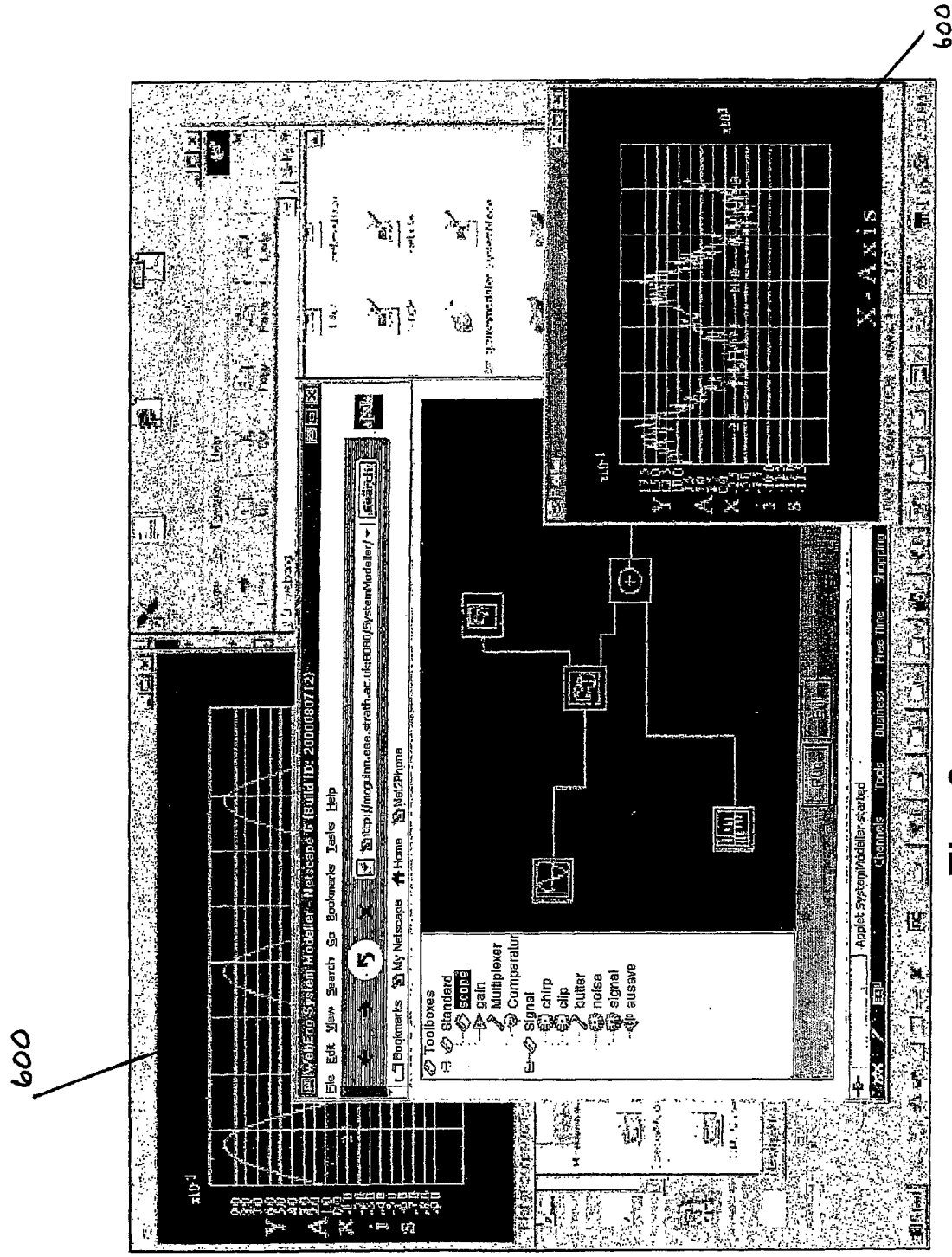
FIG. 6 depicts a screen display at the client end for graphical plots of results and typical simulations using Matlab or Octave variables.

Output plots 600, such as those shown in FIG. 6, are received in the form of serialized wrapper objects containing Matlab or Octave variables, which are then used to generate their graphical representations. These representations are generated using a J-Sim graphics, described in detail below, which resides at each client machine. The wrapper objects contain more than just the raw data originally received from the command line; they also contain the data format, dimensions, type of the graphic, its position in the workspace, etc.

With further reference to FIGS. 3 to 6 normally only the end points of the simulation (those blocks that have no output connectors) are usually of interest to the end user since they usually take the form of some graphic output. Variables representing these end ports are extracted from the variable table, serialized and sent back to the client for plotting. Object serialization is an acceptable and convenient means of transferring and storing object data, however it does not provide long-term persistence or compatibility between differing versions of a Java Virtual Machine (JVM). This refers to the environment in which a Java application executes containing all runtime objects that constitute the programs workings. For this reason XML is used to provide long-term storage persistence for serialized objects.

To better illustrate the features of the J-Sim and WebClass software, a description is provided with reference to screen displays, which allow two users to share software over the internet. The J-Sim software is described first.

Figure 7:
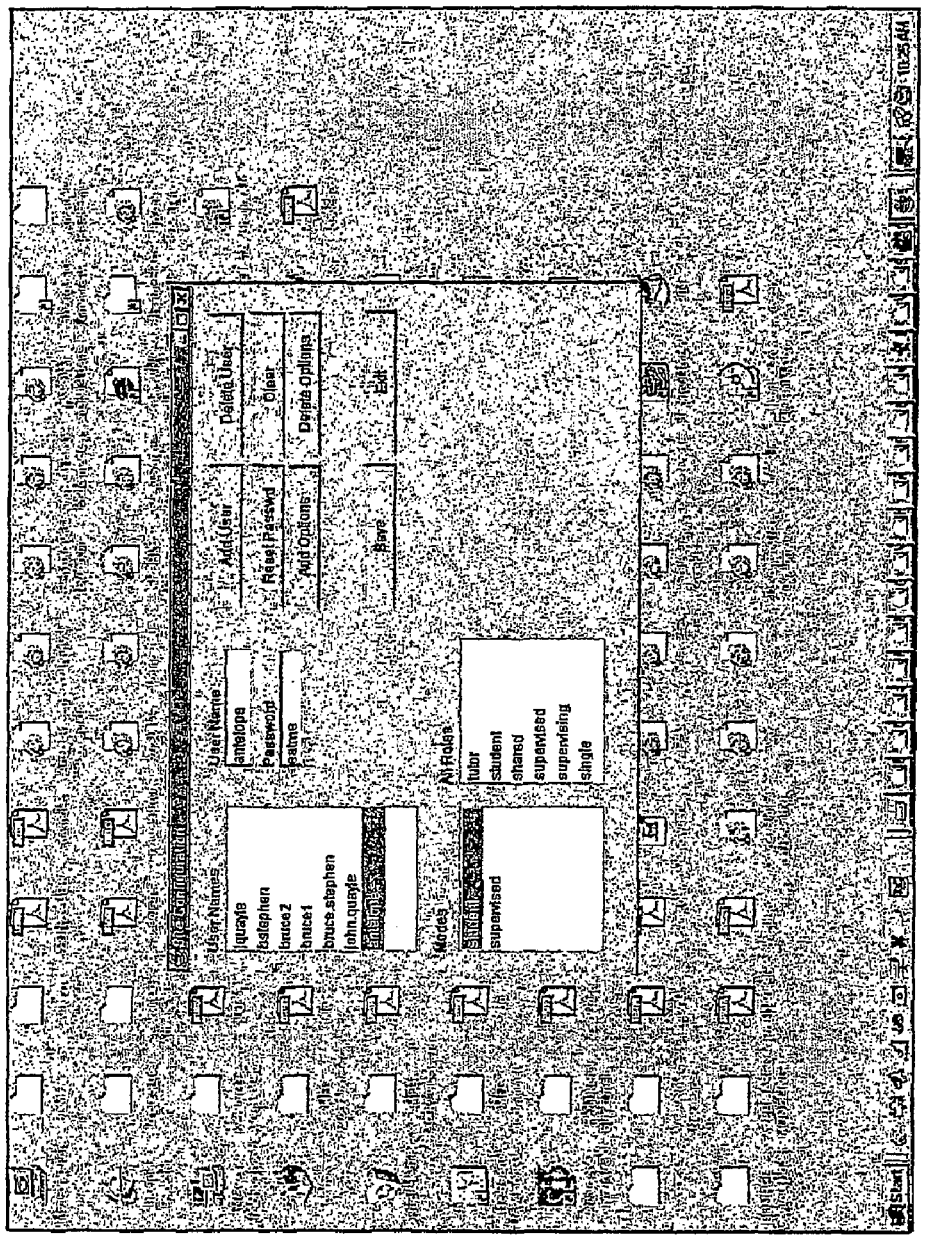
FIG. 7 is a screen display of a registration screen to be completed by a user in order to use the system.

The user registration must take place before any users can use the system, applies to both J-Sim and WebClass software. The process is illustrated in FIG. 7 where each user is allocated a user name, password and a user status. The user status can be one of: tutor, supervisor, ordinary user. Depending on their status, users can only assume certain roles. For example, ordinary users can be supervised users (students), single users or be able to share with other users. They cannot however assume the roles of tutors or supervisors (roles which could have special privileges). Users can change their passwords but not their status. Status changes only can be made by the system administrator.

Figure 8:
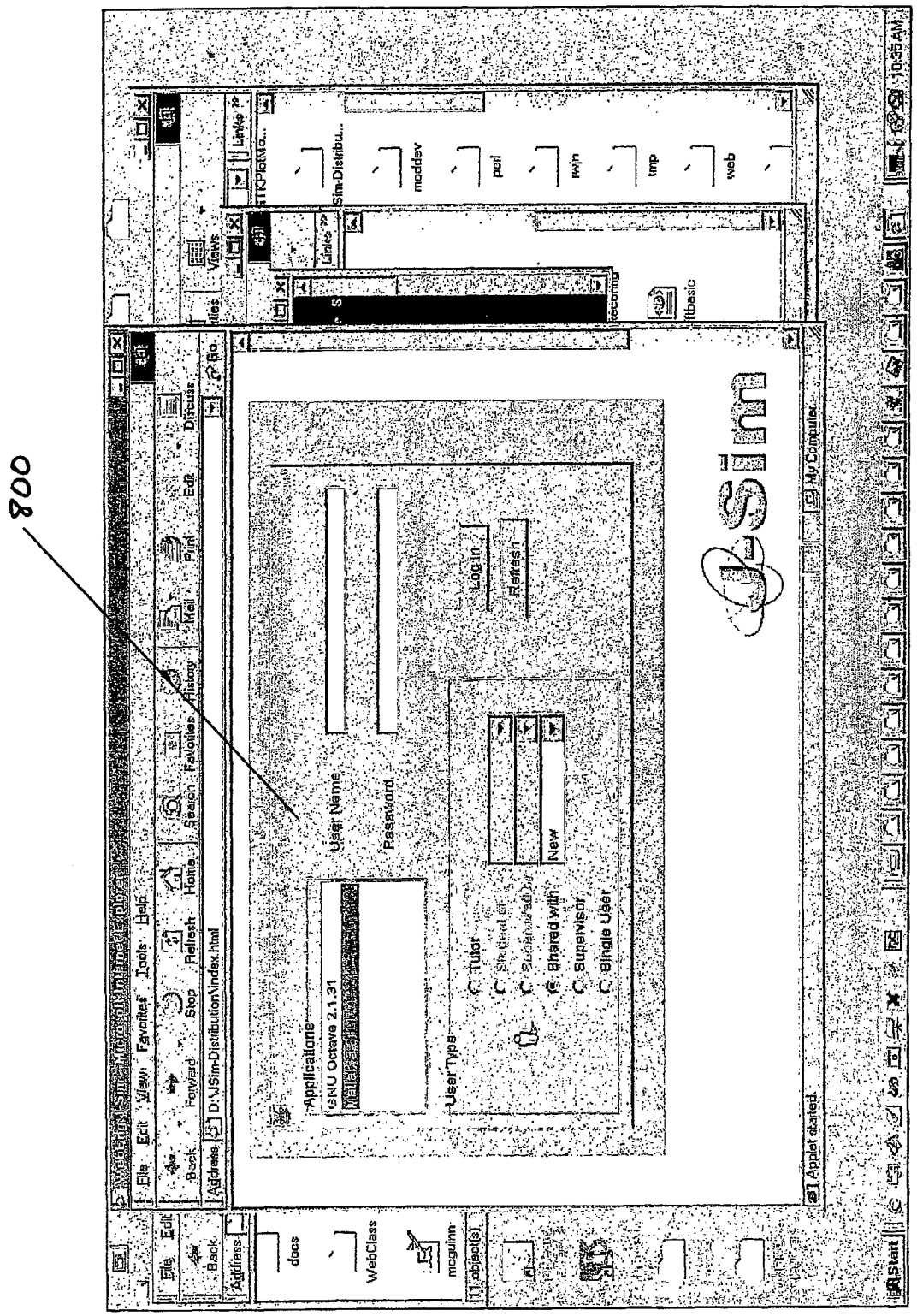
FIG. 8 depicts a login window for the J-Sim software.

With J-Sim the procedure starts when one of the users login into the system. Typically one user will use the browser in his/her client machine and point at the server site where the software to be shared resides. A login procedure will then commence at a server side to enable the user to login and use the software. A typical login window 800 is shown in FIG. 8. The user has the option of selecting to use the software as a single user, as a tutor, as a supervisor or to share with someone else. In this case the first user will login using the "shared with" option and indicating "New" in the corresponding window to the right. This indicated to the system that this user is the first user of a new process to be shared with others. The user has also opted to use the Matlab software. A login name and password must also be typed to ensure that the user is registered with the particular system. The first user to initiate a particular piece of software is deemed the active user.

Figure 9:
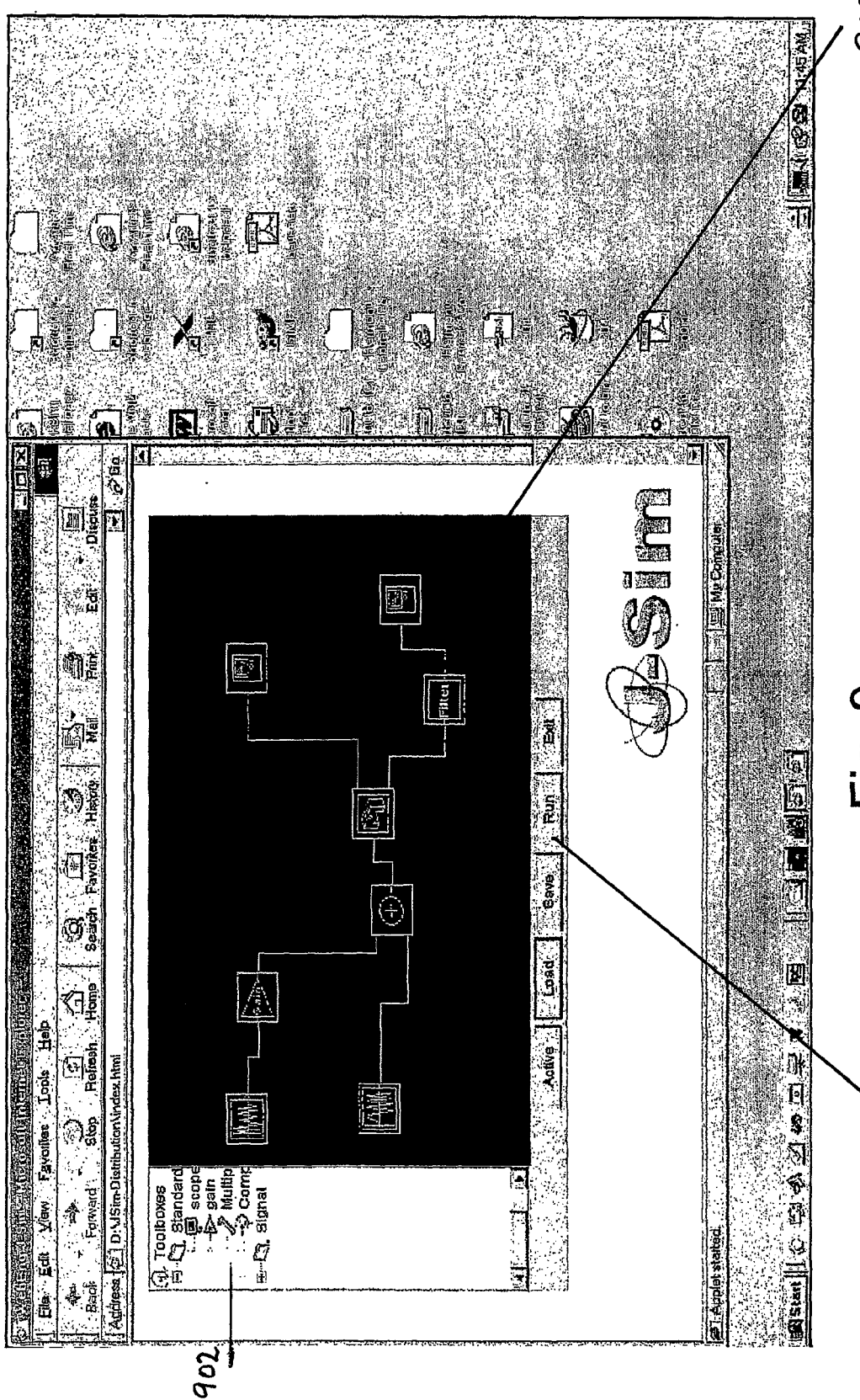
FIG. 9 depicts a screen display of an active user's browser using the Matlab/Octave process with J-Sim.

With the initiation of the software, using Octave/Matlab software process, the active user's browser will typically look as shown in FIG. 9 where a workspace 900 is shown together with a set of toolboxes 902 on the left hand side of that workspace. The user can click and drag toolboxes into the workspace and connect them as shown.

Once an active user login procedure has been effected, any other user who wishes to share with the active user is then allowed to log into the system as a passive user only. A passive user login process will then be initiated by the server and the process will be visible to that passive user only at his/her own client machine. This login process will be almost identical to the active user's login process, shown in FIG. 8, with the added requirement that the login name of the active user must also be specified in the space provided on the right.

Specifying the name of the active user during passive user login is essential; for if there are more than one shared processes running on the same server, the system needs to ensure that the passive user will connect to the hub operated by the correct active user and not connected to another hub operated by some other unrelated active user. Otherwise the login procedure is identical for both active and passive users.

Figure 10:
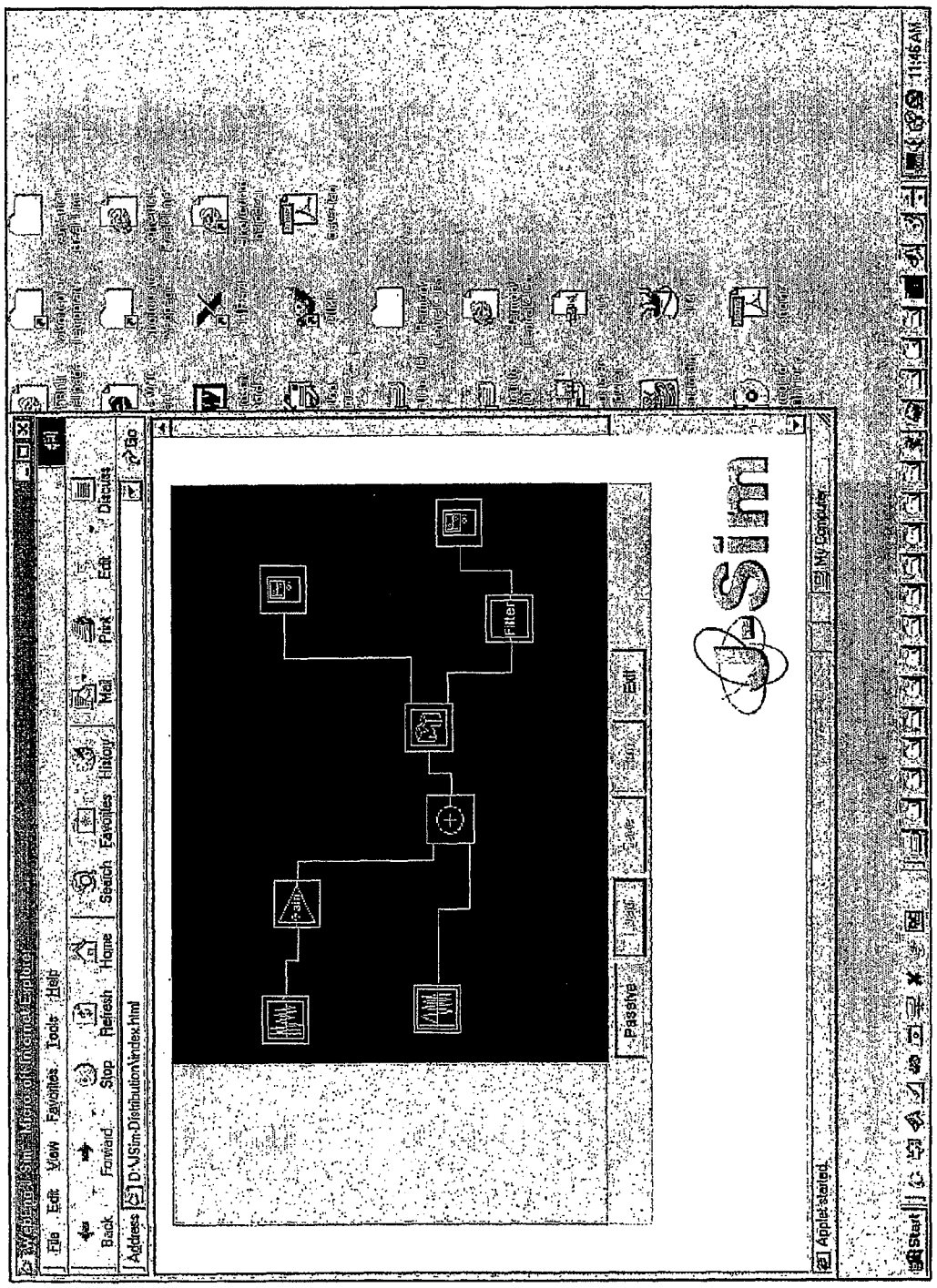
FIG. 10 is similar to FIG. 9 but depicts a screen display of a passive user's browser.

Once the login procedure for the passive user is completed, the passive user is able to see in his/her own browser the workspace area of the active user but not the set of toolboxes. This can be modified so that passing users can also see the toolboxes but they cannot operate on them. The passive user has no control over the shared software. The browser interface of the passive user is as shown in FIG. 10.

Referring to FIG. 9, an active user can build up a simulation process and then use the "Run" button 904 in the browser to propagate the workspace information to all the passive users and start the simulation, which can then be observed by all users through the multicasting operation at the server end. Any plots or graphs are plotted locally (at each client end using the graphics package described below), after the instructions for each graph have been received by the clients.

Figure 11:
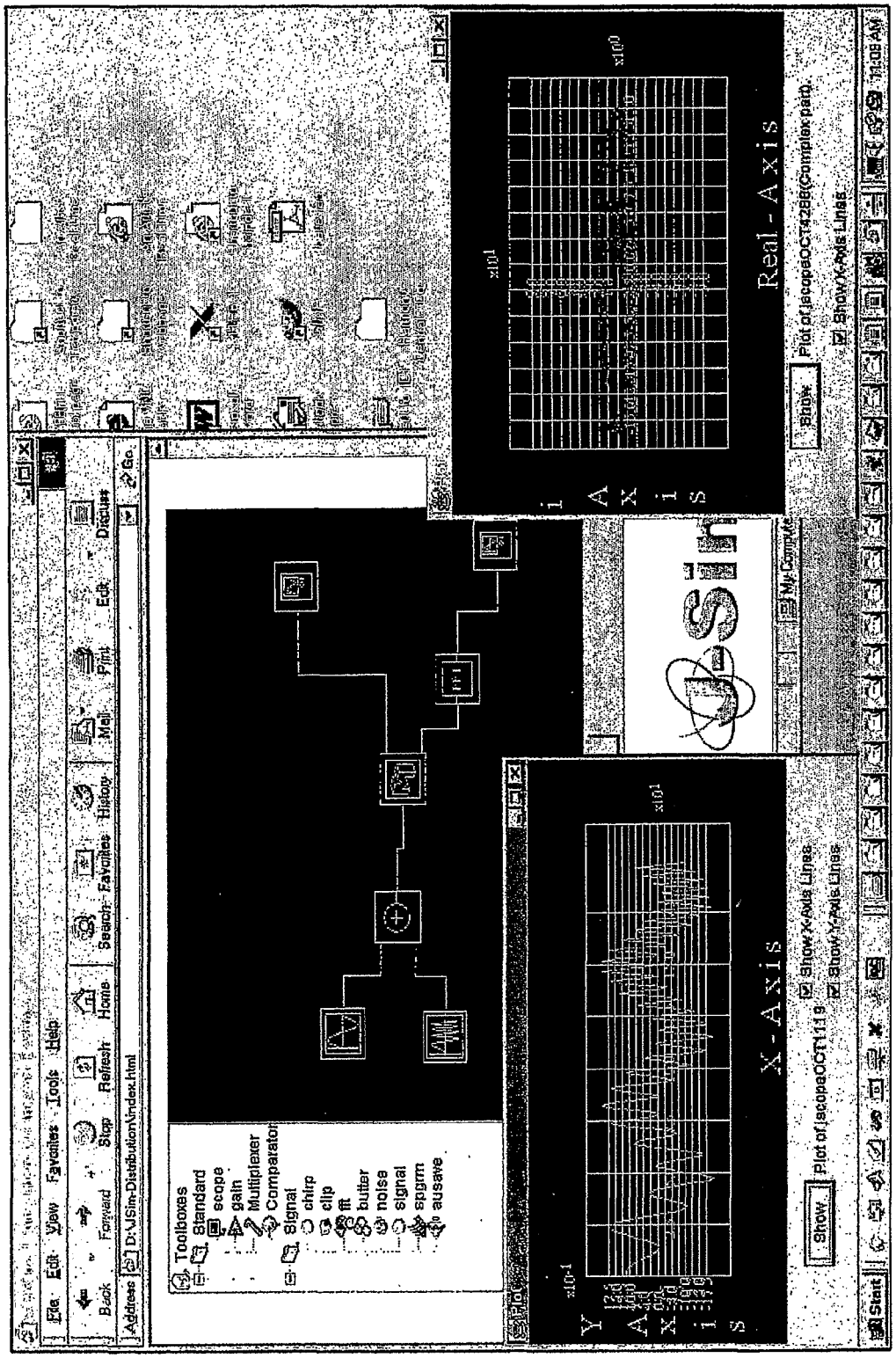
FIG. 11 shows a typical graphic output obtained using the Matlab/Octave software with J-Sim.

Any changes to the workspace that the active user makes can easily be uploaded to the passive user's client machine upon execution through the "Run" button. A typical graphic output provided by the system is shown in FIG. 11.

In the case where the passive and active users need to switch roles, this is effected through simple communication processes. The passive user informs the active user that he/she needs to take control of the software and (assuming agreement) the active user relinquishes control of the process in the server (by pressing on the "active" button in his/her browser). Once this happens, the passive user assumes control of the process by pressing the corresponding button in his/her own browser. The corresponding browser interfaces also switch to accommodate the new roles of the users.

Communications between users can occur in several ways. One method, that of pop-up windows through our software development, is mentioned in the WebClass example described below. Another method is to use any standard third party software to establish both visual and verbal communications through internet/intranet connections should it be needed.

Although this illustrative example has been shown for just two users (for reasons of clarity), it is important to know that an unlimited (in theory) number of users can share a process although only one active user at a time is allowed to control that process. The only known limitations to the number of users are due to physical limitations of server capacity, bandwidth, internet connectivity and software licensing limitations.

The WebClass software will now be described for a similar situation where a supervisor supervises two users to learn to use the Octave software under the WebClass interface. The supervisor login procedure is described first and starts when one of the users login into the system as a user.

Figure 12:
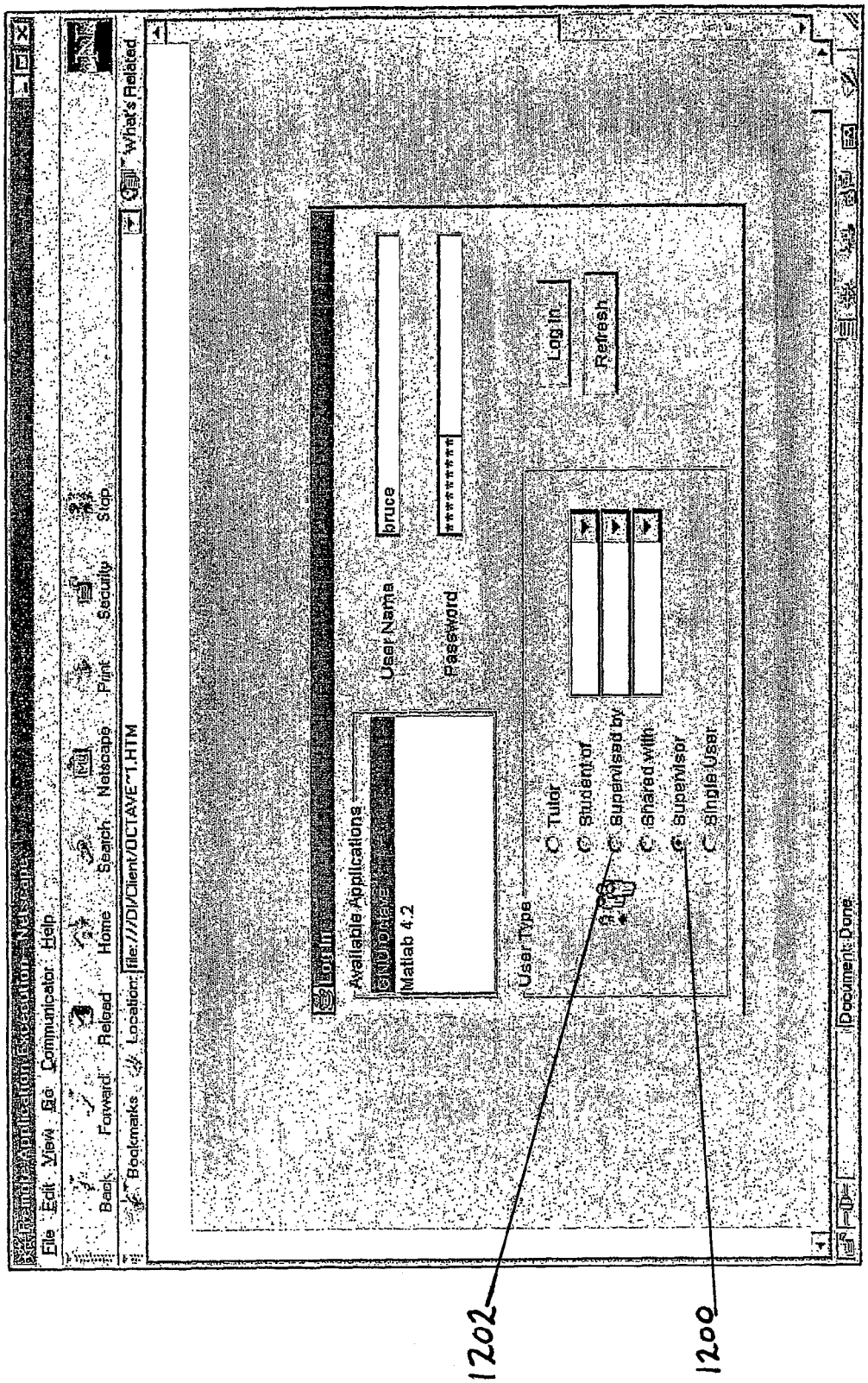
FIG. 12 shows a login screen where a user logs in as a supervisor.

Typically one user uses the browser in his/her client machine and points at the server site where the software to be shared resides. A login procedure then commences at a server side to enable the user to login and use the software. A typical login window is as shown in FIG. 12. The user has the option of selecting to use software as a single user, as a tutor, as a supervisor or to share with someone else, etc. In this case, the first user will login using the "Supervisor" option 1200 in the corresponding window to the right. This indicates to the system that this user has supervisor user privileges and capable of supervising a number of other users (students). The user has also opted to use the Octave software. A login name and password must also be typed to ensure that the user is registered with the particular system and verify his/her status as privileged user.

A supervised user's login process is similar with just two main differences. Referring to FIG. 12, a supervised user has to click the "Supervised by" option 1202 and then specify the login name of the supervisor in the space provided on the right. Specifying the name of the supervisor user during login is essential; for if there are more than one supervised processes running on the same server, the system needs to ensure that the supervised user is able to contact the correct supervisor user and not contact another unrelated supervisor. Otherwise, the login procedure is identical for both supervised users and supervisors.

Figure 13:
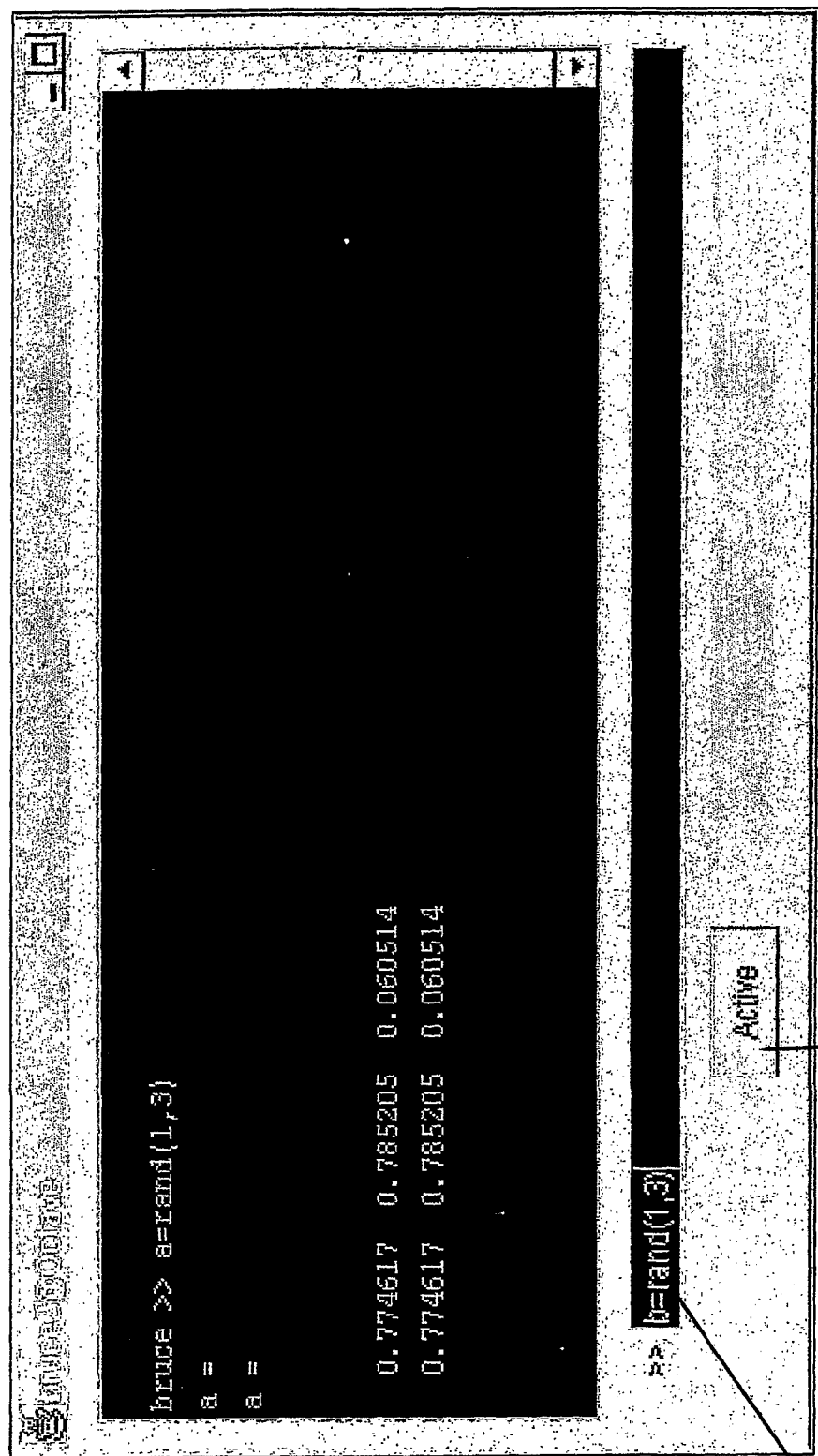
FIG. 13 shows a browser screen for a supervised user using Octave.

Once the login procedure for the supervised user is completed, the supervised user is able to see in his/her own browser the workspace area in which he/she decided to work (in this case Octave). A supervised user is essentially an active user who may require assistance and possibly request his/her supervisor to take control of the process that the supervised user runs on the server. A typical browser interface is shown in FIG. 13.

Figure 14:
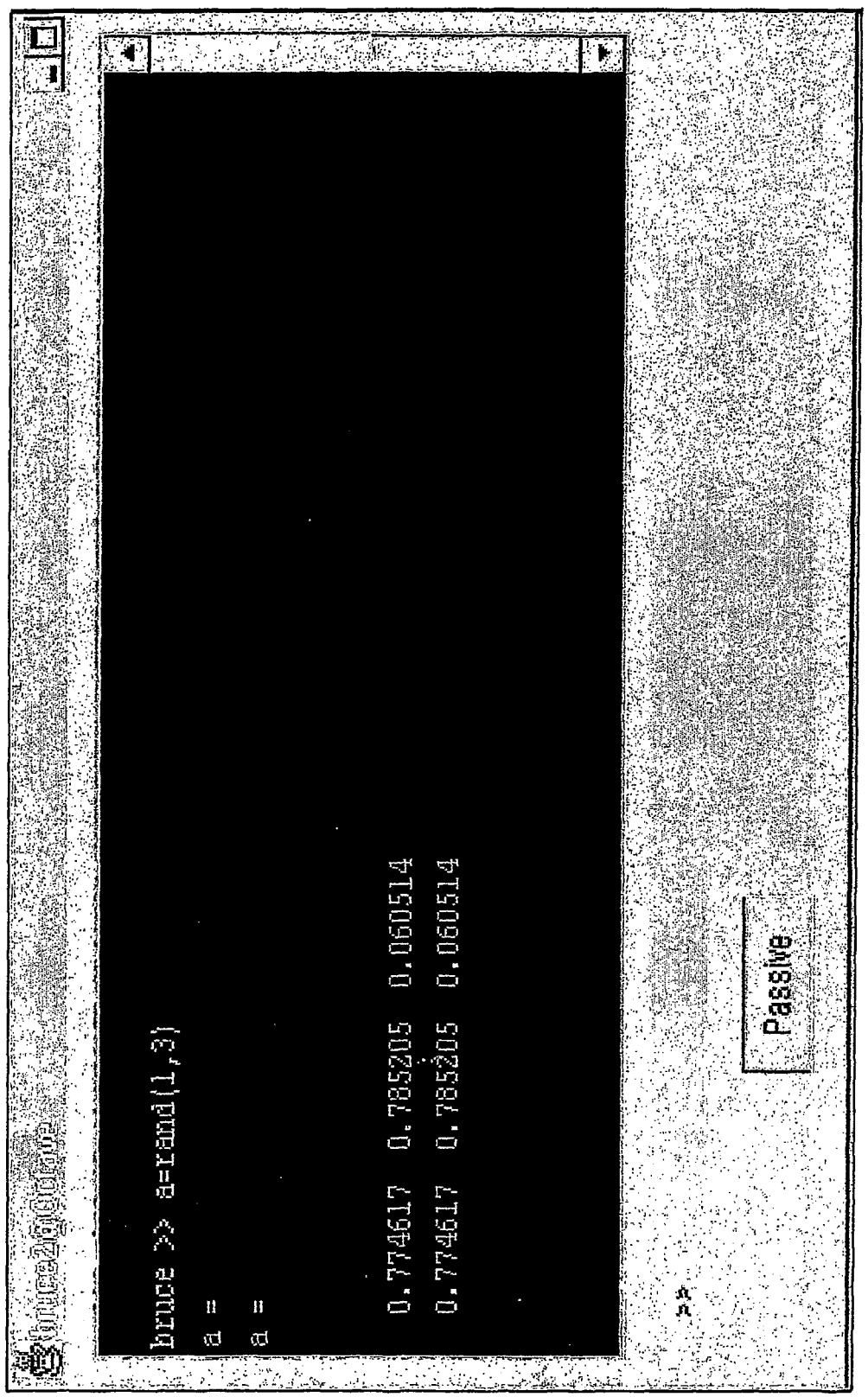
FIG. 14 shows a similar screen to FIG. 13, except that control is now by the supervisor.

Unlike J-Sim, this is a simpler interface with no Graphic User Interface (GUI). Instead of a GUI the system has a command line input 1300, typical of sequentially typed in commands at the keyboard. If for any reason the supervised user wishes to surrender control to the supervisor, then he/she can press on the "Active" button 1302 and thus allow the supervisor to take control as shown in FIG. 14. In this case the command line input interface is no longer available to the supervised user.

Figure 15:
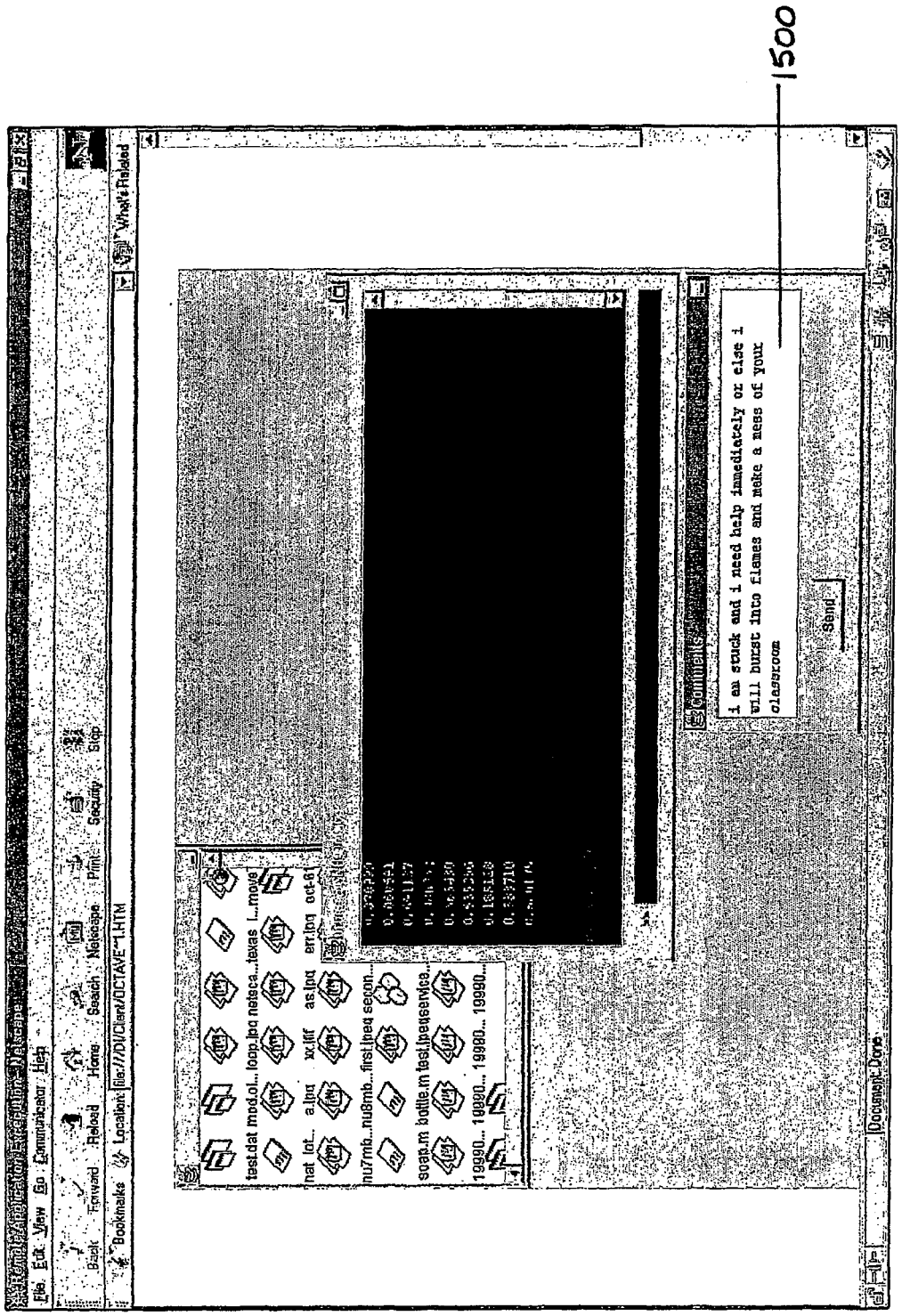
FIG. 15 depicts a supervisor's screen display depicting a pop-up help window.
Figure 16:
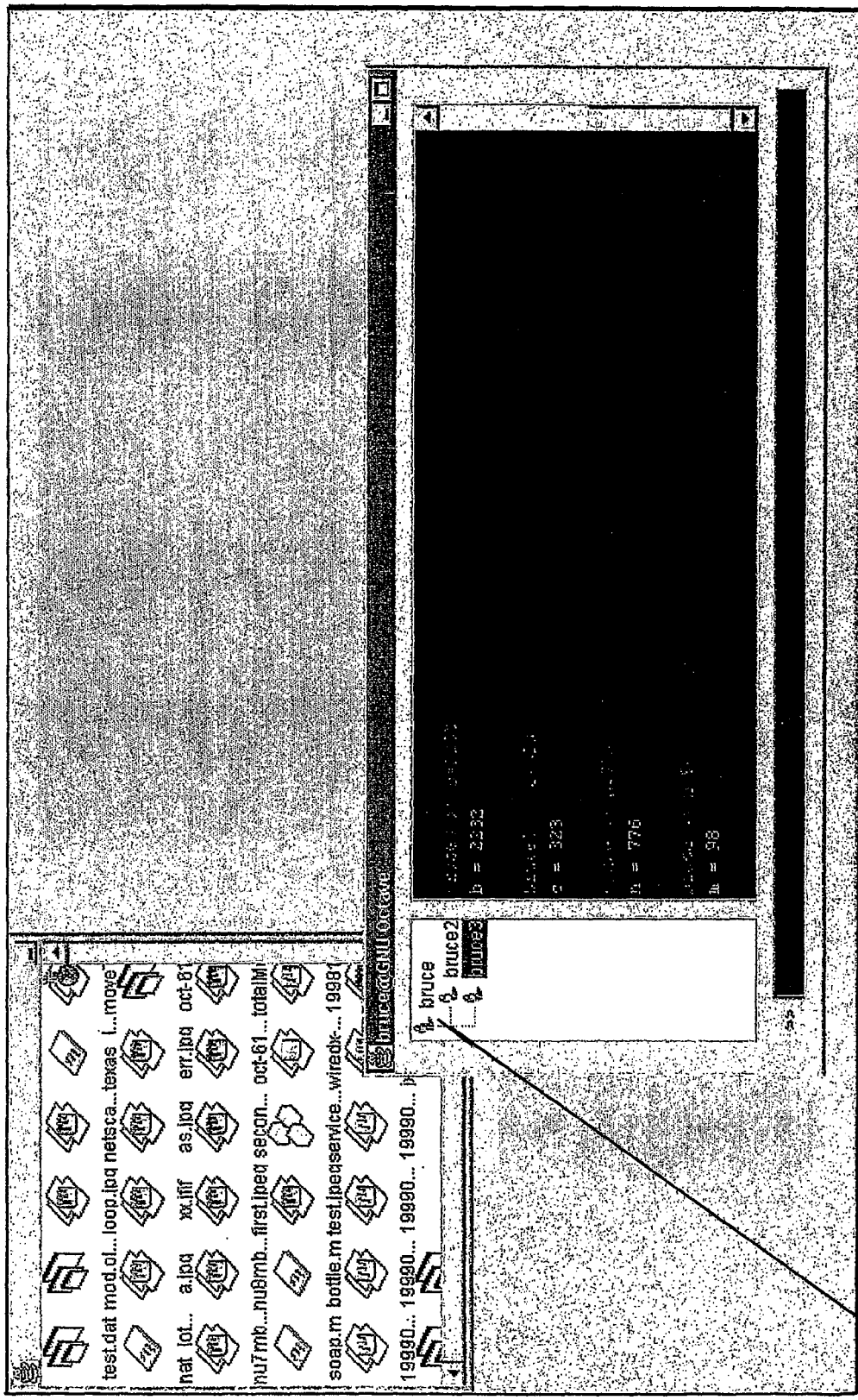
FIG. 16 depicts a supervisor's screen display identifying the use who requested help.

Under normal circumstances, a supervisor's browser interface is as shown in FIGS. 15 and 16 depending on whether the supervisor monitors the whole class or just one supervised user.

In FIG. 15, a supervisor monitors one supervised user when a caption appears in his/her browser (a pop-up window 1500) informing the supervisor that another supervised user is in need of some assistance. The supervisor now must identify the user who has requested assistance and attempt to help. This is done as shown in FIG. 16.

The supervisor looks at the control tree structure 1600 on the left of the workspace which, in this case, shows two supervised users. The button corresponding to the supervised user requiring assistance will be flashing indicative that the supervised user has relinquished control of the software he/she was executing and awaits to be shown what to do next. If the supervisor double-clicks on that button the supervisor will take control of the software copy of the supervised user together with a history of all the user's activities up to that time.

Effectively the supervisor and the supervised user have switched roles with the supervised user becoming a passive user and the supervisor becoming the active user. Normally the supervisor can observe passively what supervised users are doing at all times.

The plotting facilities of the system are the same as those used by J-Sim. The difference is that these facilities are executed at a command line input using the "plot" command rather than by clicking on GUI buttons.

Although this example has been shown for just two users for reasons of clarity, it is important to know that an unlimited (in theory) number of users can share a process although only one active user at a time is allowed to control that process. The only known limitations to the number of users are due to physical limitations of server capacity, bandwidth and internet connectivity.

Although the structure of the J-Sim and WebClass developments are similar, they also have important differences. First, the J-Sim software structure will be described.

The server is a constantly running (daemon) process that listens to the network for incoming connections and deals with the prospective remote clients. In addition, the server manages multiple sessions of applications each of which can contain multiple connections.

A client attempting to join a session must first furnish the server with data pertaining to the user's authentication details (username and password) and type (the type of user this client intends to operate as e.g. tutor, student, sharing). Referring to Appendix A, the first message sent is (1.1) the client to server authentication/initialisation message. This message allows the server to check, via a pre-configured lookup table, that the user is registered and that the password used corresponds to their username.

Configuration of the server is done by means of a separate server side graphical tool that enables the addition and removal of users from the site's list of users. This list takes the form of an XML document, a format that allows the hierarchical storage of user data. At the next stage the server determines which one of the predefined user types the user matches and if the user require some means of collaboration with another user such as sharing, supervision or tutoring.

The server side has several types of "Handlers"—one for each type of client known by the system. The structure of each Handler is described separately below.

The list of sessions of currently connected users is stored in memory, accessible via the name of the dominant user in each session. Each user is associated with a hub object described below, which is used to route outputs to the remote client; where the data is sent and where it originates depends on the type of session.

Figure 17:
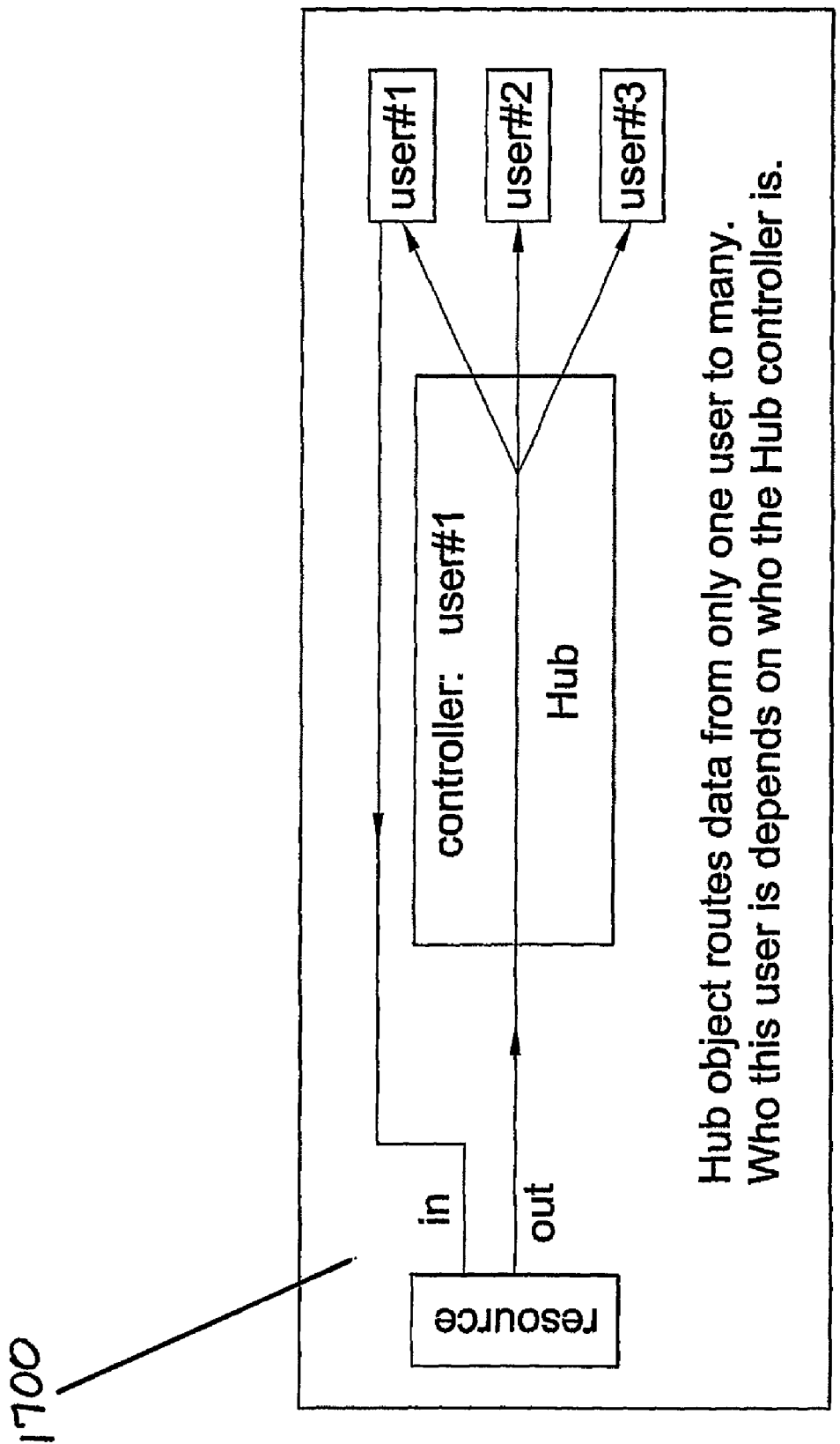
FIG. 17 is a schematic representation of the hub software which routes data from one user to many users.

The hub 1700 which is depicted schematically in FIG. 17 is the backbone of the entire server side system, with hub objects being responsible for routing data, broadcasting data and switching between data to sources to be broadcast. A hub encapsulates the outbound stream of every user in the system allowing communication between any or all of them within their session. Apart from connections, the hub enables objects written (only entire objects not single bytes) to be stored and written to user connections being added to a hub.

By having an object wrapper around resources, access can be controlled and limited preventing misuse and possible deadlock conditions where multiple sources wish to access a resource simultaneously. Without a means of controlling and scheduling access (in a multithreaded application such as this) multiple threads (users) would be attempting to write to streams causing multiple data sources to be written. Writing to a hub is protected from this by the synchronisation methods in Java which allows a single thread to hold an object (the hub) exclusively while they perform an operation on it (writing to it). Similarly, adding a user to the hub while data is being written may cause the user to only receive part of a message. This will not happen since the thread writing the data holds control of the hub and the thread adding the user connection cannot perform its task until the first thread has completed its task and relinquished exclusive control. This method of thread synchronisation is a key feature of the java programming language.

For example, in a single user session, the output of the user's actions is routed back to the single remote user and the sole user is always the hub controller. In a tutored session the output of the active user (the tutor) is also routed to all other (students) users, through a single hub common to all of them. The hub controller is always the tutor user. Students joining the session late are sent an exclusive update of the current state of the session, obtained from the stored objects already written during the session as they are added to the hub. In a share session, all users in the session share the one hub. The first user to join the session is designated as the hub controller. The hub controller's action and any output that they generate are broadcast to all users, no other user can write to the hub because:

a) They are not the hub controller and only the hub controller can write to the hub (checks are made before writing).

b) Provision for input is disabled at the client (browser) side for non-active shared users.

Only one user at a time can change the hub controller, this ensures that both of the above conditions are in place while there is potential for data to be written to the hub. Again, this is achieved by the synchronisation mechanism in java, which permits only one thread to access a given object (in this case the hub) and call its methods. Since the only means of accessing the streams encapsulated by the hub is through the hubs methods no writing or changing of the hub controller is possible while this operation is being performed. As with the teaching by showing session, new users are updated with the current stage of the session as they join.

In a supervised session, every supervised user possesses a single hub, which is shared with their supervisor. The supervisor holds these multiple hubs and accesses each by reference to the supervised user's name to whom they belong. For most of the time each hub broadcasts to a single user and it is this user that is the hub controller (comparable with the single user session). It is only when the supervising user takes over by adding his/her connection to the hub and assuming hub controller status that the input and output generated by the supervisor's actions are seen by both users. When the supervisor joins the hub, he/she is provided with the current state of the supervised user's progress in the same way as the other sessions update new users joining the hub. Similarly, when the supervisor finishes, the hub controller is reset to the original user and the supervisor's connection is removed from the hub.

In the case of the Teaching-by-showing mode, if the user is a tutor, the server creates a new hub object for the tutor and adds the tutor's name to the list along with a reference to their hub object before allowing a Tutor Handler object to deal with the tutor client on a new thread. If the user intends to be a student user, the Server searches the list for the name of the student's tutor (the student user must supply this). It then retrieves the hub object associated with the session and the student can join the tutorial session. If the tutor's name is not present on the list, the connection to the prospective student client is refused with an appropriate error message. Otherwise, a student user handler on a new thread deals with the user.

Similarly, with sharing users, the additional user specified can join the session by indicating the session and providing the necessary credentials (account name and password). A new session can start with the term "New". "New" denotes that a new shared session is to be created and therefore a hub to accompany it is created. After this the procedure continues as described above with a new user's name being added to the list.

With a Supervisor user again the name is added to the list, a hub is created and a Handler is started on a new thread as before.

In the case of the Supervised user who has a new hub created, the procedure is slightly different: in this case the Supervised user's name is added to the personal list of the appropriate Supervisor, along with the Supervised user's hub.

Single users are added to a single hub that they use exclusively.

The server responds to this with server to client initialisation messages accordingly (Section 1.2 Appendix A). If a successful connection is made then the server handles the new connection on a new, separate thread of execution while it continues to listen for prospective clients.

Figure 18:
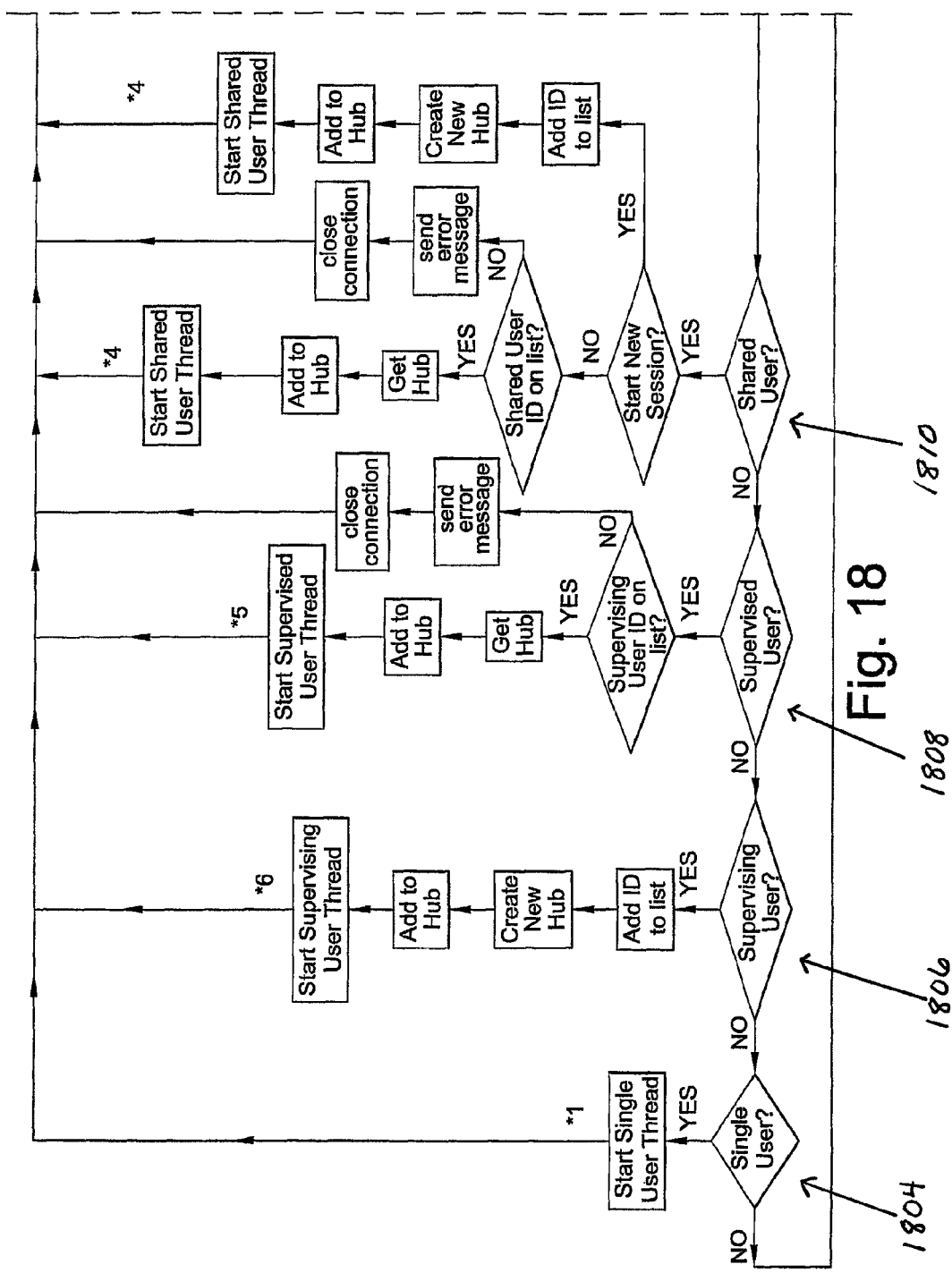
FIG. 18 depicts a flowchart of the functionality of the server side software structure.
Figure 18:
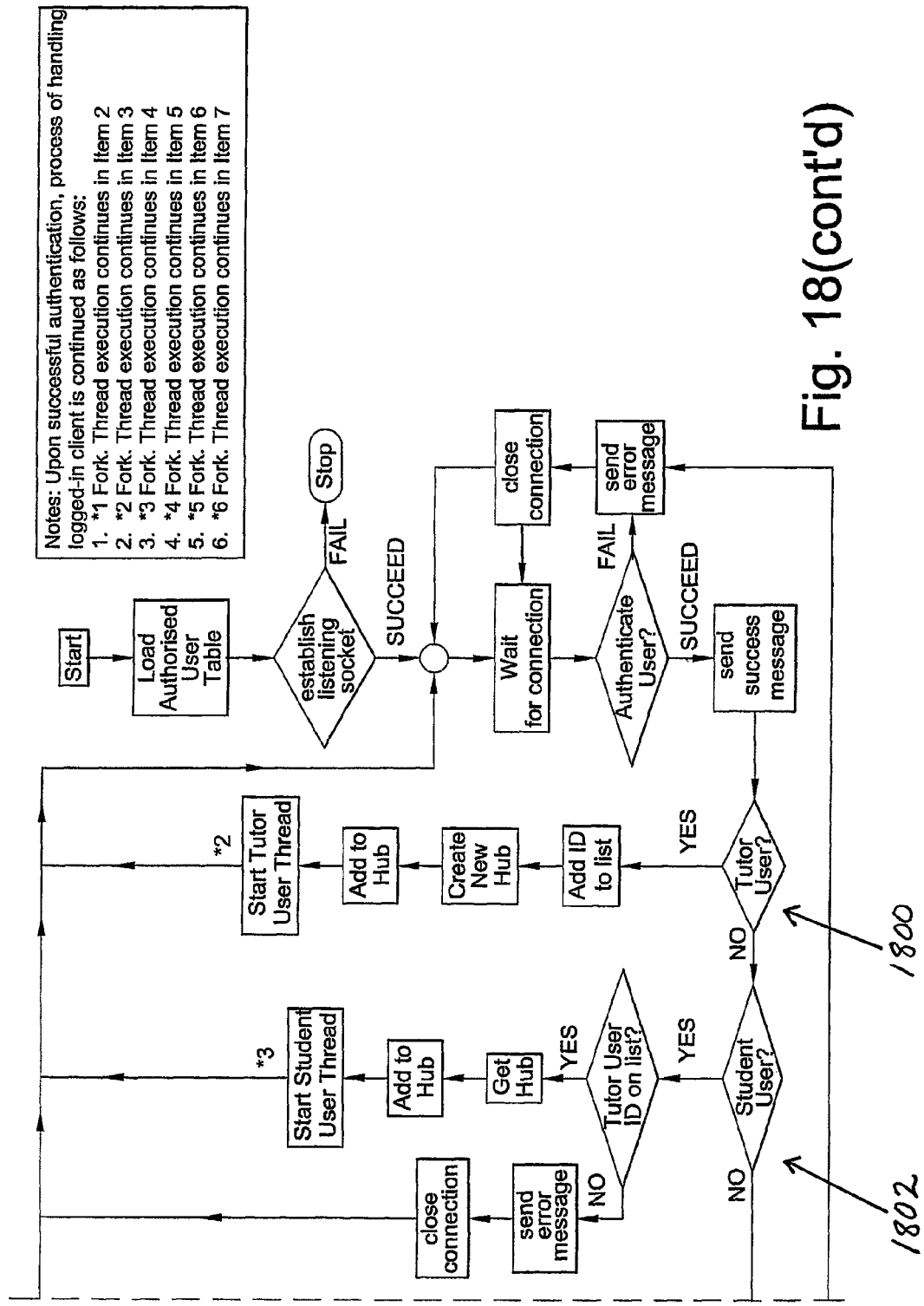

A schematic representation of the server functionality is provided in the flowchart shown in FIG. 18 which depicts the six categories (or sub-processes) of user; tutor user 1800, student user 1802, single user 1804, supervising user 1806, supervised user 1808 and shared user 1810, each of which will be described below.

Figure 19:
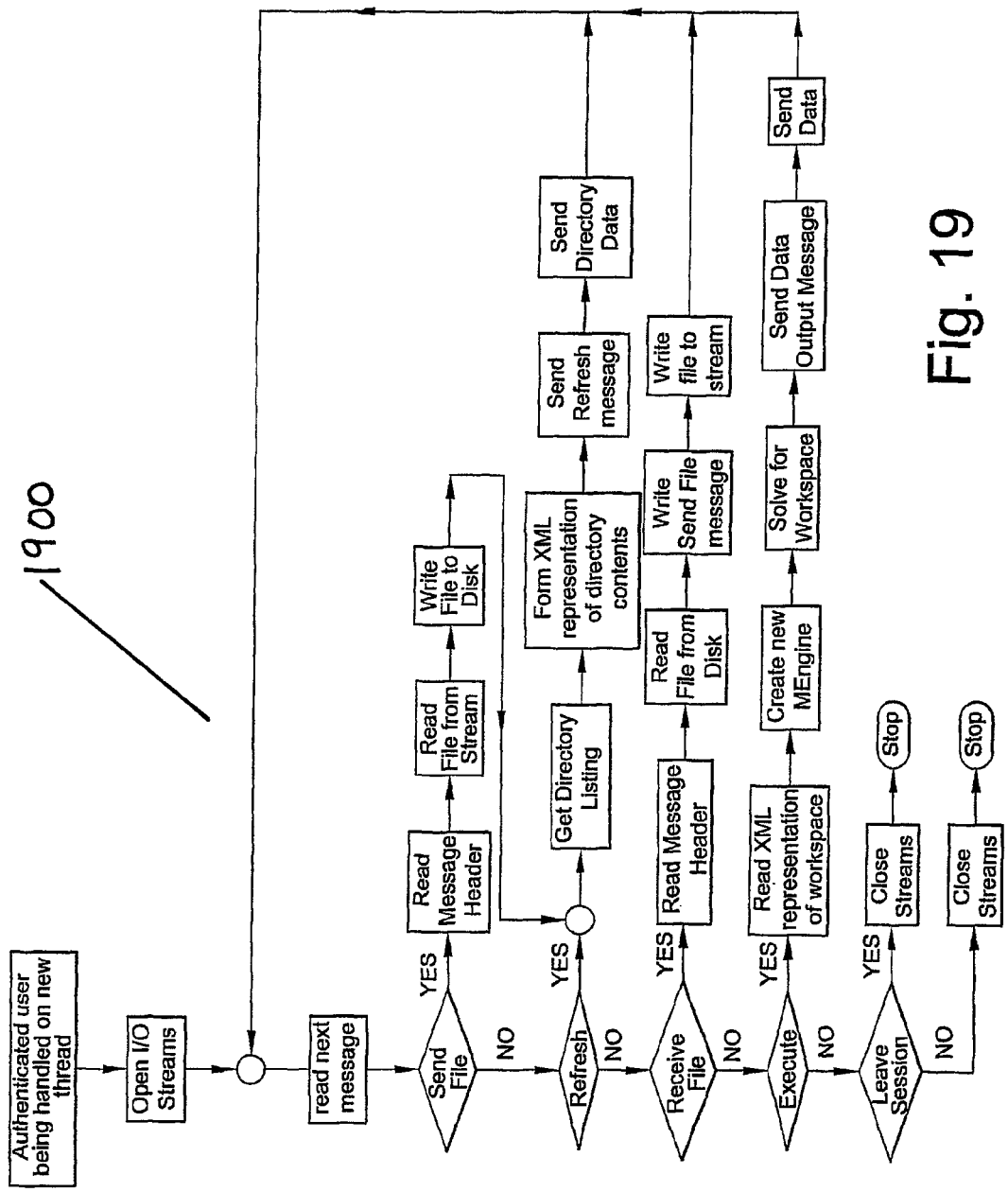
FIG. 19 is a flowchart of the single user handler sub-process within the server side software structure.

The Single User handler is a sub process 1900 shown schematically in the flowchart in FIG. 19 that runs on its own individual thread, receiving incoming requests from the remote user it was assigned to handle and acting in accordance with the Protocol Specification detailed in Appendix A. After initialisation, which involves adding the output data stream to the hub, the handler enters a loop, continuously listening for incoming messages until terminated either by catastrophic failure (system shutdown) or on the user's command.

This handler acts in a similar way to a Tutor User handler 1800, described in detail below, but with two main differences.

a) It only permits one client to connect to the hub b) Output is directed only to this single client.

Figure 20:
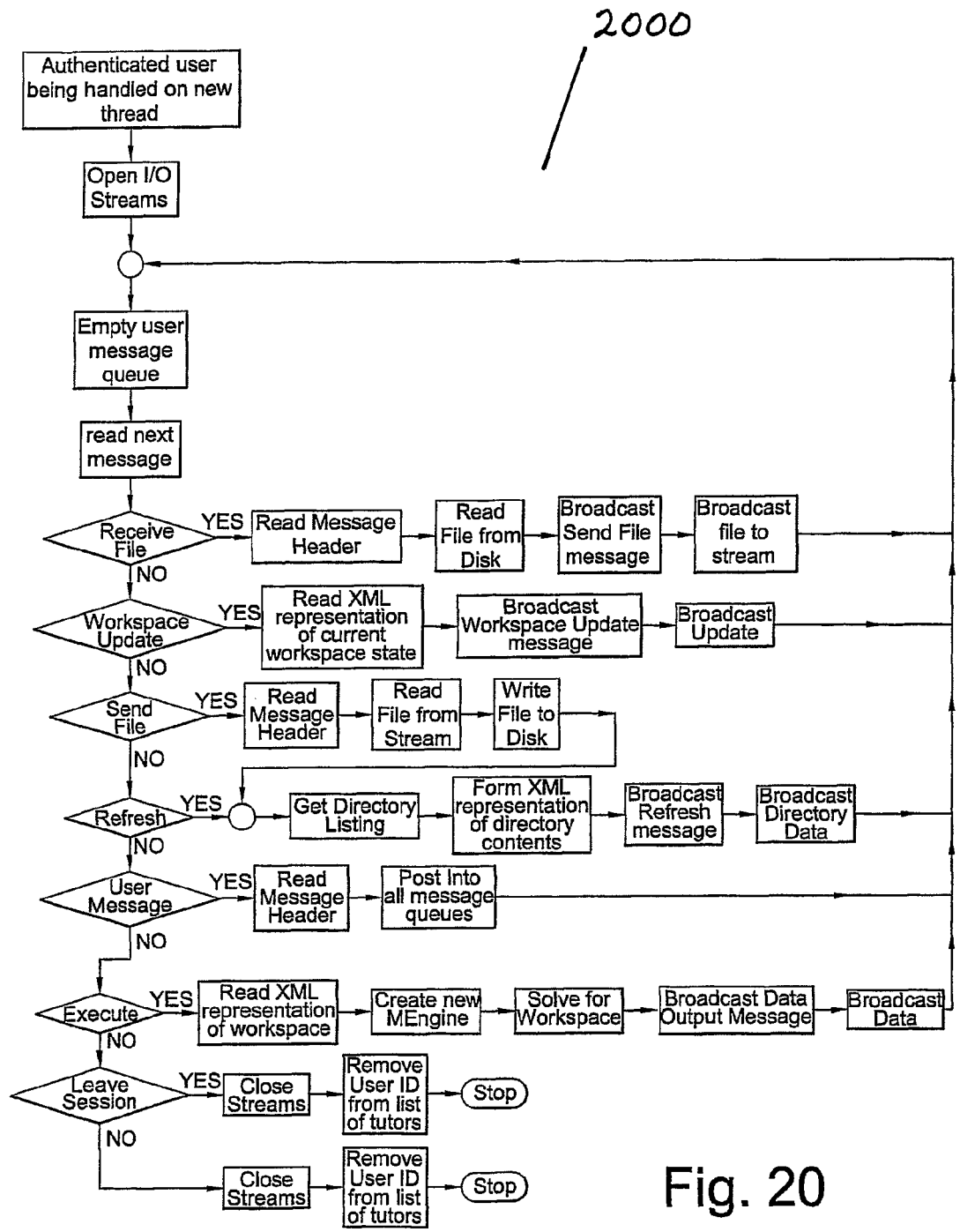
FIG. 20 is a flowchart of the tutor handle sub-process within the server side software.

The Tutor User handler is a sub process 2000, shown in the flowchart in FIG. 20, that runs on its own individual thread, receiving incoming requests from the remote user it was assigned to handle and acting in accordance with the Protocol Specification detailed in Appendix A. After initialisation, which involves adding the output data stream to the hub, the handler enters a loop, continuously listening for incoming messages until terminated either by catastrophic failure or on the users command. Once the hub has been initialised, other users may attach themselves to it passively (Student users only).

At the beginning of each loop, before handling any messages, the handler checks its message queue for text messages from other users; any messages are retrieved from the queue and posted to the Hub to be distributed to all attached clients. Text messages are not necessarily personal; any user can see whom the message is from and to whom it is intended, although a remote client may be configured to ignore messages not addressed to its user. The next step is to read a single byte from the network connection to determine the type of the incoming message; one of seven message types, as described in Appendix A, is possible. Namely: 2.5 (User Message) and 2.7 (Leave Session), 2.1 (Workspace Update), 2.2 (Remote Directory Refresh), 2.3 (Send File), 2.4 (Receive File) and 2.6 (Execute). A "Workspace Update" message contains a hierarchical representation of the remote users workspace in XML format. Upon receipt of this the handler broadcasts a (3.2) "Workspace Update" to all users through the Hub. A "Remote Directory Refresh" message is intended to update the file browser window on the remote client with the current contents of the remote directory.

"Send File" (2.3) takes a file sent from the remote client and stores it locally, while "Receive File" (2.4) takes a locally stored file and sends it to all clients through the Hub. "Execute" (2.6) is possibly the most important message. Identical in both structure and content to 2.1 (Workspace Update), the "Execute" (2.6) message passes the workspace representation to a parser/generator which converts the XML representation of the workspace into concrete code which can then be executed line by line. The response produced is 3.1 (Data Output), which sends back the results of the generated code execution in the form of a list of objects representing the output variables. At the client end of the connection, the data is plotted and a graphical representation of the data is produced, thereby avoiding the need for a high bandwidth connection to send graphics.

Upon receipt of a "User Message" message the handler reads the name of recipient in order to locate the thread the recipients handler is executing on. By obtaining the thread of recipient handler the sender handler can then post the message into the recipient's text message queue. A "Leave Session" message contains no parameters and is simply an instruction to the handler to break out of the message listening loop, clean up and free any resources and halt its executing thread.

Figure 21:
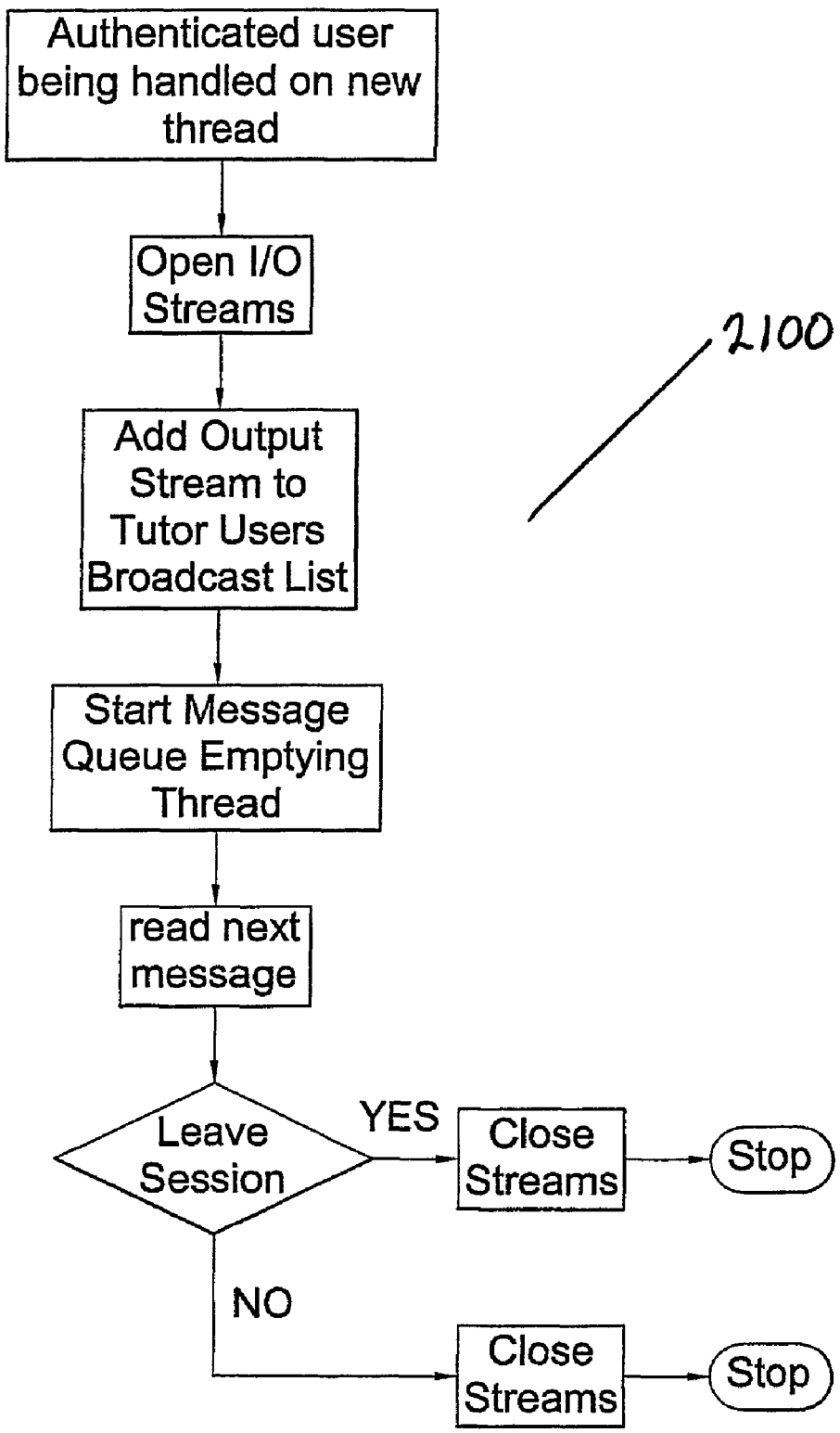
FIG. 21 is a flowchart of the student user handler sub-process with the server side software structure.

Reference is now made to the Student User handler sub process 2100, shown in the flowchart in FIG. 21, which runs on its own individual thread, receiving incoming requests from the remote user it was assigned to handle and acting in accordance with the Protocol Specification detailed in Appendix A. All shared users receive output from a common Hub object, but only one user at a given time can be the designated Hub controller; the user whose actions and their consequences are broadcast to all users on the Hub. After initialisation, which involves adding the output data stream to the Hub, the handler starts a loop on a new thread, continuously listening for the text message queue to fill up until terminated either by the main handler thread. The main handler thread awaits any incoming messages from the connection. Because Student users are entirely passive, only one possible message will be incoming, 2.7 (Leave Session) detailed in Appendix A. A "Leave Session" message contains no parameters and is simply an instruction to the handler to terminate, free any resources and halt any child thread executing.

Figure 22:
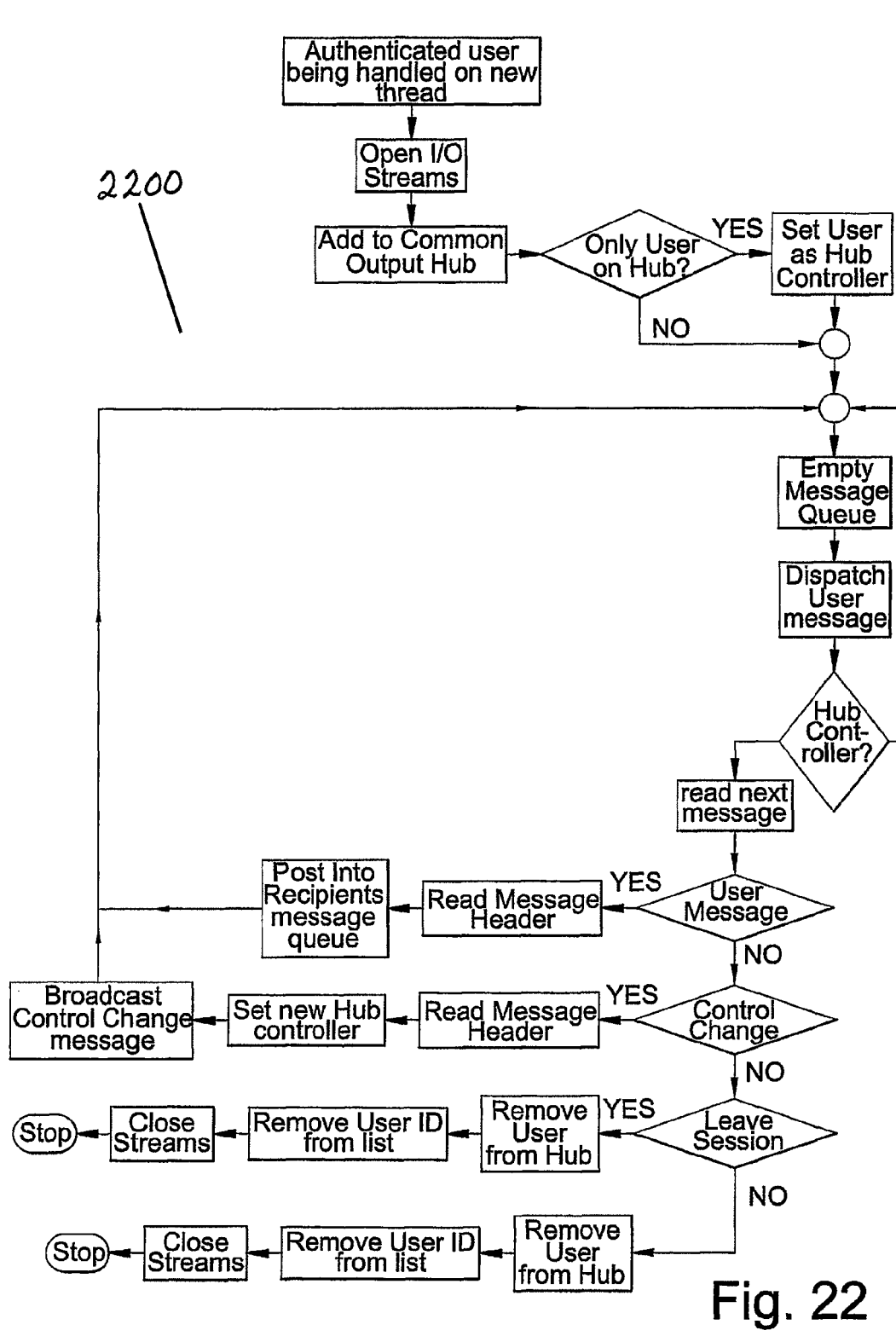
FIG. 22 is a flowchart of the supervised user handler sub-process present within the server side software structure.
Figure 22:
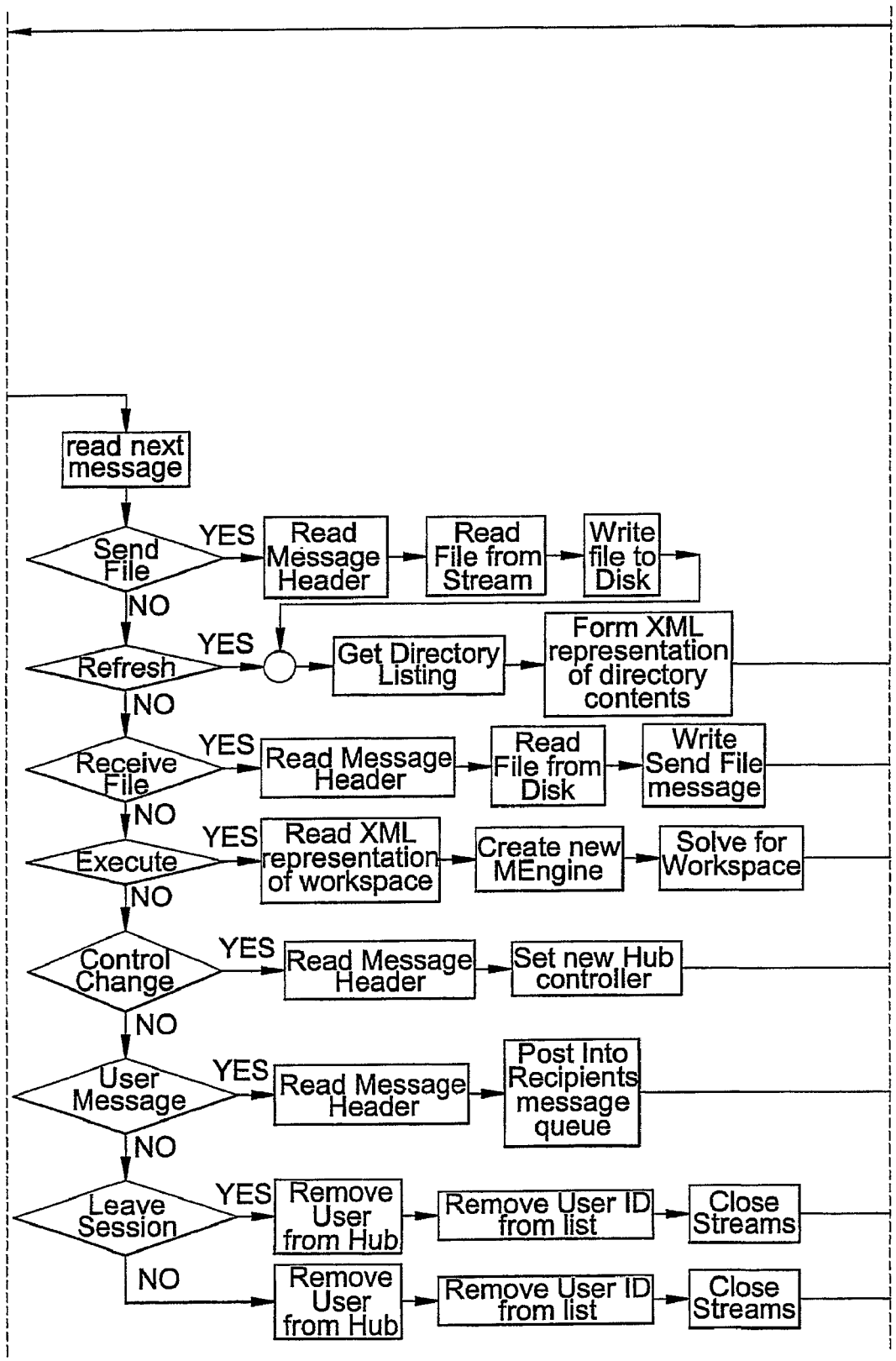
Figure 22:
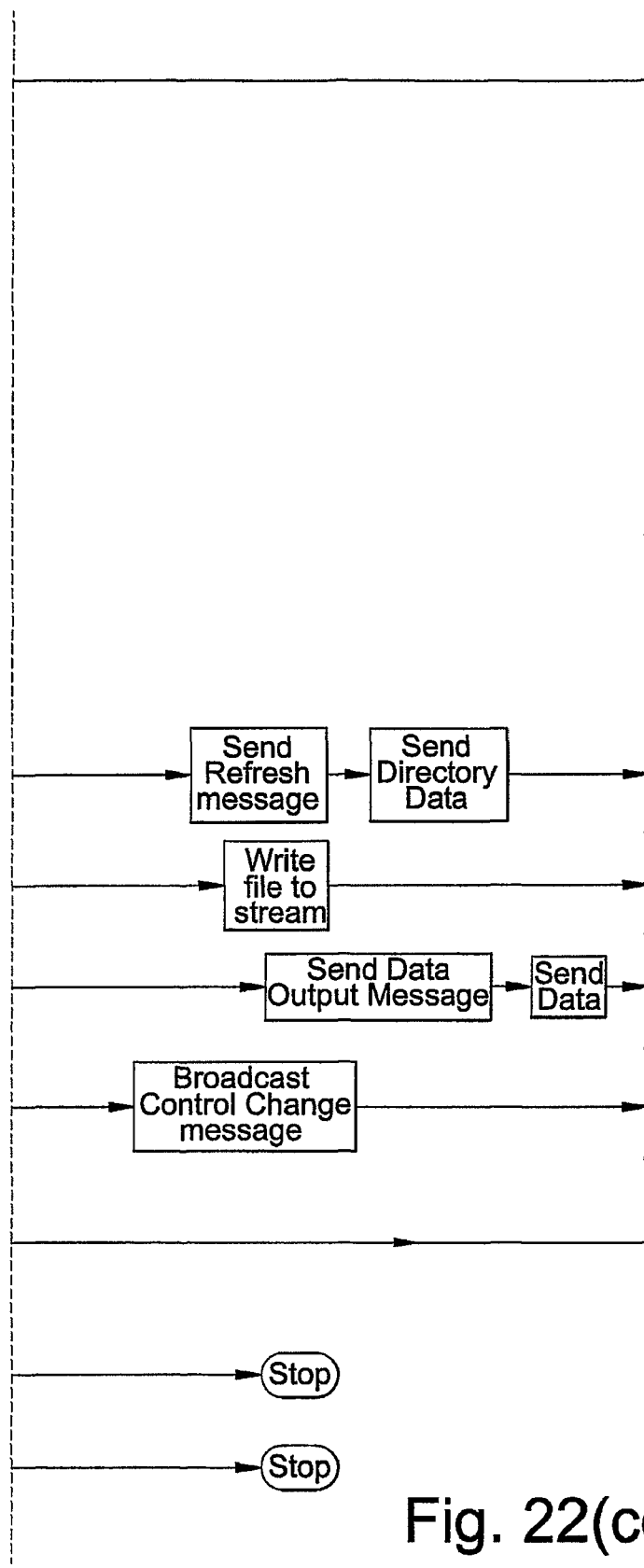

FIG. 22 is a schematic diagram of the Supervised User handler sub process 2200 that runs on its own individual thread, receiving incoming requests from the remote user it was assigned to handle and acting in accordance with the Protocol Specification detailed in Appendix A. All supervised users possess a single Hub object that is also added to their supervisor's list of students Hubs. After initialisation, which involves adding the output data stream to the Hub, the handler enters a loop 2200, continuously listening for incoming messages until terminated either by catastrophic failure or on the users command.

At the beginning of each loop, before handling any messages, the handler checks its message queue for text messages from other users; any messages are retrieved from the queue and posted to the Hub to be distributed to all attached clients. Text messages are not necessarily personal; any user can see whom the message is from and to whom it is intended, although a remote client may be configured to ignore messages not addressed to its user.

The next step is to read a single byte from the network connection to determine the type of the incoming message. One of two possible message subsets of the message protocol specified in Appendix A are encountered by the handler depending on whether the user attached to the handler is in control of the Hub (the active user in a supervised session) or the user designated as supervisor to this session has taken control of the Hub.

As Hub controller (the unsupervised state) there are seven possible messages. These are 2.5 (User Message), 2.7 (Leave Session) and 2.8 (Control Change), 2.1 (Workspace Update), 2.2 (Remote Directory Refresh), 2.3 (Send File), 2.4 (Receive File) and 2.6 (Execute). A "Workspace Update" message contains a hierarchical representation of the remote users workspace in XML format. Upon receipt of this the handler broadcasts a (3.2) "Workspace Update" through the Hub to the user. A "Remote Directory Refresh" message is intended to update the file browser window on the remote client with the current contents of the remote directory.

Upon receipt of a "User Message" message the handler reads the name of recipient in order to locate the thread the recipients handler is executing. By obtaining the thread of recipient handler the sender handler can then post the message into the recipient's text message queue. A "Leave Session" message contains no parameters and is simply an instruction to the handler to break out of the message listener loop, free any resources and halt its executing thread.

"Control Change" (2.8) messages differ slightly from those used in other client handlers, in that upon receipt of such a message the Hub users are dynamically changed. When a message arrives with the control switch set to gain and the user name set to that of the session supervisor, the controller of the users Hub is set to be the supervising user. The supervising user is also added to the Hub causing output to be relayed to both supervised and supervising users.

"Send File" takes a file sent from the remote client and stores it locally, while "Receive File" takes a locally stored file and sends it to all clients through the Hub. "Execute" is possibly the most important message. Identical in both structure and content to 2.1 (Workspace Update), the "Execute" message passes the workspace representation to a parser/generator which converts the XML representation of the workspace into concrete code which can then be executed line by line. The response produced is 3.1 (Data Output), which sends back the results of the generated code execution in the form of a list of objects representing the output variables. At the client end of the connection, the data is plotted and a graphical representation of the data is produced, thereby avoiding the need for a high bandwidth connection to send graphics.

While the user is being supervised there are only three possible incoming messages. Common to the Hub controller loop are 2.5 (User Message) and 2.7 (Leave Session) that produce identical reactions.

Receipt of the "Control Change" message while under supervision means that the supervisor has abandoned control of the user, the supervisor has been removed from the Hub and the user is now designated as the controller of his/her own Hub again.

Figure 23:
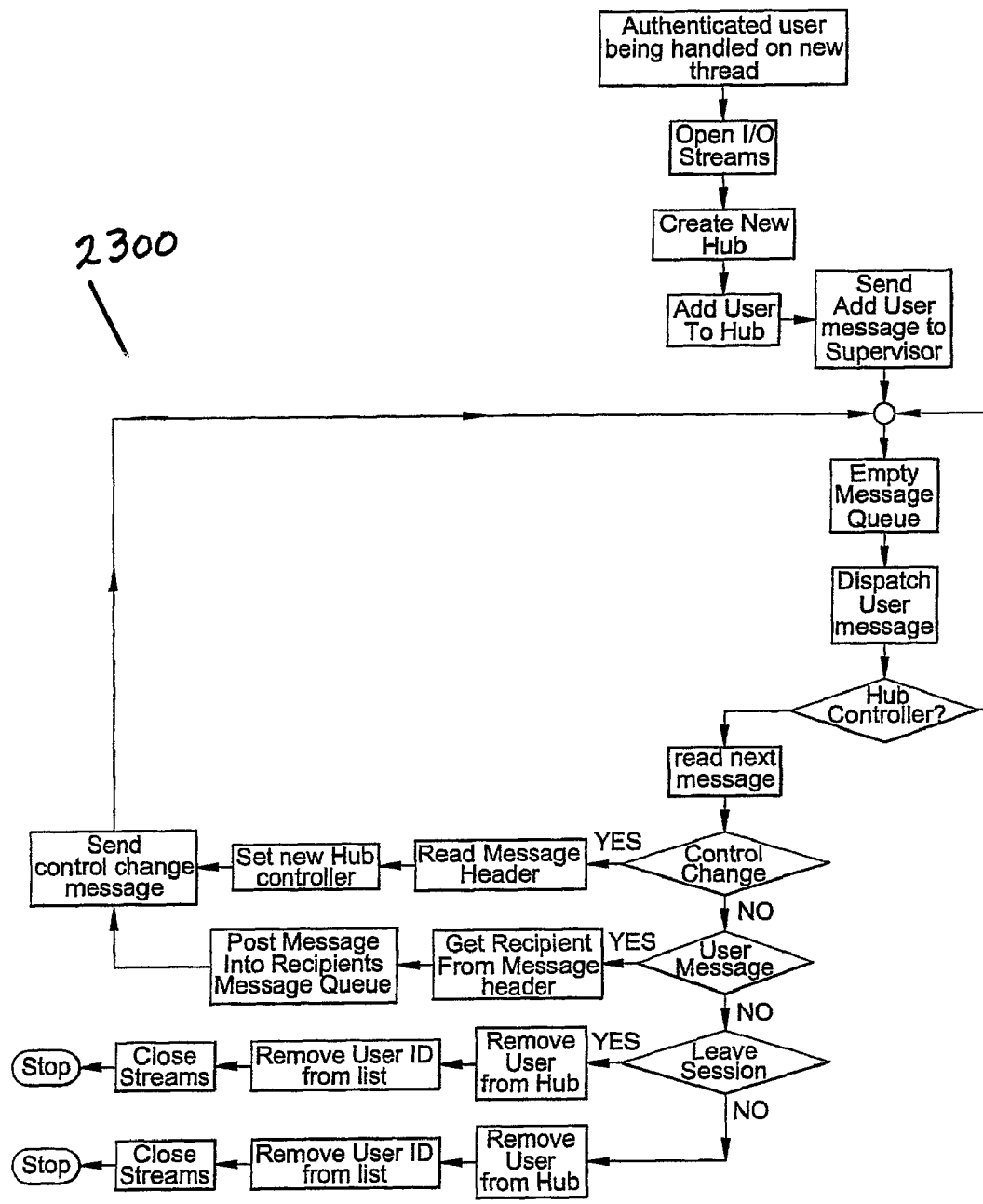
FIG. 23 is a flowchart of the supervisor user handler sub-process present within the service side software structure.
Figure 23:
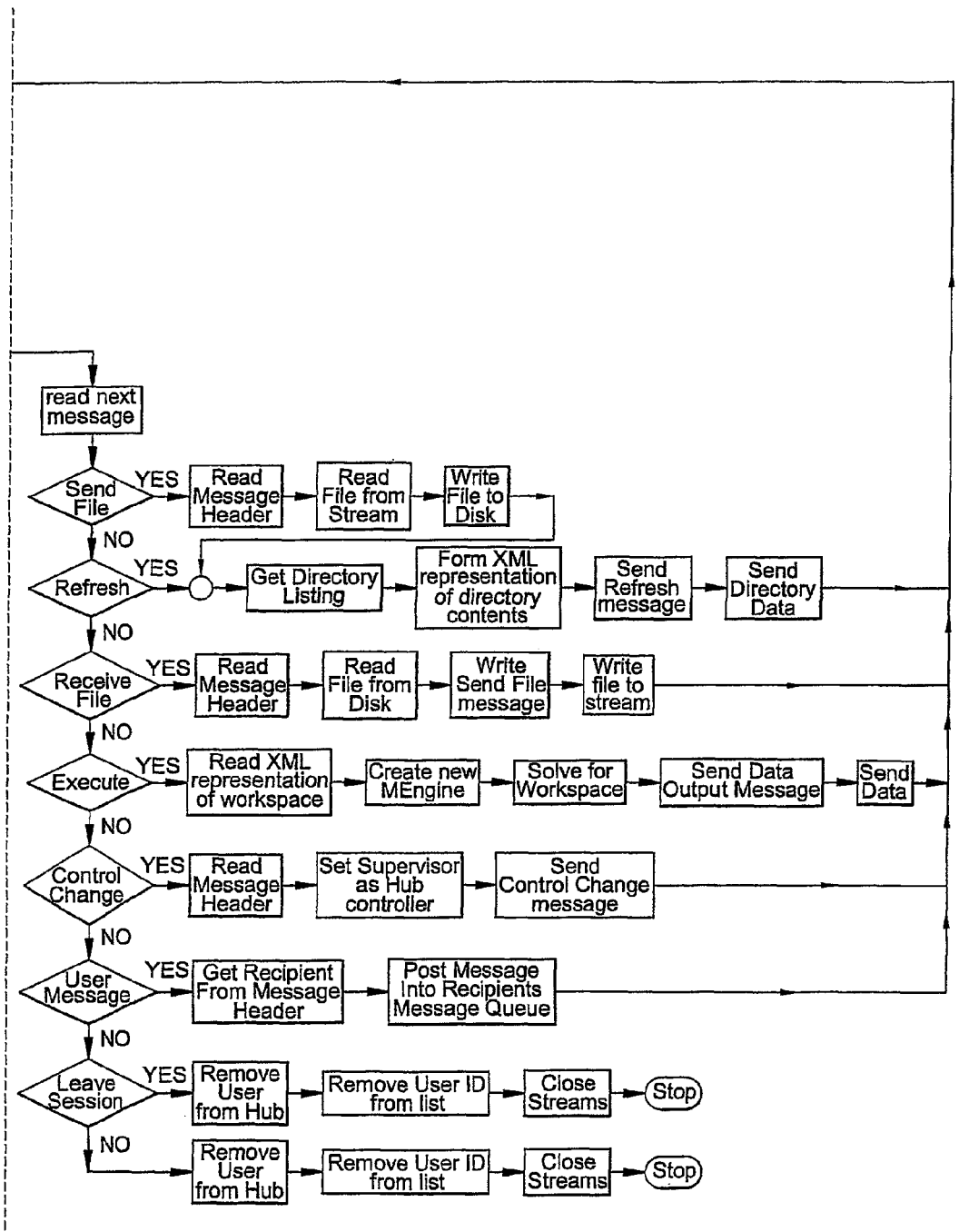

The Supervising User handler shown in the flowchart of FIG. 23 is a sub-process 2300 that runs on its own individual thread, receiving incoming requests from the remote user it was assigned to handle and acting in accordance with the Protocol Specification detailed in Appendix A. Supervising users do not possess any personal instance of a Hub object but instead possess a list of references to their supervised users' Hubs.

At the beginning of each loop, before handling any messages, the handler checks its message queue for text messages from other users; any messages are retrieved from the queue and posted to the user through their connection. Unlike the other handler objects, messages sent to a supervised user are personal and are not be copied to any other user.

The next step is to read a single byte from the network connection to determine the type of the incoming message. One of two possible message subsets of the message protocol specified in Appendix A are encountered by the handler depending on whether the user attached to the handler is in control of the Hub (the active user in a supervised session).

While the user is not providing supervision to another user, there are only three possible incoming messages. These are 2.5 (User Message), 2.7 (Leave Session) and 2.8 (Control Change). Upon receipt of a "User Message" message the handler reads the name of recipient in order to locate the thread the recipients handler is executing on. By obtaining the thread of recipient handler the sender handler can then post the message into the recipient's text message queue. A "Leave Session" message contains no parameters and is simply an instruction to the handler to break out of the message listening loop, free any resources and halt its executing thread.

The "Control Change" message originates with the supervisors remote client and is triggered manually by the supervisor usually upon receipt of a text message from the user he is about take control of.

The message has the control switch set to "lose" and the user name set to that of the supervised user requiring assistance. The user name is used to select the Hub of the supervised user from a list, attach the supervising user to it and take control of it. All input to the Hub now comes from the supervisor while output is broadcast to both the supervised and supervising users.

At a Hub controller there are seven possible messages. Common to the non-Hub controller loop are 2.5 (User Message) and 2.7 (Leave Session) that produce identical reactions. The remaining messages are 2.1 (Workspace Update), 2.2 (Remote Directory Refresh), 2.3 (Send File), 2.4 (Receive File) and 2.6 (Execute). A "Workspace Update" message contains a hierarchical representation of the remote users workspace in XML format. Upon receipt of this the handler broadcasts a (3.2) "Workspace Update" to all users through the Hub. A "Remote Directory Refresh" message is intended to update the file browser window on the remote client with the current contents of the remote directory.

"Send File" takes a file sent from the remote client and stores it locally, while "Receive File" takes a locally stored file and sends it to all clients through the Hub.

"Execute" is possibly the most important message. Identical in both structure and content to 2.1 (Workspace Update), the "Execute" message (2.6) passes the workspace representation to a parser/generator which converts the XML representation of the workspace into concrete code which can then be executed line by line. The response produced is 3.1 (Data Output), which sends back the results of the generated code execution in the form of a list of objects representing the output variables.

A "Control Change" message is received within the Hub controller loop when the supervisor relinquishes control of the Hub. This message only ever emanates from the supervising user's remote client and contains the supervisor user's name and the control switch set to "lose". Receipt of this message removes the supervisor from the supervised user's Hub, sets the supervised user back in control of the Hub and sends a "Control Change" message with the control flag set to "gain" to the supervised user. The supervisor then returns to the non-Hub controller loop.

Figure 24:
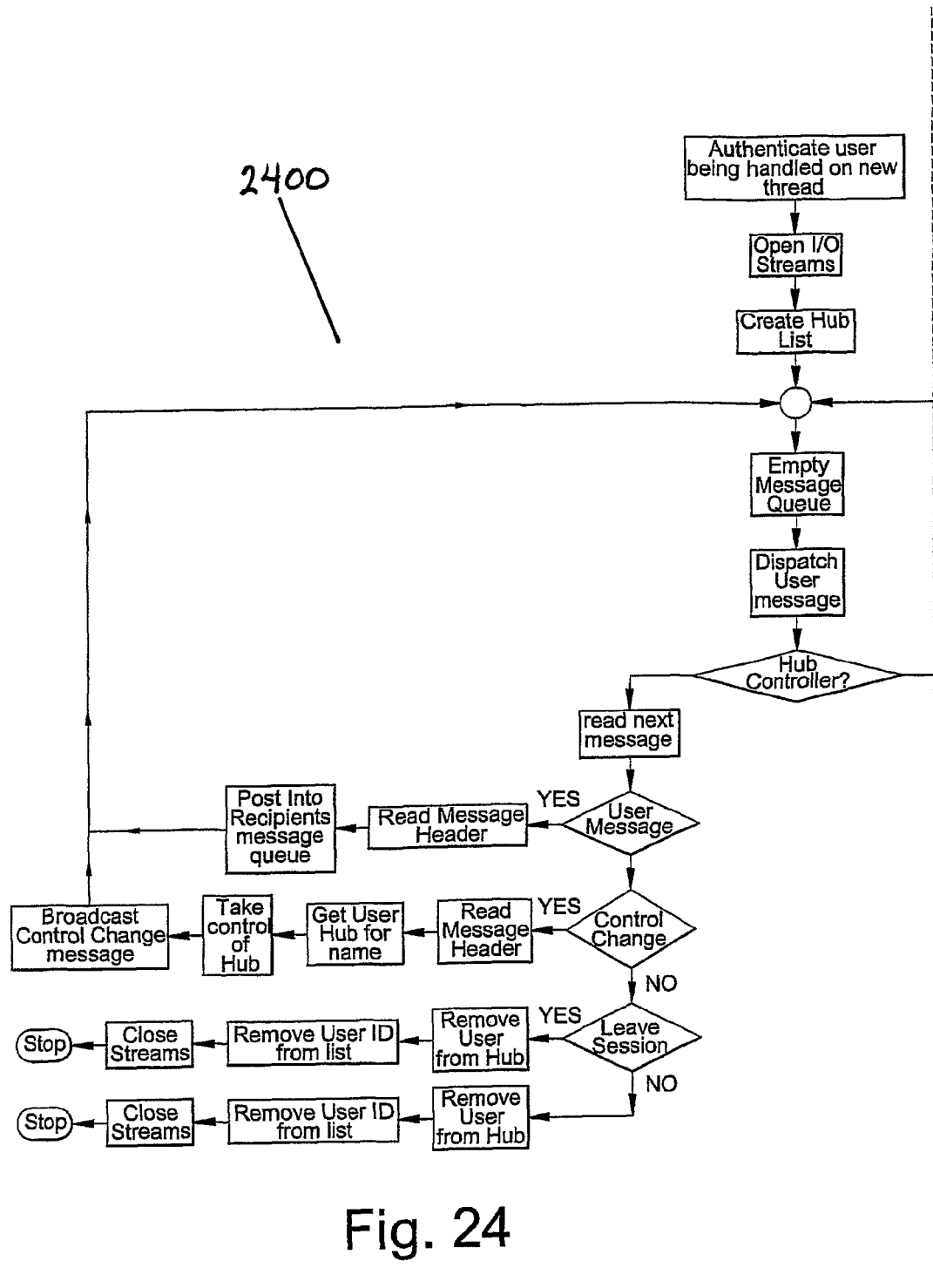
FIG. 24 is a flowchart of the shared user handler sub-process present within the server side software shown in FIG. 18.
Figure 24:
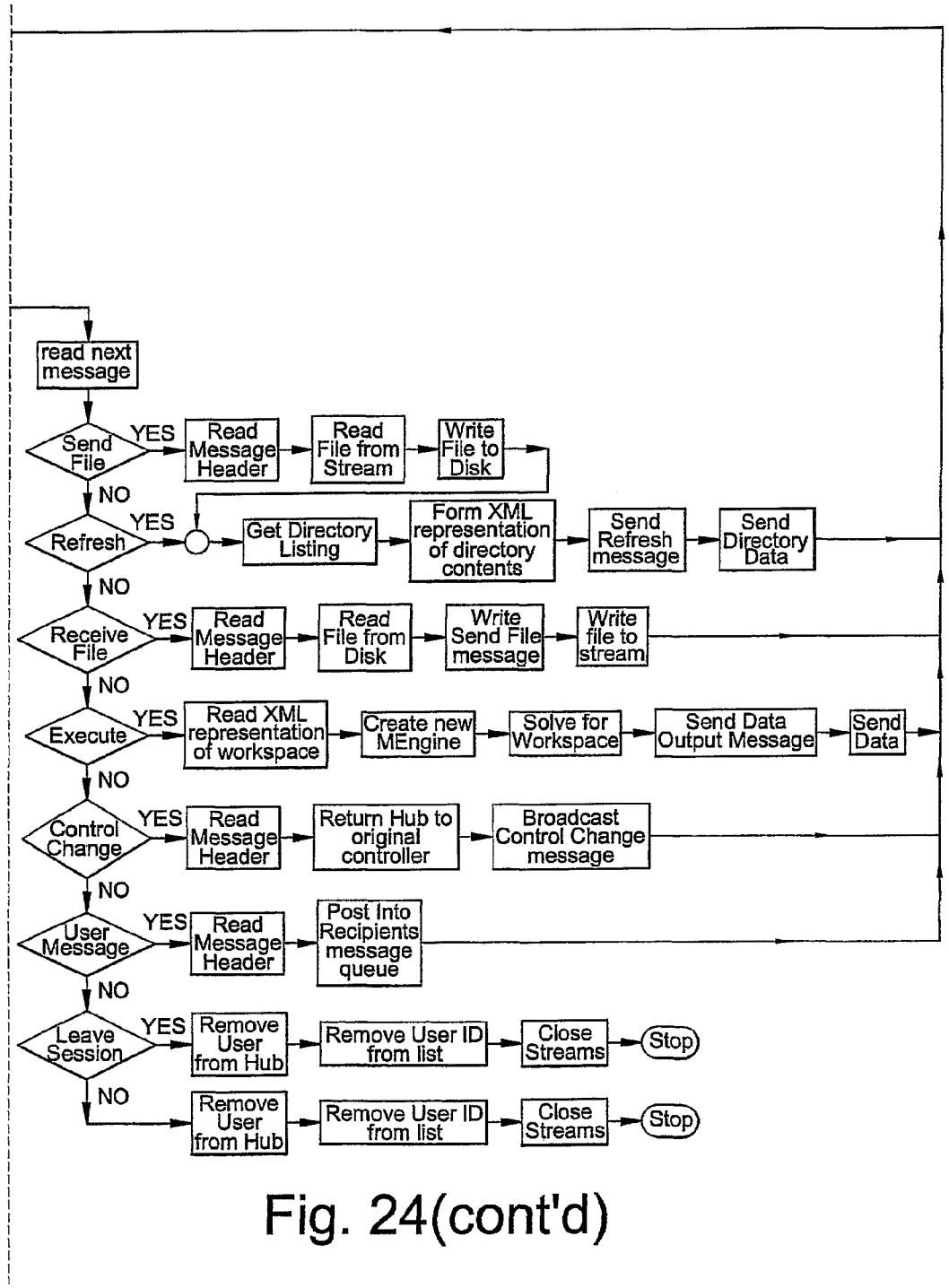

The Shared User handler sub process 2400 shown schematically in the flowchart of FIG. 24 runs on its own individual thread, receiving incoming requests from the remote user it was assigned to handle and acting in accordance with the Protocol Specification detailed in Appendix A. All shared users receive output from a common Hub object, but only one user at a given time can be the designated Hub controller, the user whose actions and their consequences are broadcast to all users on the Hub. After initialisation, which involves adding the output data stream to the Hub, the handler enters a loop 2300, continuously listening for incoming messages until terminated either by catastrophic failure or on the users command.

At the beginning of each loop, before handling any messages, the handler checks its message queue for text messages from other users; any messages are retrieved from the queue and posted to the Hub to be distributed to all attached clients. Text messages are not necessarily personal; any user can see whom the message is from and to whom it is intended, although a remote client may be configured to ignore messages not addressed to its user. The next step is to read a single byte from the network connection to determine the type of the incoming message. One of two possible message subsets of the message protocol specified in Appendix A are encountered by the handler depending on whether the user attached to the handler is in control of the Hub (the active user in a shared session).

If the user attached to the handler is not in control of the shared session they are part of, there are only three possible incoming messages. These are 2.5 (User Message), 2.7 (Leave Session) and 2.8 (Control Change). Upon receipt of a "User Message" message the handler reads the name of recipient in order to locate the thread the recipients handler is executing on. By obtaining the thread of recipient handler the sender handler can then post the message into the recipient's text message queue. A "Leave Session" message contains no parameters and is simply an instruction to the handler to break out of the message listening loop, clean up and free any resources and halt its executing thread.

The "Control Change" message contains a user name and a switch set to either "gain" or "lose". If the user name included in the message is equal to the name of the user associated with the handler and the switch is set to "gain" then the Hub controller is set to be that of the user. A "Control Change" message is then broadcast through the Hub to all users with the control switch set to "gain" and the user name set to that of the handler. The user then is in control of the Hub and so encounters a different set of possible messages.

At a Hub controller there are seven possible messages. Common to the non-Hub controller loop are 2.5 (User Message) and 2.7 (Leave Session) that produce identical reactions. The "Control Change" mechanism is different although the message format is the same. If the user name included in the message is not the same as the user associated with the handler and the switch is set to "gain", the handler ceases to be the controller of the Hub and a "Control Change" message is broadcast through the Hub bearing the new Hub controllers name and the control switch set to "gain".

The remaining messages are 2.1 (Workspace Update), 2.2 (Remote Directory Refresh), 2.3 (Send File), 2.4 (Receive File) and 2.6 (Execute). A "Workspace Update" message contains a hierarchical representation of the remote users workspace in XML format. Upon receipt of this the handler broadcasts a (3.2) "Workspace Update" to all users through the Hub. A "Remote Directory Refresh" message is intended to update the file browser window on the remote client with the current contents of the remote directory.

"Send File" takes a file sent from the remote client and stores it locally, while "Receive File" takes a locally stored file and sends it to all clients through the hub. "Execute" is possibly the most important message. Identical in both structure and content to 2.1 (Workspace Update), the "Execute" message passes the workspace representation to a parser/generator which converts the XML representation of the workspace into concrete code which can then be executed line by line. The response produced is 3.1 (Data Output), which sends back the results of the generated code execution in the form of a list of objects representing the output variables. At the client end of the connection, the data is plotted and a graphical representation of the data is produced, thereby avoiding the need for a high bandwidth connection to send graphics.

Figure 25:
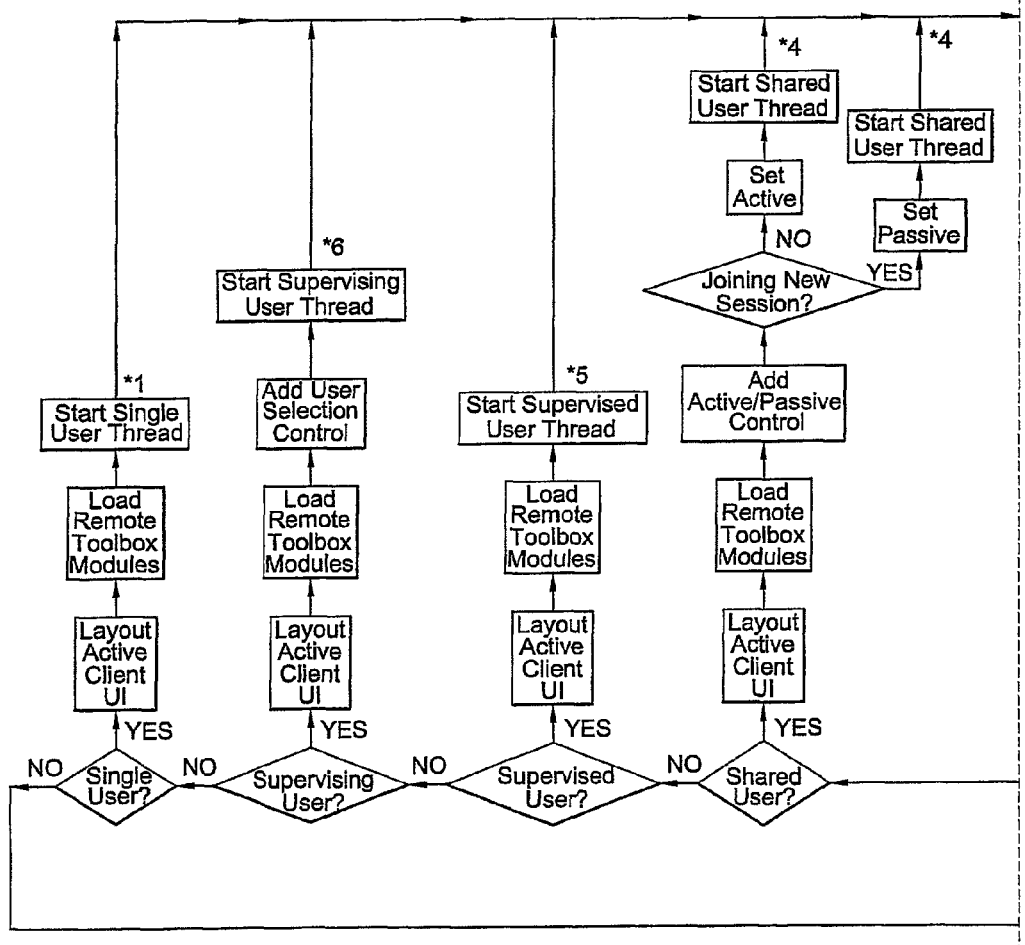
FIG. 25 is a flowchart of the functionality of the client (user) side software.
Figure 25:
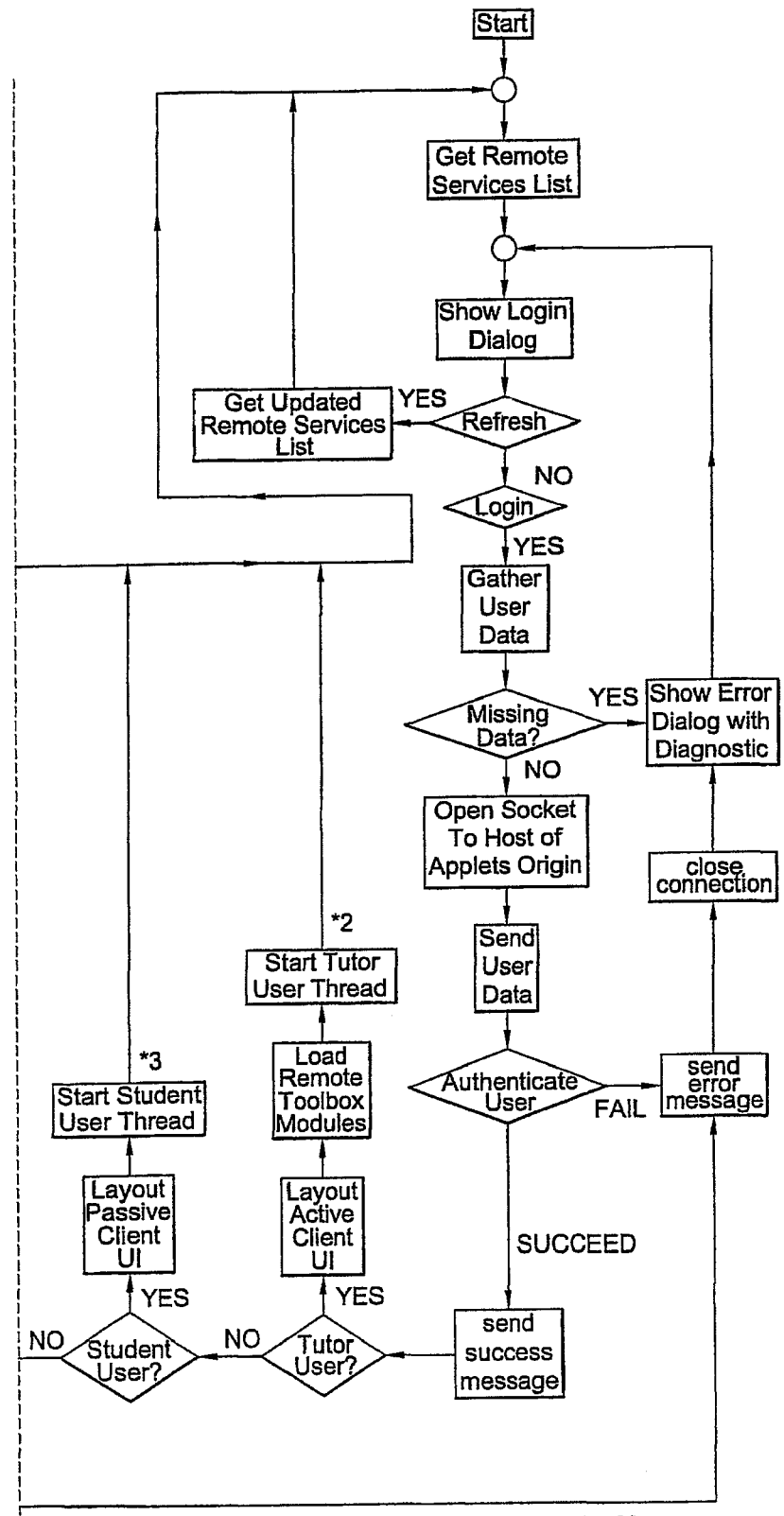

The client software structure will now be described. This software structure overview 2500 is shown in the flowchart in FIG. 25 and must be activated on all client machines wishing to connect to a designated Matlab/Octave server.

The "clients" take the form of single Java applets. The applet's initial state is common to all types of users—a single login dialog prompting the user for user name, password and user type. Depending on user type selected (e.g. tutor, student, etc.), the user may also be prompted to select a user from a drop down list of additional user names; these may be sharing, tutor or supervisor users. These lists are in accordance with the contents of the server side lists of session data and can be updated by means of a refresh button—an action which causes the applet to read in a log file containing this data from its site of origin.

Upon submission of the requested user data, the applet makes a socket connection to a server residing on its host of origin and sends the data in the order and format specified in Appendix A, section 1.1. Failure at this stage is indicated by a message box with diagnostic information, followed by the opportunity to make further attempts at login. A successful login is met with the replacement of the login screen with the user interface corresponding to the user type selected.

All users have a workspace control that allows them to interact with the application hosted on the server machine, or where they can observe the activities of another user interacting with the application on the server machine.

Active users have a toolbox in the form of a tree control that contains blocks for building simulations, as shown in FIG. 5 (500). The modules that constitute the blocks reside on the server and are loaded dynamically, allowing additional blocks to be added. A module takes the form of a zip archive containing 40×40 monochrome bitmap to be used for the workspace representation, a 16×16 256 colour image to be used for the toolbox representation, an XML representation of the modules properties dialog and byte code (compiled Java code) mapping info for the function the block is bound to. Blocks are added to a workspace by means of a drag and drop mechanism and once added can be moved around and connected to other modules, e.g. FIGS. 4 and 5 (502).

Figure 26:
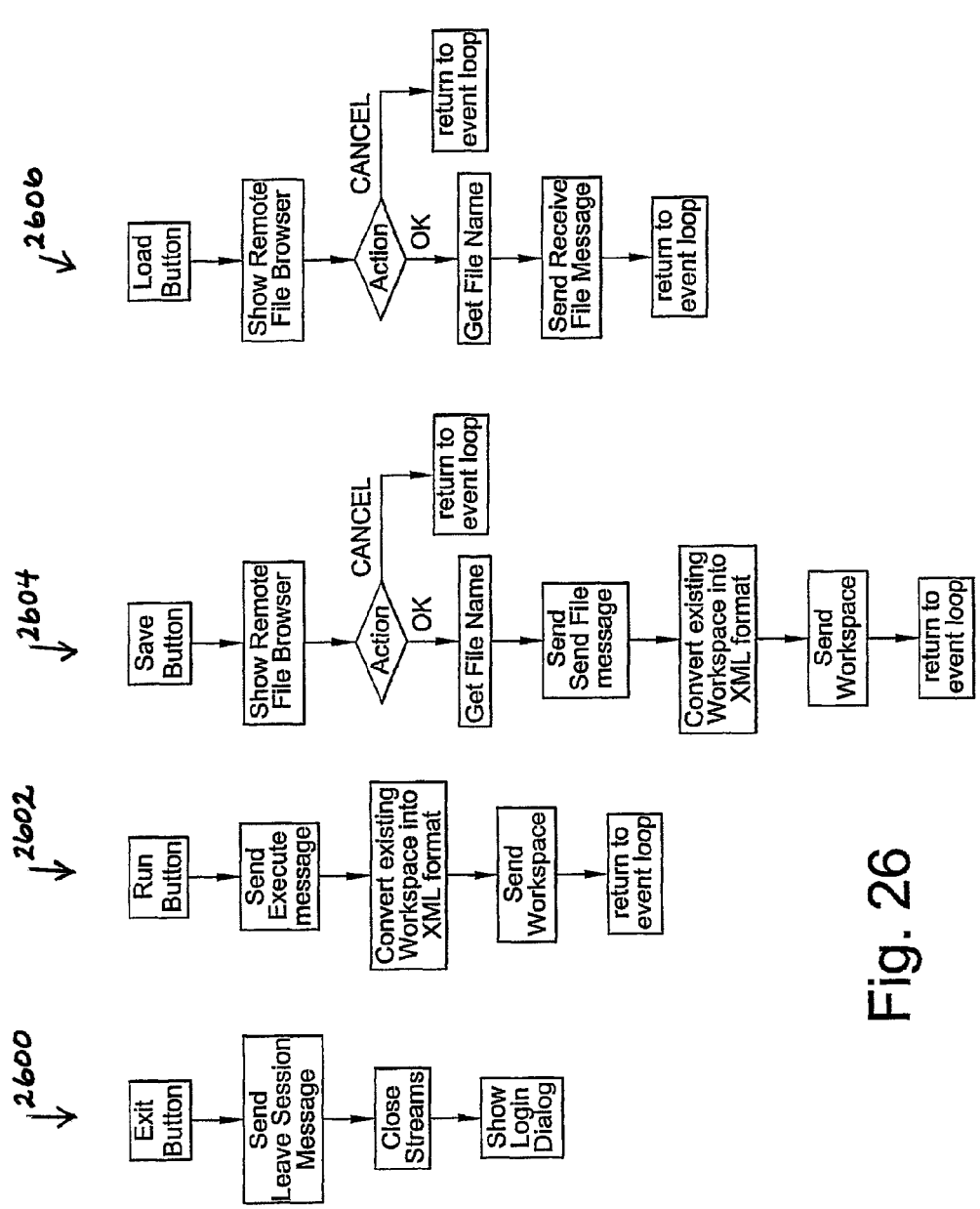
FIG. 26 depicts flowcharts illustrating the functionality of additional components in the user interface for J-Sim software.
Figure 26:
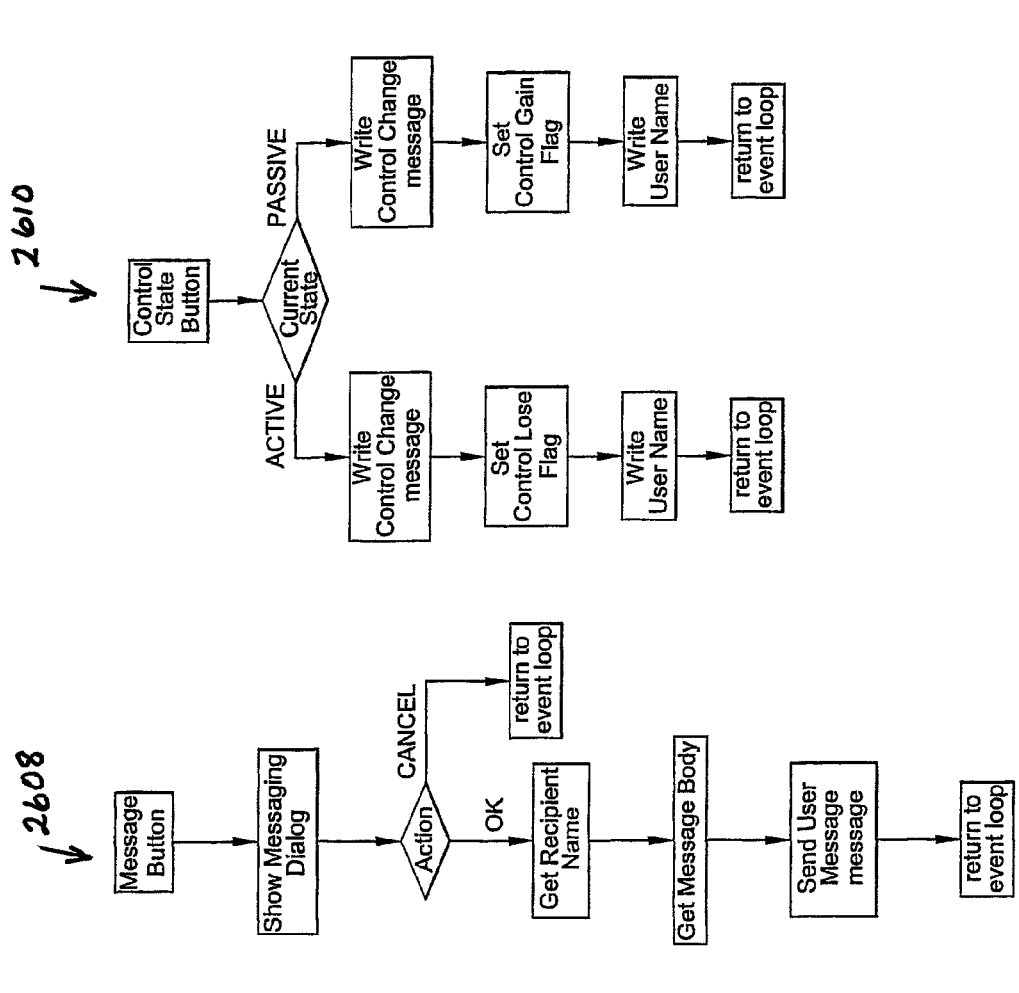
Figure 26:
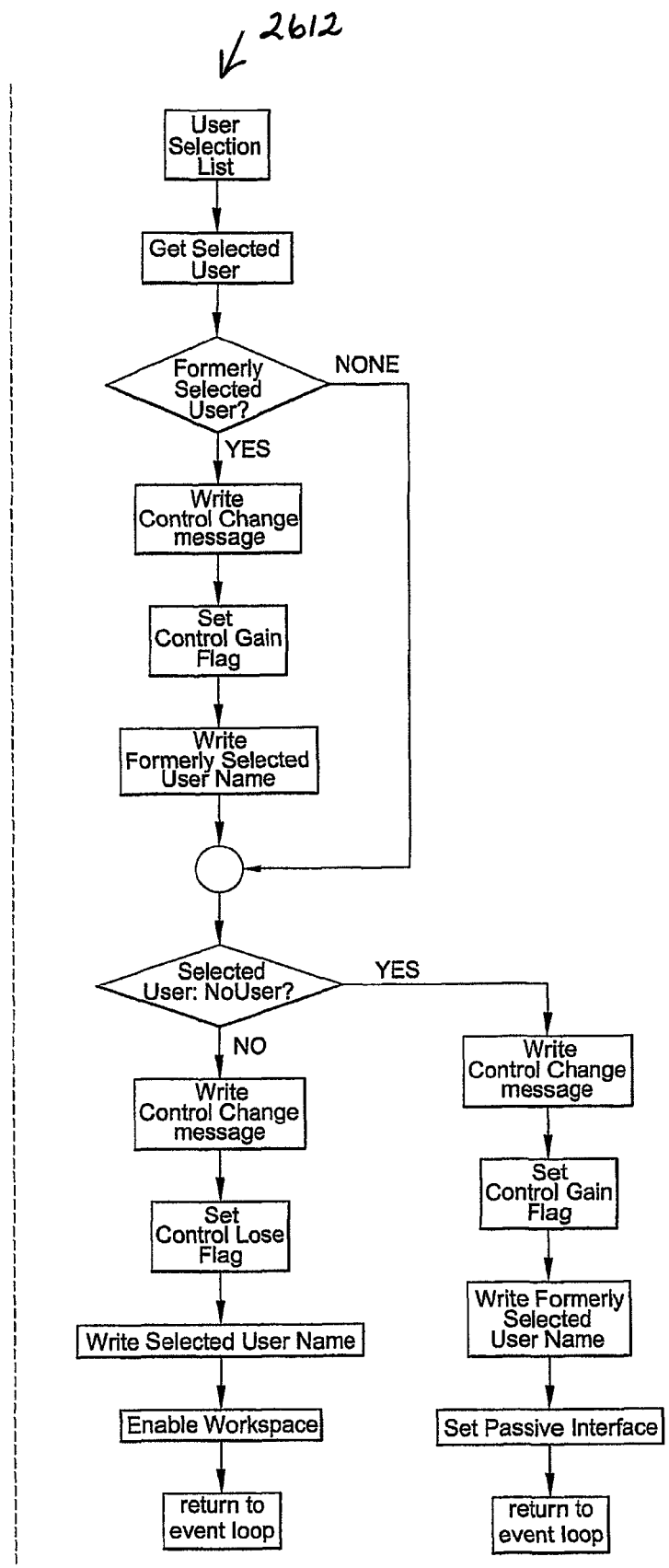

Additional functional components of the user interface, in addition to the main workspace are shown schematically in FIG. 26 and include: Exit Button 2600, Run Button 2602, Save Button 2604, Load Button 2606, Message Button 2608, Control State Button 2610 and User Selection List 2612 which are described as follows:

a) The "Exit" button terminates this client's participation in the current session by sending a 2.7 (Leave Session) message to the server. Upon sending this message the thread of execution used to listen for incoming messages terminates, the network connection to the server closes and the client user interface is replaced by the login dialog.

b) The "Run" button causes an XML representation of the workspace to be generated. This representation is sent back to the server accompanied by a 2.6 (Execute) message where it is dealt with in the way described below.

c) The "Save" button causes the remote file browser (a file dialog listing the contents of the server side directory) to be displayed. Upon providing a name for the current workspace to be saved as, the workspace is written into its XML equivalent and sent to the server accompanied with a 2.3 (Send File) message.

d) The "Load" button displays the remote file browser and allows the user to select a stored workspace. When a choice is made the filename accompanies a 2.4 (Receive File) message. The server upon receipt of this message sends the requested file.

e) The "Message" button is used to activate the text-messaging dialog, a facility that allows users in the same session to communicate. Upon completing a message (adding recipients name and providing a text body for this message) a 2.5 (User Message) message containing this data is sent.

f) The "Control State" button is provided only for shared users. Use of this button causes a 2.8 (Control Change) message to be sent to the server with the clients user name and whether or not they are active or passive at that moment.

g) The "User Selection" list is provided only on the client console of Supervisor users. This control contains a selectable list of users under supervision; selection of a particular element in the list causes control to be taken of the user. At the start of the list there is a special element labelled "no-user" selection, which causes control of whatever user is currently being supervised, to be relinquished.

Passive user clients (corresponding to passive shared or supervised users and student users) have the means of displaying output but not for providing input facility (or if such facility existed, it would be disabled).

Again as with their server side counterparts, the possible server messages encountered in the message-handling loop differ between active and passive modes. 3.1 (Data Output), 3.2 (Workspace Update), 3.3 (Send File), 3.4 (Refresh), 3.5 (Control Change), 3.6 (User Add), 3.7 (User Remove).

After connection and authentication have been completed successfully, a separate thread of execution handles the incoming messages.

Figure 27:
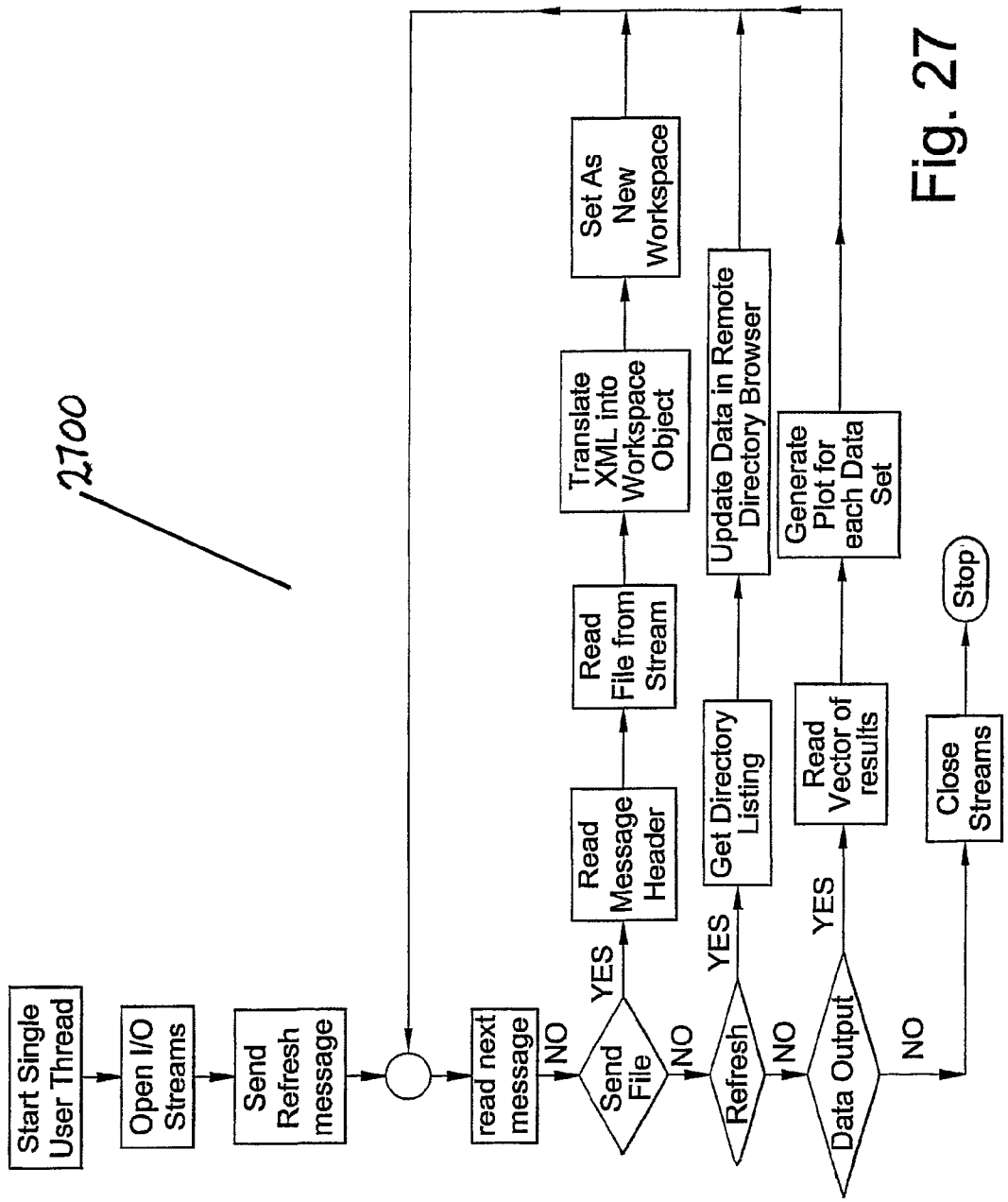
FIG. 27 depicts a flowchart of the sequence of events performed by the single user handler sub-process in response to three possible messages.

For a single user as shown in the flowchart 2700 shown in FIG. 27, only three possible messages may be encountered: 3.1 (Data Output), 3.3 (Send File) and 3.4 (Refresh). Data Output messages are received after a simulation has been run and contain the results of the simulation in a list attached to the message. Result data is in the form of Java object representations of Matlab variables that are then plotted by the client side plotter. The purpose served by refresh messages is to keep the clients remote file browser updated with the current contents of the server side directory. The message contains an XML representation of the remote directory storing its hierarchical structure, but only shows files that are saved workspaces. Send file messages are the replies to a request to load a workspace from the remote host. Upon receipt of these messages the workspace attached to the message (in XML form) is converted into a workspace object and replaces the current workspace in the users client. The loop repeatedly listens for incoming messages until the user leaves the session or a catastrophic failure is encountered, at which point the connection is closed and the user returned to the login screen.

Figure 28:
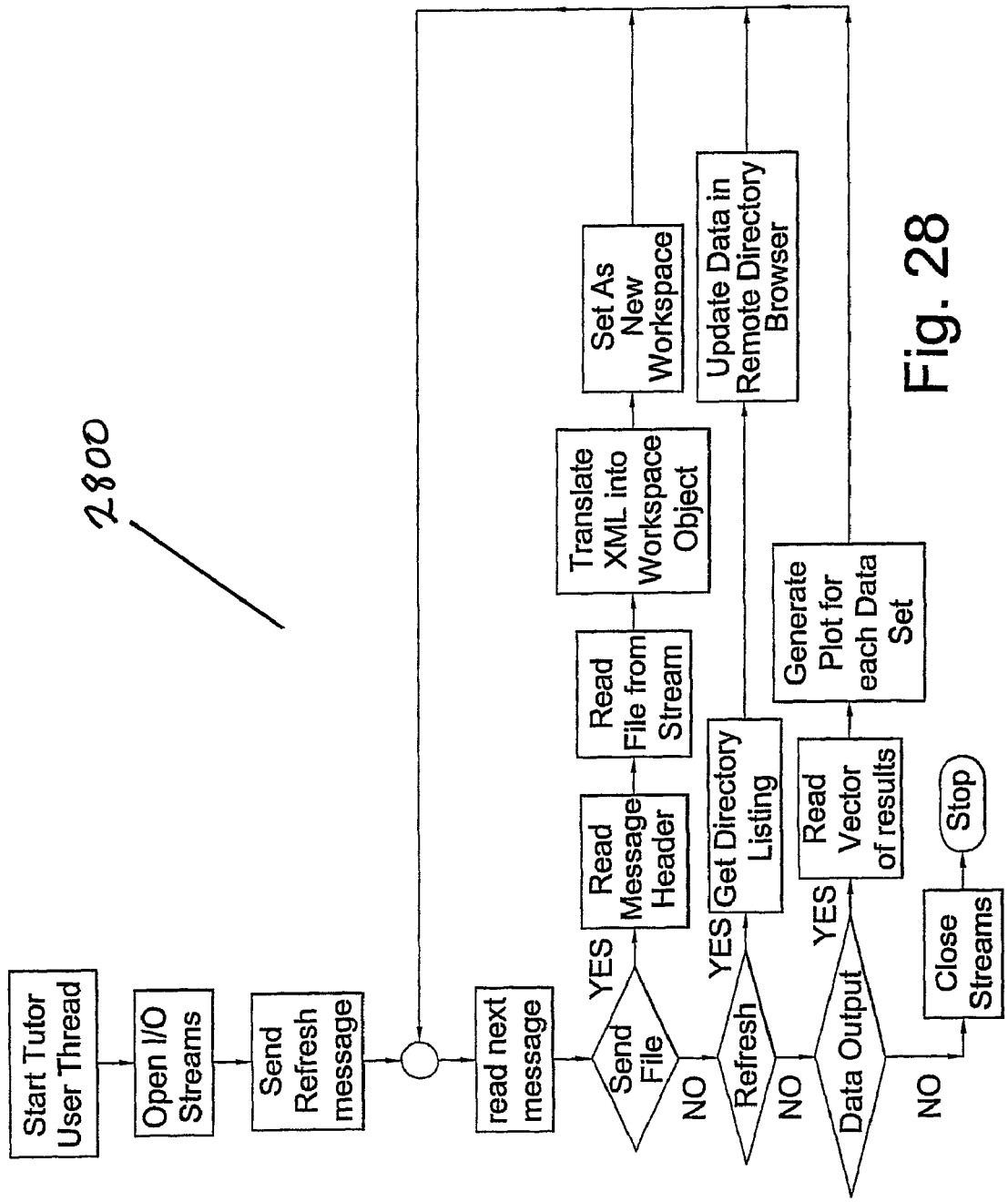
FIG. 28 is a flowchart similar to that shown in FIG. 16 but for a tutor-user handler sub-process.

For a tutor user, the behaviour is almost identical to that of the single user and reference is made to the flowchart 2800 shown in FIG. 28. Both the client user interface and the messages encountered in the listening loop are the same save for the inclusion of the 'Message' button on the client user interface.

Figure 29:
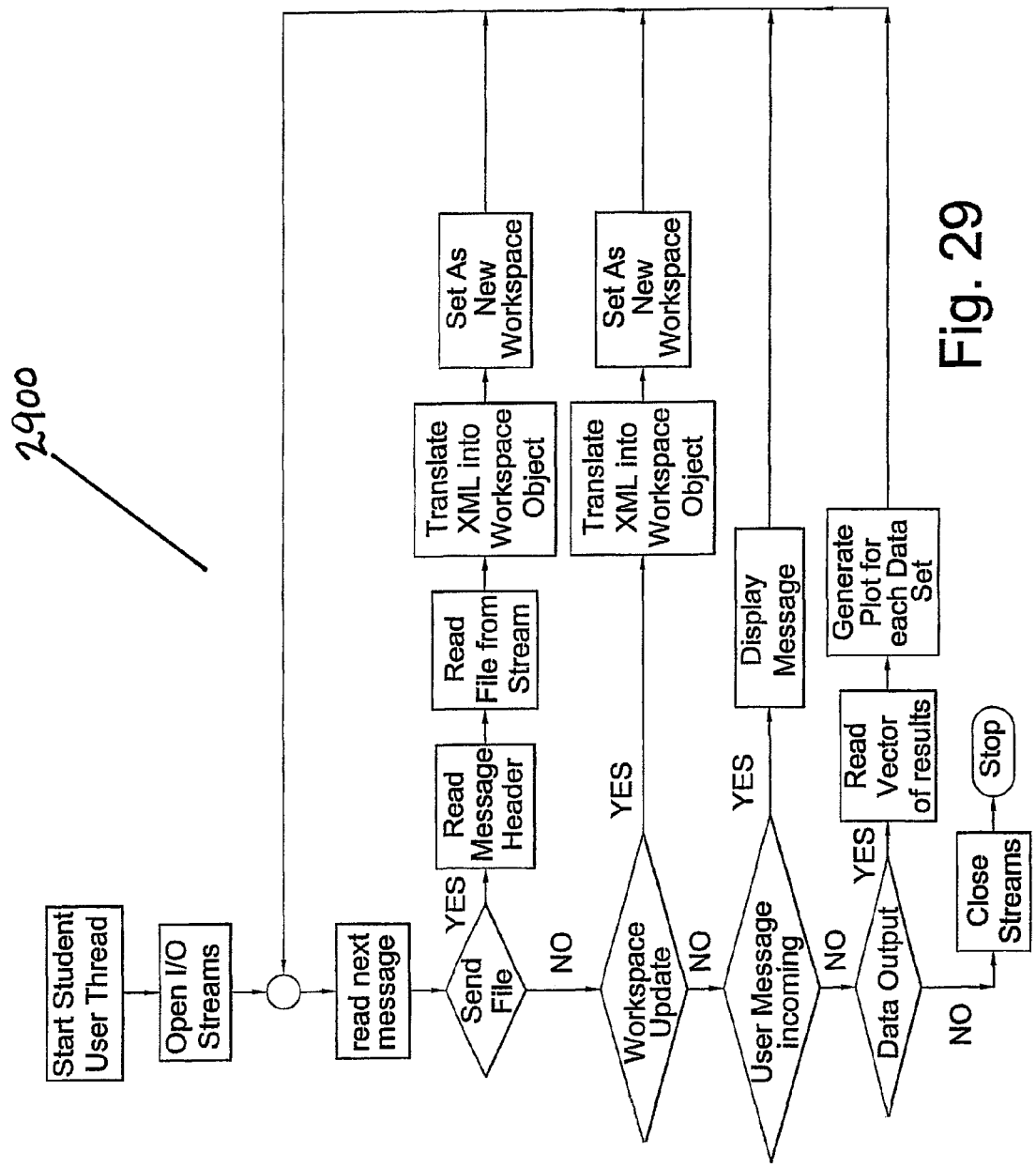
FIG. 29 depicts a flowchart of a student user handler sub-process in response to different messages received.

The student client case, described with reference to the flowchart 2900 shown in FIG. 29, differs significantly from the previous two cases. The user interface contains only a workspace, so that the user can observe the simulation being built, and an "Exit" button, so that the user can terminate his/her (silent) participation in the session.

Passive users are likely to encounter four different incoming messages: 3.1 (Data Output), 3.3 (Send File, 3.2 (Workspace Update) and 3.8 (User Message). Most significant is 3.2, the "Workspace Update" message. As a tutor user in a session constructs a simulation, the workspace being used fires a 2.1 ("Workspace") update to the server every 15 times it is repainted. The server's response to this message is to broadcast it to all passive clients in the form of 3.1. The message contains the "snapshot" of the tutors workspace (in XML form), which the passive client converts into a workspace object and replaces the passive user's current workspace with. 3.8 (User Message) contains a text message from another user (in this case the tutor, possibly providing narration) which the client displays in its own window along with the name of the message sender. The "Send File" message is generated when a tutor user loads a workspace from the remote host causing the workspace to be loaded onto all the passive clients in the session. Again, workspaces being transported across the network or residing on disk are always in XML format.

Figure 30:
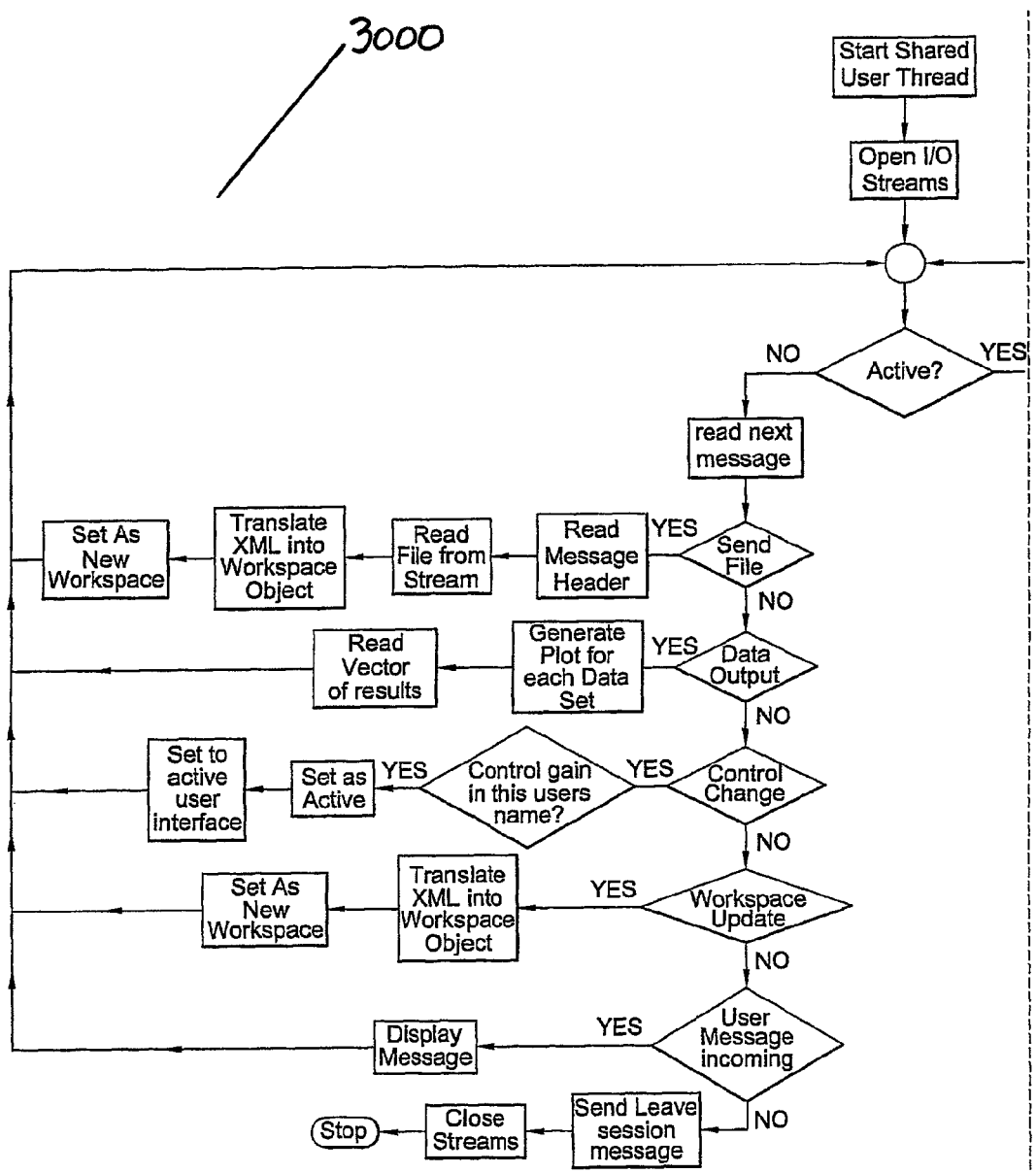
FIG. 30 is a flowchart of the sequence of events which occurs in the shared user handler sub-process in response to messages received.
Figure 30:
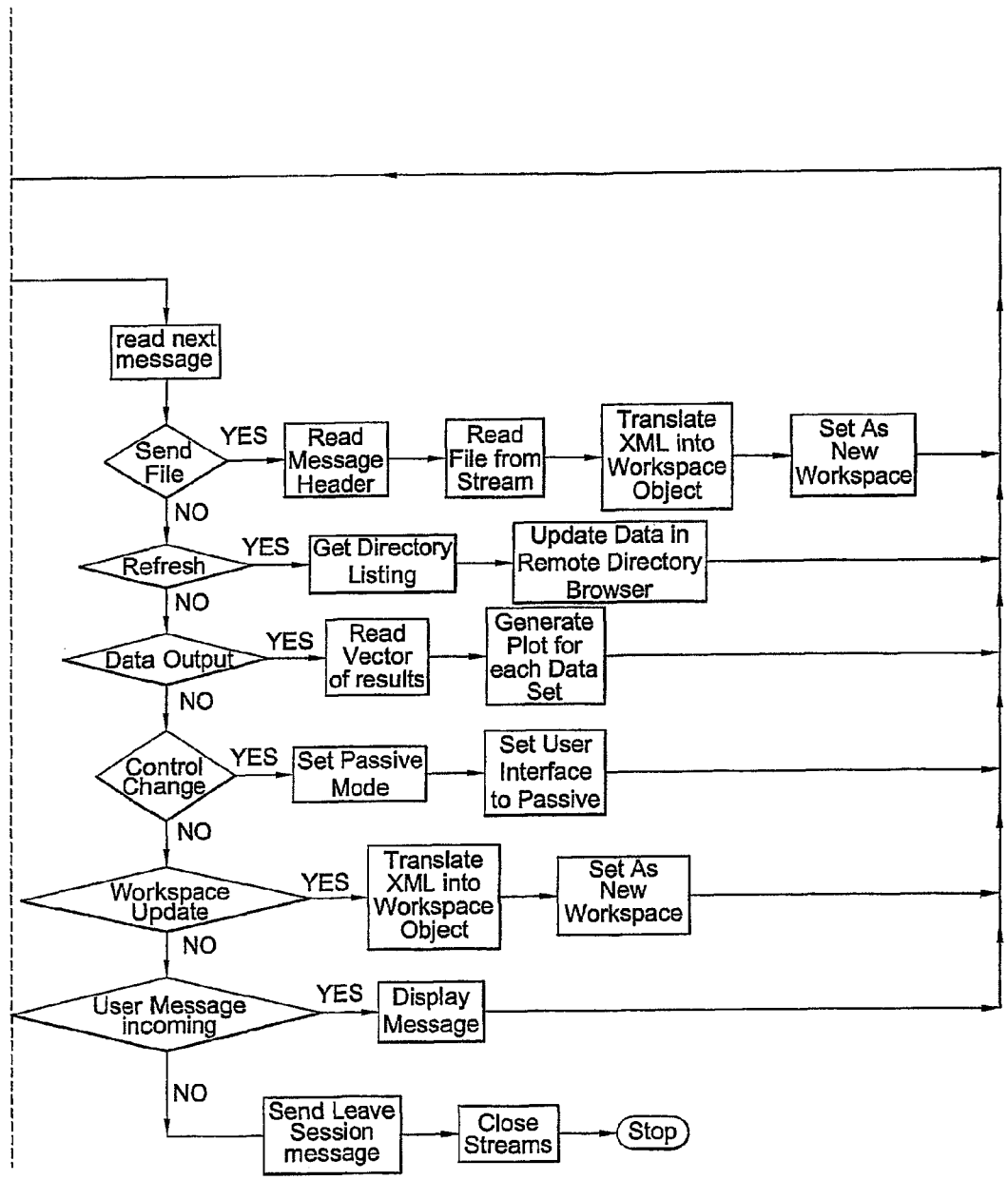

Reference is now made to FIG. 30 which depicts a flowchart 3000 of the incoming messages for a shared user handler. In shared sessions, only one user can be active at a given time, with all other users in the session remaining passive. On initialization, all client interfaces are provided with the toolbox and workspace found on other active clients along with "Exit", "Message", "Load", "Save" and "Active/Passive" buttons. Most significant here is the "Active/Passive" button, an active client pressing this button will send a control change (2.8) message to the server with the control flag set to "lose".

If the server accepts this message, it will broadcast a control change (3.5) message containing the user's name and the control flag set to "lose" followed by another control change message containing the new active user's name and the control flag set to "gain". Upon receiving the first message, the active client changes into the passive mode: the toolbox is disabled (protected from mouse activity) as are the "Load" and "Save" buttons, while the label on the "Active/Passive" button changes from "Active" to "Passive". The second message is ignored.

If the client is in the passive state when the "Active/Passive" button is pressed then the client sends a 2.8 (Control Change) message to the server. If this request is successful, a 3.5 (Control Change) message is broadcast to all clients containing the name of the currently active user and the control flag set to "lose". All clients (except the current active user's client) will ignore this message. The server then broadcasts another 3.5 (Control Change) message to all users, this time with the user's name and the control flag set to "gain". This time all use clients, except the user client corresponding to the user whose name matches that contained in the message, ignore the message. For the user who is gaining active status, the client interface now has all controls fully enabled, allowing the user to pick up on building the simulation where the last active user left off.

Figure 31:
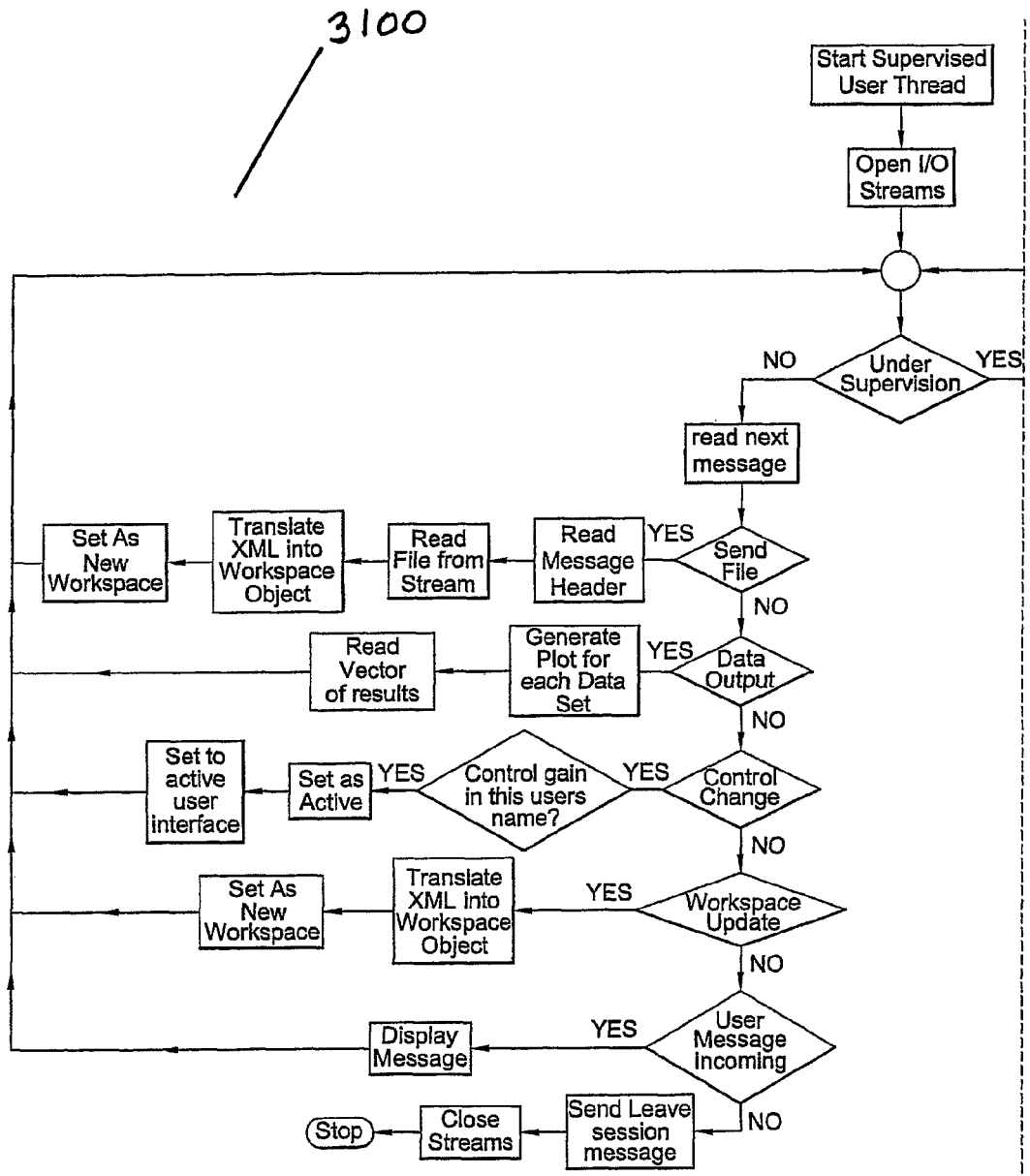
FIG. 31 is a flowchart of the sequence of events of the supervised user handler sub-process in response to messages received.
Figure 31:
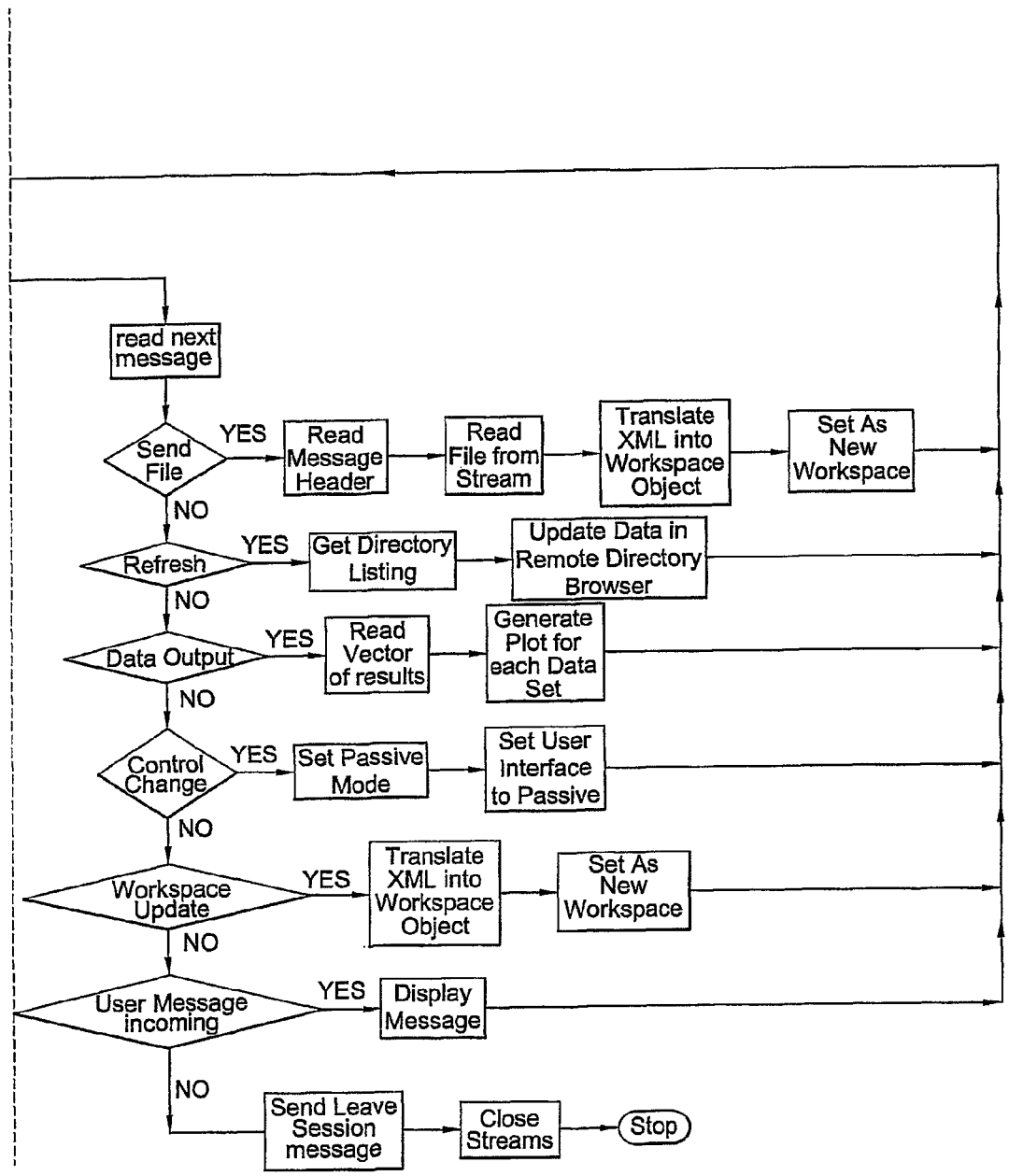

FIG. 31 is a flowchart 3100 for the supervised user handler. Supervised user clients do not differ much from single clients, the only difference being the inclusion of a "Send Message" button, used for communication with the supervisor user of the session that they have joined. Intervention by the supervisor user renders the supervised user passive until the supervisor relinquishes control. Again, as with the Shared client, the passive state manifests itself in the form of the toolbox and file load/save buttons being disabled.

Figure 32:
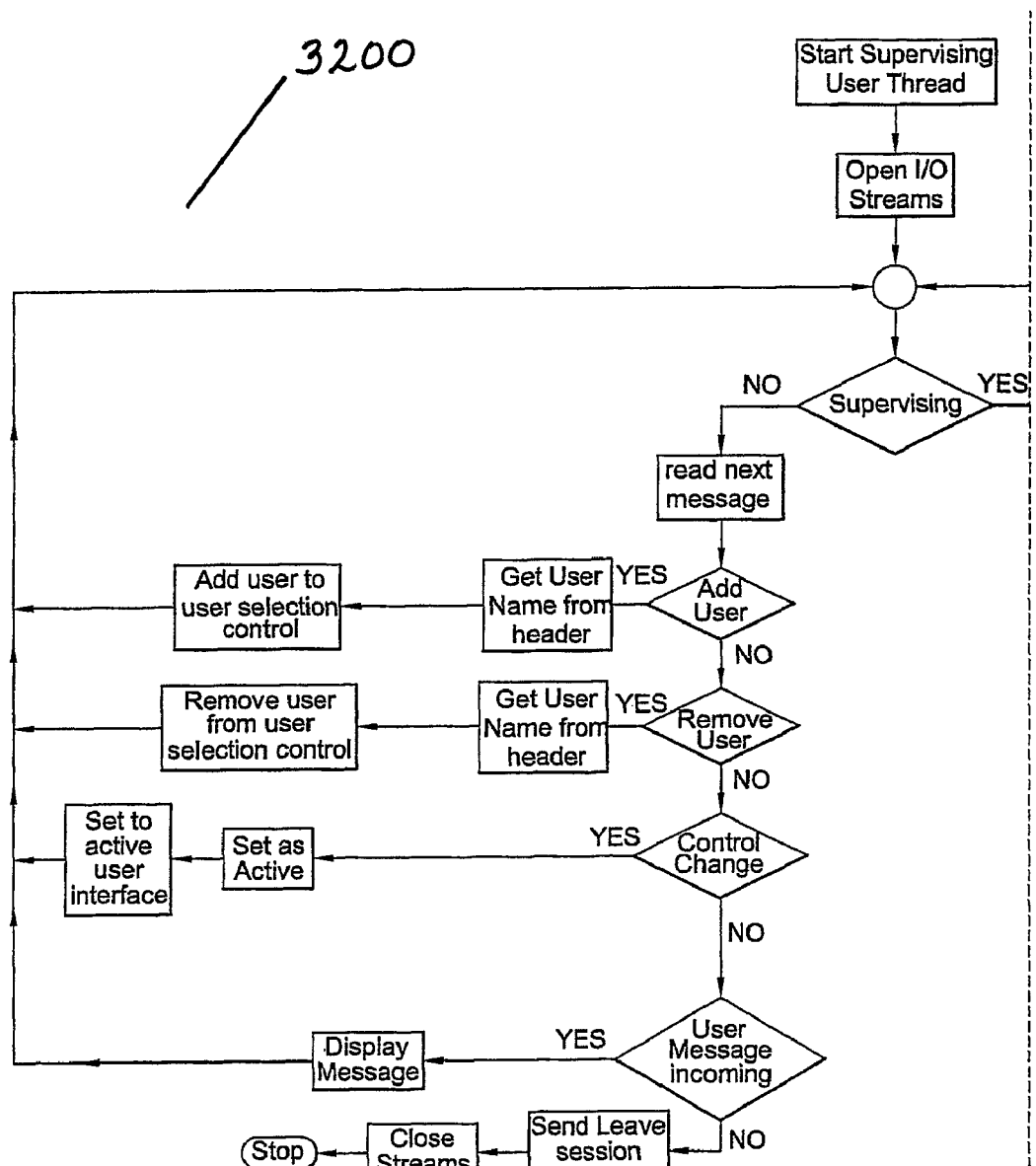
FIG. 32 is a flowchart of the sequence of events of the supervisor user handler sub-process in response to messages received.
Figure 32:
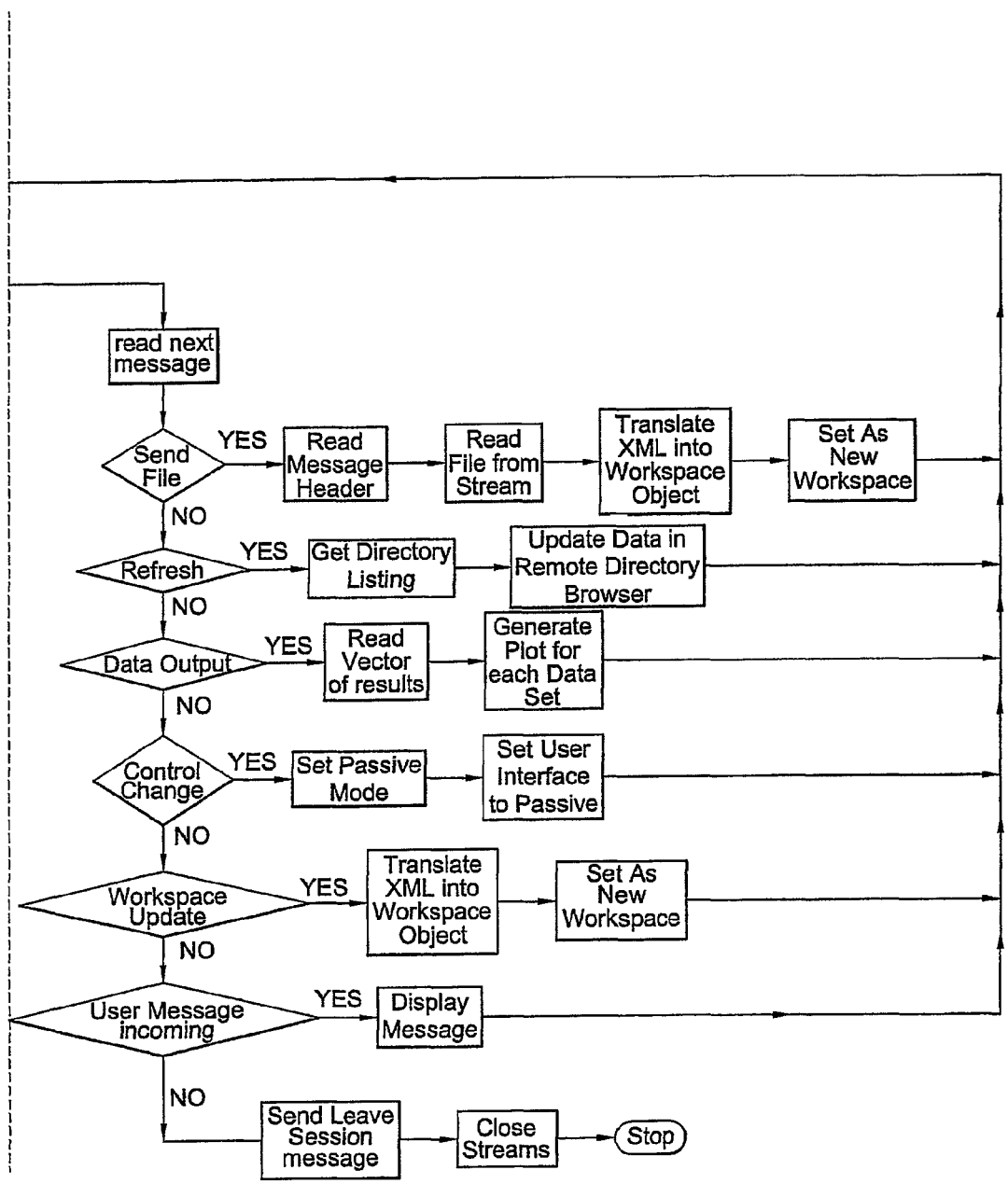

In the case of the supervisor client, depicted in the flowchart 3200 shown in FIG. 32, there exists the functionality to control other users by means of a selection list. The addition of this control leads to the introduction of two messages unique to the supervising case: 3.6 (Add User) and 3.7 (Remove User), used to add and remove users from the user selection list respectively.

Clicking on an element in the supervised user's selection list enables the supervisor to take control of the user process represented by that element. This action renders the supervised user's client passive and updates the supervisor's workspace with the contents of the supervised user's. Any modifications made to the supervised user's workspace by the supervisor are relayed to the supervised user's own copy of the workspace.

Figure 33:
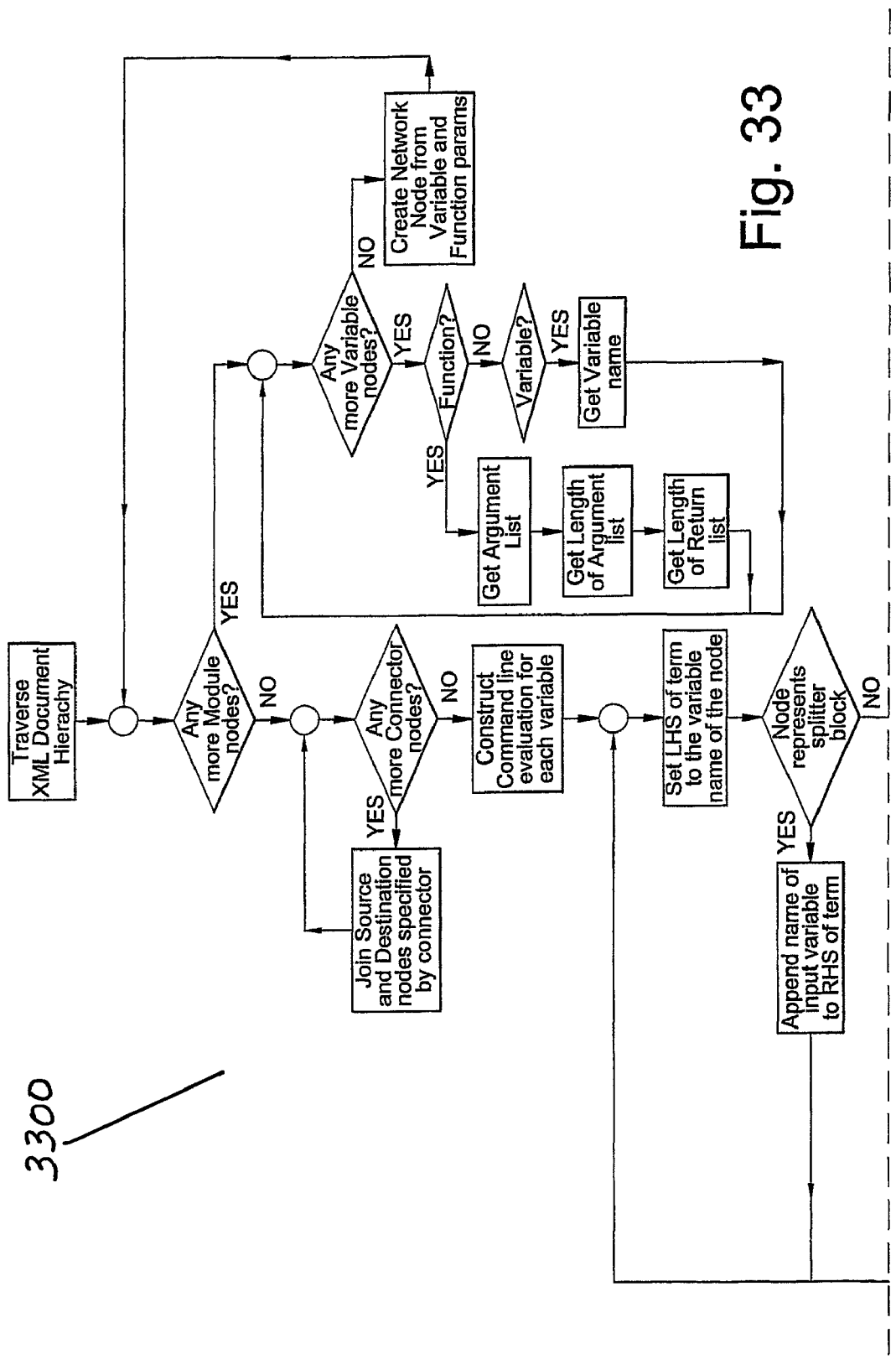
FIG. 33 is a flowchart of the code generation process used in J-Sim for converting workspace representation into executable code.
Figure 33:
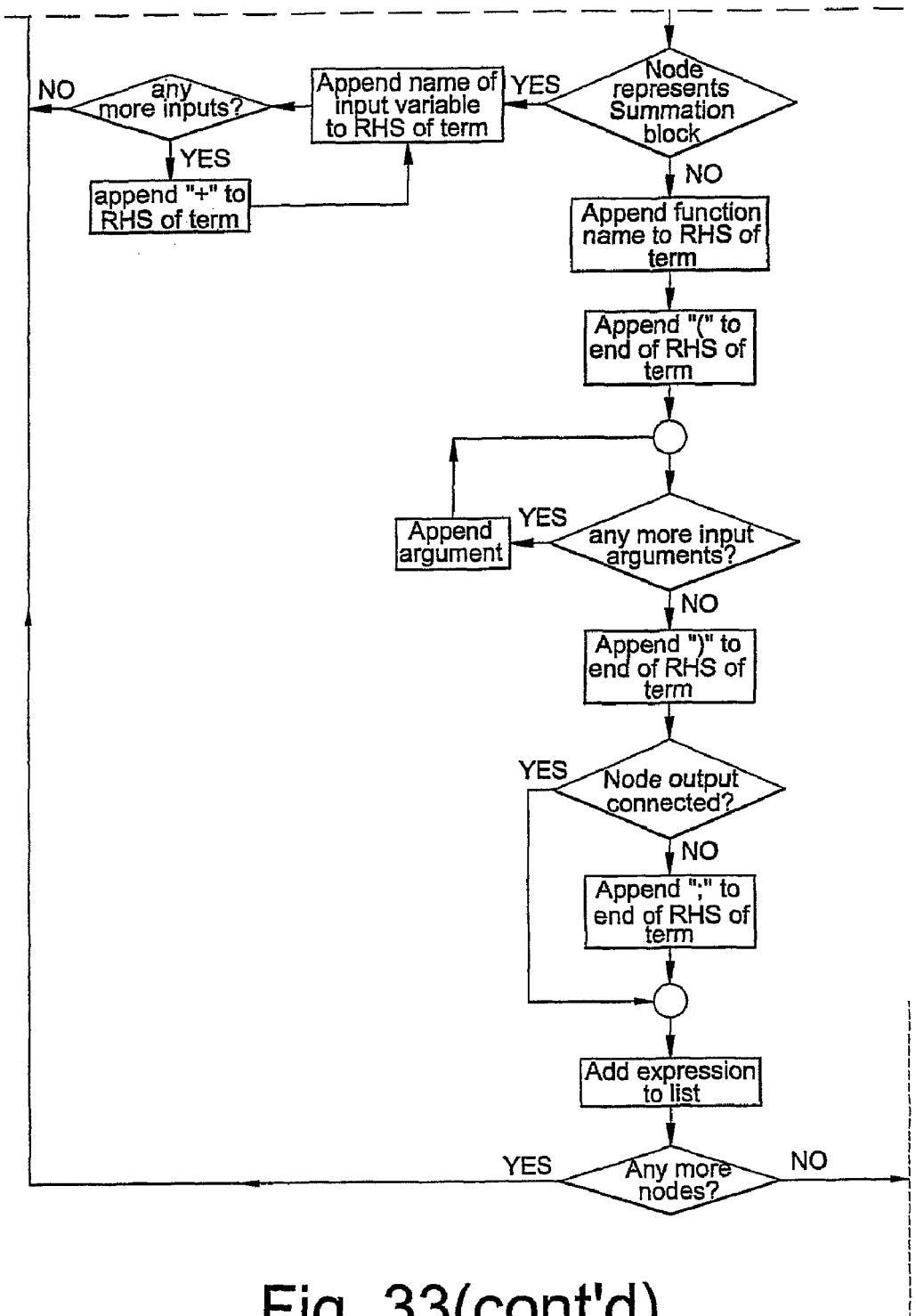
Figure 33:
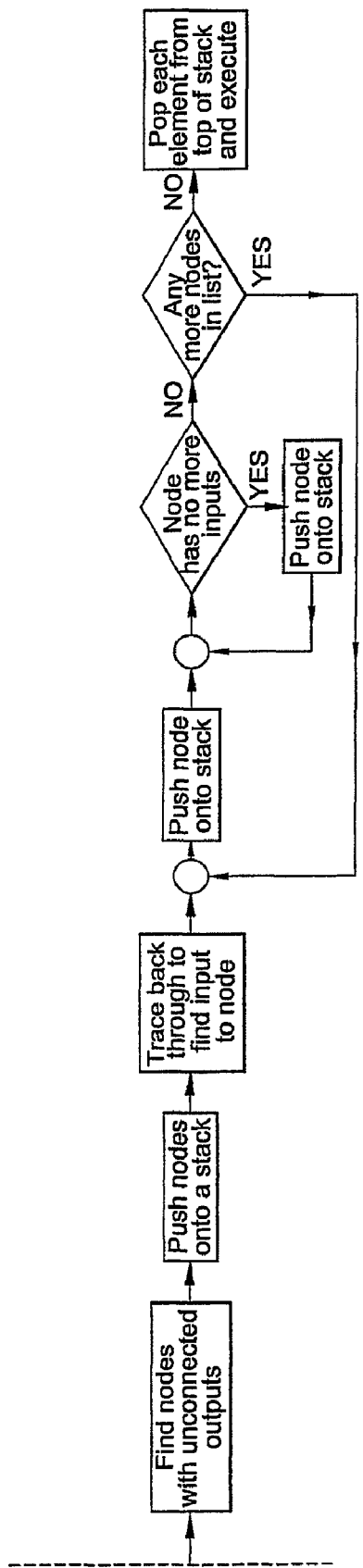

The code generation process will now be described in general with reference to the flowchart 3300 shown in FIG. 33. The system stores workspaces in XML format, which is a way of representing a database and allows for storage of objects in a similar way to the hierarchy in which they exist during runtime. At the top of the hierarchy is the workspace object itself, immediately below are child nodes representing the modules and the connectors.

Module nodes contain nodes representing physical position in the workspace and the function they perform as well as an attribute stating the unique variable name of this module in this particular workspace. The function node contained by the module node contains attributes representing the function name, the number of arguments the function takes and child nodes representing those arguments which also contain attributes pertaining to the order the arguments go in. The Connector nodes, also immediate children of the workspace node, contain two child nodes—representing source and destination of the connector. Both child nodes contain the unique variable name of the module they connect to, the "port" at which they connect as well as the coordinates of the point at which they connect to this module.

At any time a workspace is loaded from disk, stored to disk or broadcast/sent across the network this is the format used to convey the data. A request from a user for the system to run the current workspace (2.6—Execute) carries a workspace instance in this format. The following describes the process of converting the workspace representation into concrete code that can then be executed by whatever is applicable (dependent on the code generated).

The first stage in code generation is to extract and separate connector and module child nodes from the workspace parent and put them into separate lists. While generating the code, modules are collected together into a linked list so that reference can easily be made to the modules that both follow and precede them in the workspace. The formation of this linked list (or network) begins with each module node forming an element of this list, each element being set up with a function name and its own list of arguments. Arguments to a function may be provided from inputs from other modules outputs or they may be provided some other way (system constants, entered through dialog etc). Arguments being provided by the results of other modules computations are referred to by the variable name of that module, arguments obtained by any other means are passed by value.

Once each element has been populated with the required data from each module node on the module list, the list of connectors is traversed and each element provides connectivity information to each element in the prepared linked list. The next stage is to form an expression from each element of the linked list. For all elements on the list the first part of this process is to set the left hand side of the expression to be the name of the variable the list element represents. Three possible types of module are available: standard module, splitter and summation. With a summation block the right hand side of the expression is completed by iteratively appending an addition sign to the end of each input variable name. The command line for splitter blocks is completed simple by appending the input variable name to the right hand side. For all other types of blocks the procedure is as follows: the (calling) name of the function is added to the right hand side of the equation along with a single opening bracket ("("). Comma separated arguments (if any) are appended to the right hand side of the expression from the ordered list of arguments stored within the element. Finally a closing bracket (")") is appended. In its present state, the command line expression will return a result when executed—a behaviour which is desirable only if the simulation requests that the value of this variable be returned i.e. if the block which this variable represents is not connected to another block—the block is an end point of the simulation. If the module is not an endpoint in the simulation then a semi colon (";") is appended to the expression. Once all elements in the linked list have been assigned a complete expression all that remains is to order them so that all variables are defined at execution time.

A Stack (a first in last out queue) is created and onto it placed any element in the linked list that is an end point (no onward connections). For each element in the stack the inputs are enumerated and added to individual lists, the input modules are found via the structure of the linked list. Each element in the individual lists obtained is then pushed onto the stack and the inputs added to a list and so on until a block with no inputs is found. The outcome of this is an ordered sequence of commands that can be executed by popping (removing the first element) the elements from the stack.

Reference is now made to FIGS. 34, 35 and 36 which provide a sample example of the code generated process. FIG. 34 shows a simulation which consists of a single 'chirp' signal generator module connected to an output plot module 3400. When the user presses the 'execute' button on their client applet, the workspace and its contents are converted to XML, as shown in FIG. 35. Each module is given a unique identifier when it is added to the workspace. These can be seen in FIG. 36 with the chirp module being names 'webchirpOCT1310' and the plot being 'jscopeOCT0494'. Function name and argument details are stored within each module and are therefore represented in XML form as subnodes of the module node.

Arguments to functions, as mentioned previously in the detailed description of code generation, consist of both variables set by the user through the modules property dialog and variables being set from inputs to the module. In the case of the chirp module, all arguments are provided by the user through the properties dialog, there are no arguments provided through module inputs since this module does not have any. The XML node containing the function has as its value the name of the function, in this case 'webchirp', as well as a number of child nodes representing the function arguments. The function 'webchirp' takes four arguments, the values of which are (first to last) 5, 50, 'linear' and 0. Each argument node contains the argument value as the node value and the argument position in the function parameter list as its sole attribute. The second module, the plot output, has no arguments provided through its property dialog and only one through its sole input.

When the XML representation reaches the server side the code generator builds the representations starting at the simulation end points (those modules which do not have outputs), in this case the plot module. By going through the nodes representing connectors the input arguments can be filled in. In this case the only input to 'jscopeOCT0494' is 'webchirpOCT1310'. With the command line representation for plot module complete, the code generator works on its dependencies, and so on until a start point is found (module with no inputs). In this case a start point is found immediately in the form of the 'chirp' module. Once the command line for the chirp module has been built (by appending '=' to the string 'webchirpOCT1310' then appending the function name, followed by a '(', then the parameter list and then another ')'), the code can be executed. The code is executed from start point(s) to finish points(s) so that all dependencies are calculated in order. The Matlab code generated to represent this simple simulation is depicted in FIG. 36. Line beginning '##' are comments and are not executable code.

The WebClass software structure will now be described. Because both Matlab and Octave allow direct use of command line applications (i.e. it is not necessary to use the Simulink GUI environment for Matlab), WebClass was developed for direct usage of command line applications for Matlab and Octave with all the functionality of shared, supervised and tutored modes as described previously.

As the data transferred is entirely in textual format the operations of multiplexing executing and transporting results are greatly simplified. WebClass clients are equipped with a console for viewing output and providing input, not unlike that provided for use in Matlab. As with the J-Sim clients, the interface is user specific and contains many features common to J-Sim such as Active/Passive control, User selection control and User Messaging.

WebClass differs significantly in its implementation of the distance-learning model as it does not transport data in protocol based "packages" but continuously reads of a constant stream of data allowing real-time (or close to, accounting for network latency) usage of the software.

The case of the Single user is, as always, the least complicated of all the clients being provided with only a console. WebClass does not adopt the protocol-based control approach used in J-Sim. Instead, continuous streams of data are sent between client and server to be displayed and executed respectively. For special cases such as plots and control change, data is embedded between special tags denoting the beginning and end of the specific data. Data extracted from between tags is sent to a named handler specified by the tags, where it is dealt with accordingly.

For example data dispatched from the console in the form of a command line expression is sent to the server, executed by either Octave or Matlab in one of the ways previously described and the output streamed back to the client as it emerges. If the command happens to be a plotting command, the data is enclosed by two "NJ PLOT" tags, which, at the client side causes reading of the stream to be delegated to the plot handler until the closing tag is encountered.

An external plotter handles the plots in WebClass with data being channelled to it through a pipe connected to the applications STDIN. For the case of the single user the "Leave Session" button is unnecessary since the session can be terminated by typing "quit" at the console—a feature included in both Matlab and Octave.

The client of the tutor user is, again in common with J-Sim, identical to that of the single user with all multiplexing of output being handled by the server side code. As in J-Sim multiple users (passive users) can view the tutor's (active user) input and output data. Student users cannot provide any input to their consoles and therefore have to be provided with a "Leave Session" button to terminate their participation in the teaching session. However, all input and output from the tutor can be viewed at the time it is produced as well as all output from the beginning of the session onwards.

An advantage of using text only is that command history is readily stored and recalled. All multiple user WebClass sessions have a facility by which late joining users to a session are updated with all input and output from the moment the session was initiated to the moment of their joining. All passive clients are able to view and manipulate their own personal copies of any plots generated.

Shared users all have the functionality of the single/tutor user client when they are the active user in a shared session and are rendered passive in a similar way to that of the student user when not the active user. Data in the incoming stream pertaining to a change in control status is enclosed in specific tags that are read by the client and cause the reading of the stream to be delegated to a designated handler that deals with the changing of the user interface and setting of server side control permissions.

The history facility is useful in the case of the supervised session where a supervisor has just taken control of a supervised user. The supervisor is able to see exactly what the user has been doing up to the moment at which he/she required supervision. As with all other clients, non standard data being read from the stream is dealt with by the separate handlers denoted by the tags the data is enclosed in—for a supervised session this includes adding and removing users from the supervising client and control change issues.

The WebClass structure is practically identical to that described in the previous section for J-Sim. Any differences which exist between the two systems and which have not already been explained in previous sections are described below.

The Server Structure

The server side code is organized in the following hierarchical order:

Server

At the top of the hierarchy is the server which listens to a specified port for incoming connections and assigns them to a ProcessAdministrator object. Servers are configured manually for local applications to be run remotely, users to be added and user privileges set. The Server object is responsible for instigating new sessions and adding users to their desired session.

ProcessAdministrator

Concrete instances of the abstract ProcessAdministrator object are spawned by the Server object to handle sessions containing multiple clients. In a multiple client session the ProcessAdministrator object can be responsible for controlling access to the application being run remotely by switching the destinations of an individual users input and output streams to their native process.

ProcessUser

ProcessUser is an abstract class spawned in concrete form to handle individual users at server side. Each ProcessUser object encapsulates the network connection to the remote client, another abstract object whose concrete incarnation is based upon user attributes. The main task the ProcessUser undertakes is receiving input and delegating tasks to the sub agents it spawns.

ServerComponent

Individual tasks are handled server side by concrete instances of ServerComponent. The ProcessUser object for a particular client spawns and kills these objects according to its communications with the remote client.

The Client Structure

The system clients take the form of Java applets embedded in web pages. Once the browser loads the applet and its execution starts, the applet present the user with a login screen prompting for username, password, session application and supervising user if any. Upon receiving this information from a prospective user, the applet connects to its host of origin and attempts to add the user to either an existing teaching session, a new teaching session or a single user session. If a login is successful, the agent hierarchies previously described are created on both sides of the network connection. As with the server side code "subagents" are assigned to specific tasks as requests for them arrive.

Figure 37:
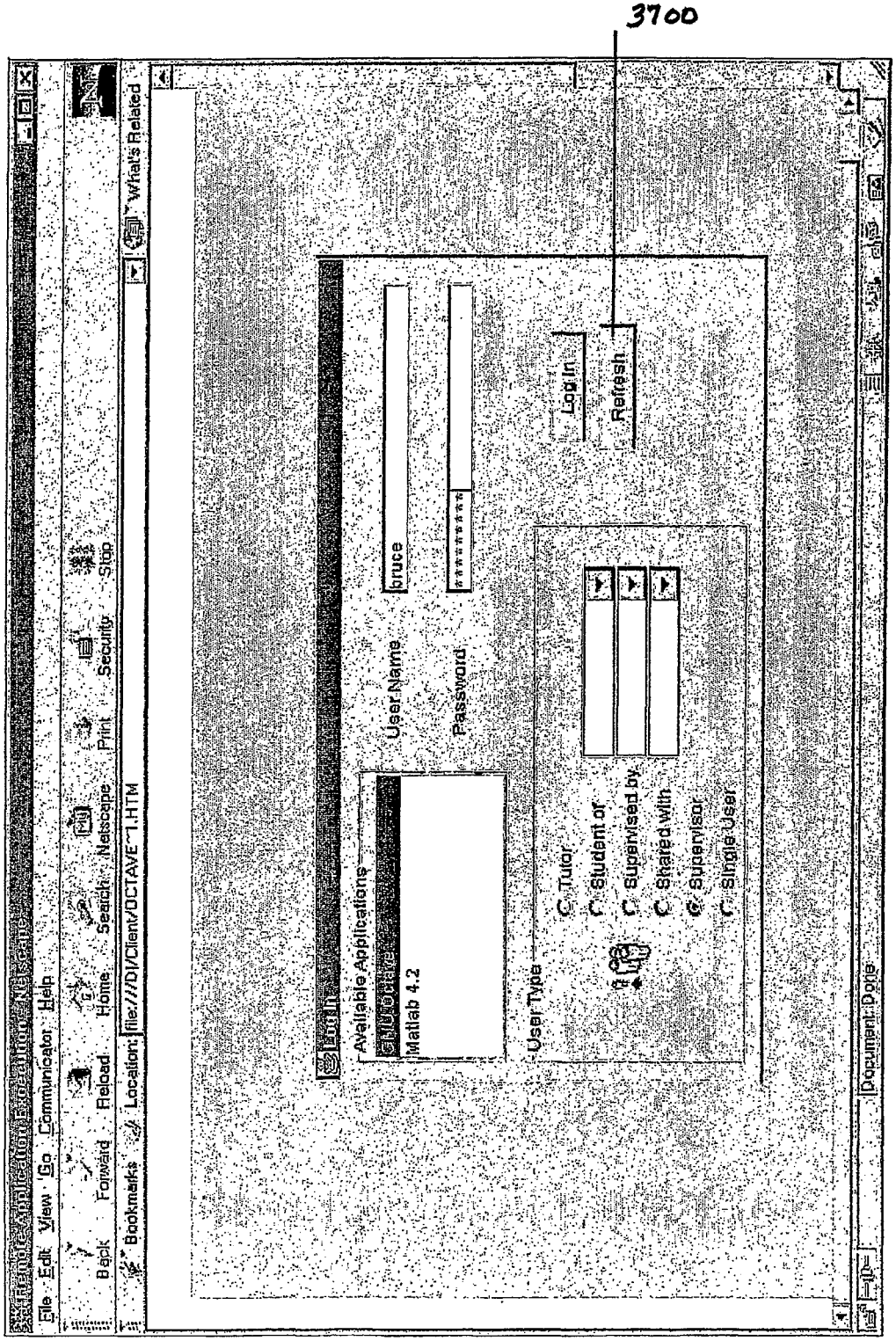
FIG. 37 is a screen display of a log-in console displayed on a client computer for use with a web class implementation of a distance learning module.

The Login process is common to all users and the login console is shown in FIG. 37. When a browser downloads the client applet, it also downloads a serialized object containing information about the current state of the server. This includes any native processes which may be available and the names of Tutor, Supervising and Shared users whose sessions are—at that moment—available to join. This information, which is updated on the server-side as it happens, but on the client-side requires the use of the refresh button 3700. Logging in, successfully updates this serialized object on the server side.

At present, the system provides several different modes enabling a varying functionality according to requirements. In its simplest form the system emulates the current remote access approach provided by other packages such as Matlab or Octave (e.g. remote single-user access through the Internet). The modes are described below:

Single-User Mode

Figure 38:
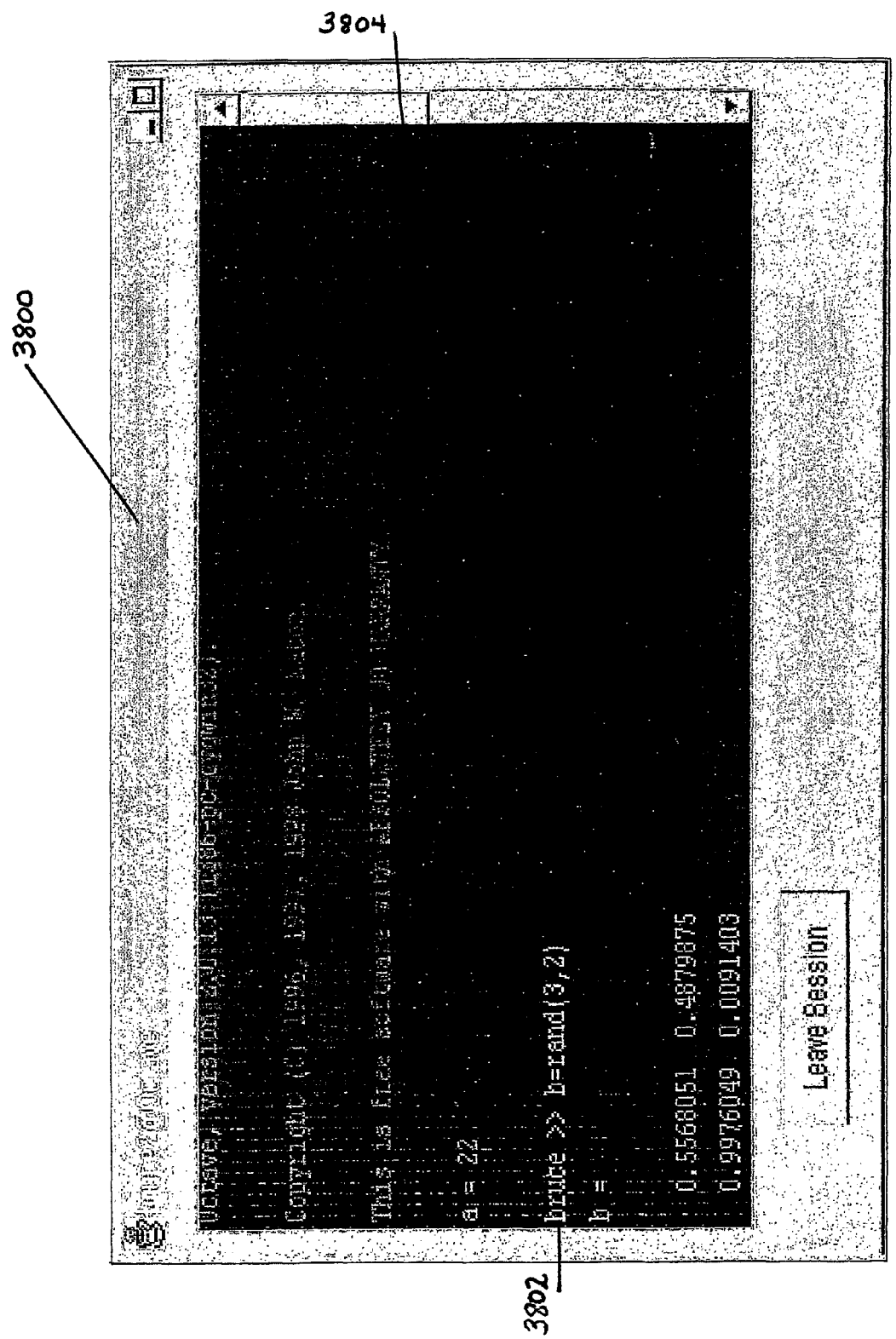
FIG. 38 is a screen display of a user desk top operating Octave in a single user mode in a web class application.

FIG. 38 depicts the screen showing the desktop of a user, operating Octave in single-user Mode. The features discussed here are common to all of the other 'active' user modes.

The main console window 3800 provides all input and output to the remote software. The terminal prompt 3802 shows the user name of whoever issued the command before appending the corresponding output which is trivial in single user mode, but essential when sharing.

The file browser window 3804 shows what is in a specified subdirectory of the users home directory and also allows the user to send function scripts to the server, to be executed when required.

Tutor Mode

This mode enables the 'teaching-by-showing' process. This means passing information to several Passive users. Output from a single copy of Octave belonging to the tutor is multicast to all users along with all corresponding input, plots, any other data as required.

Student or Passive Mode

When a user logs into the system as a PassiveUser, he/she is then presented with a user interface that allows him/her to leave the session, but does not permit any other interaction with the software. Since passive users will normally attend a "teaching-by-showing" process, there is no need for them to participate. Nonetheless, a passive user still has full functionality of the console so that the plots received from the tutors can be manipulated and saved to disk.

Supervised Mode

Figure 39:
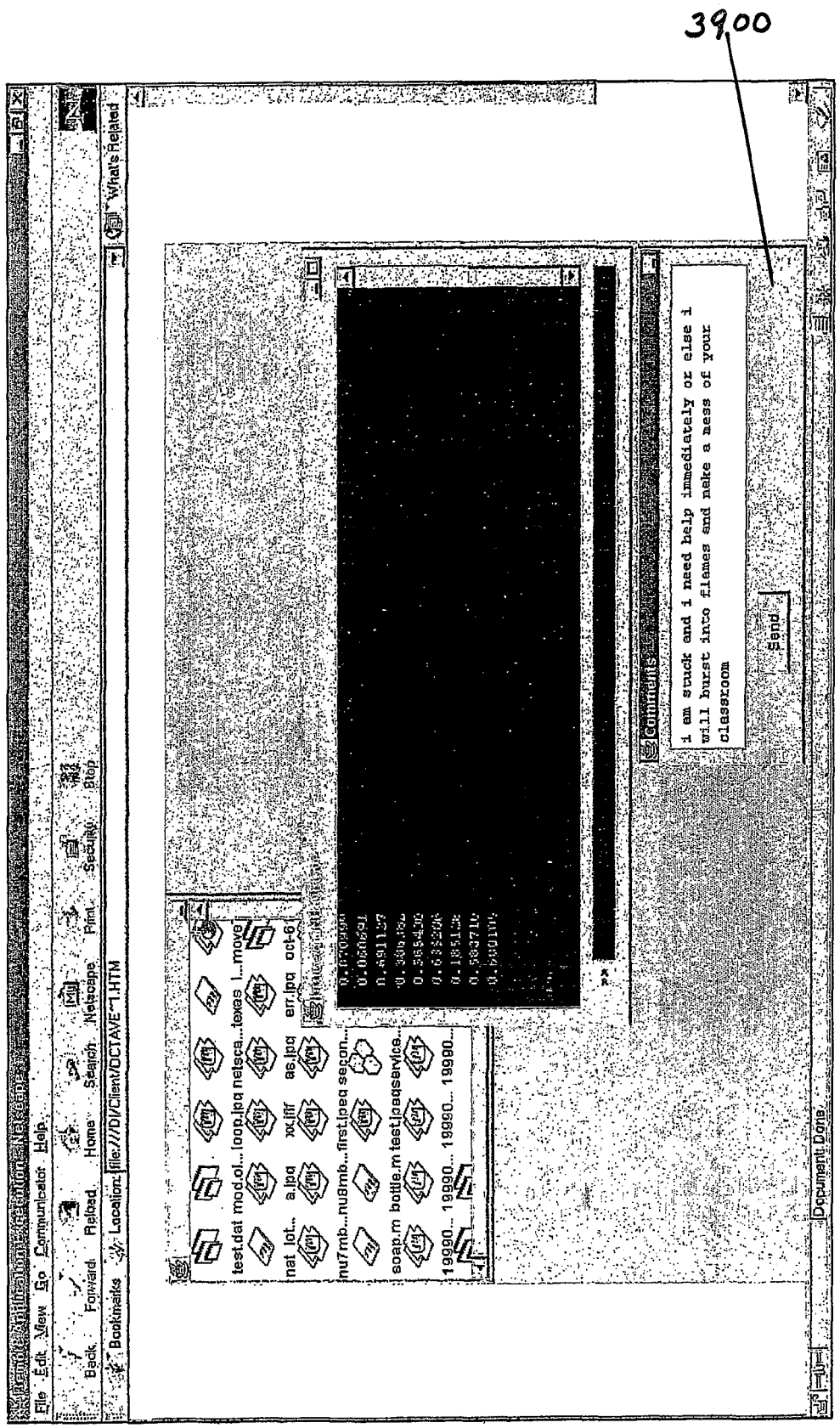
FIG. 39 is a screen display available to each user running an individual copy of Octave or the like when in the supervised mode.

In this mode, each user can run their own individual copy of Octave or other Native process. Each user has complete control of the process and they also have access to a Supervisor user who can be contacted through the "CommentConsole" window 3900. This situation is depicted in FIG. 39 where the bottom right part of the picture illustrates the use of the "CommentConsole"—an additional feature of the Supervised/Supervising modes.

When a user contacts a supervisor for assistance, then control of the Native process can pass over to the supervisor, together with a history of the actions of the user. The original user becomes a passive user. The supervisor can then advise the user of the best action to take or provide any other assistance as necessary. Upon completion, control can then be passed back to the original user.

Control of the user's copy of the Native process is governed only by the supervisor i.e. a Supervisor decides whose copy of the Native process he/she is going to control and when he/she is going to take/abandon control of it.

Supervisor Mode

Figure 40:
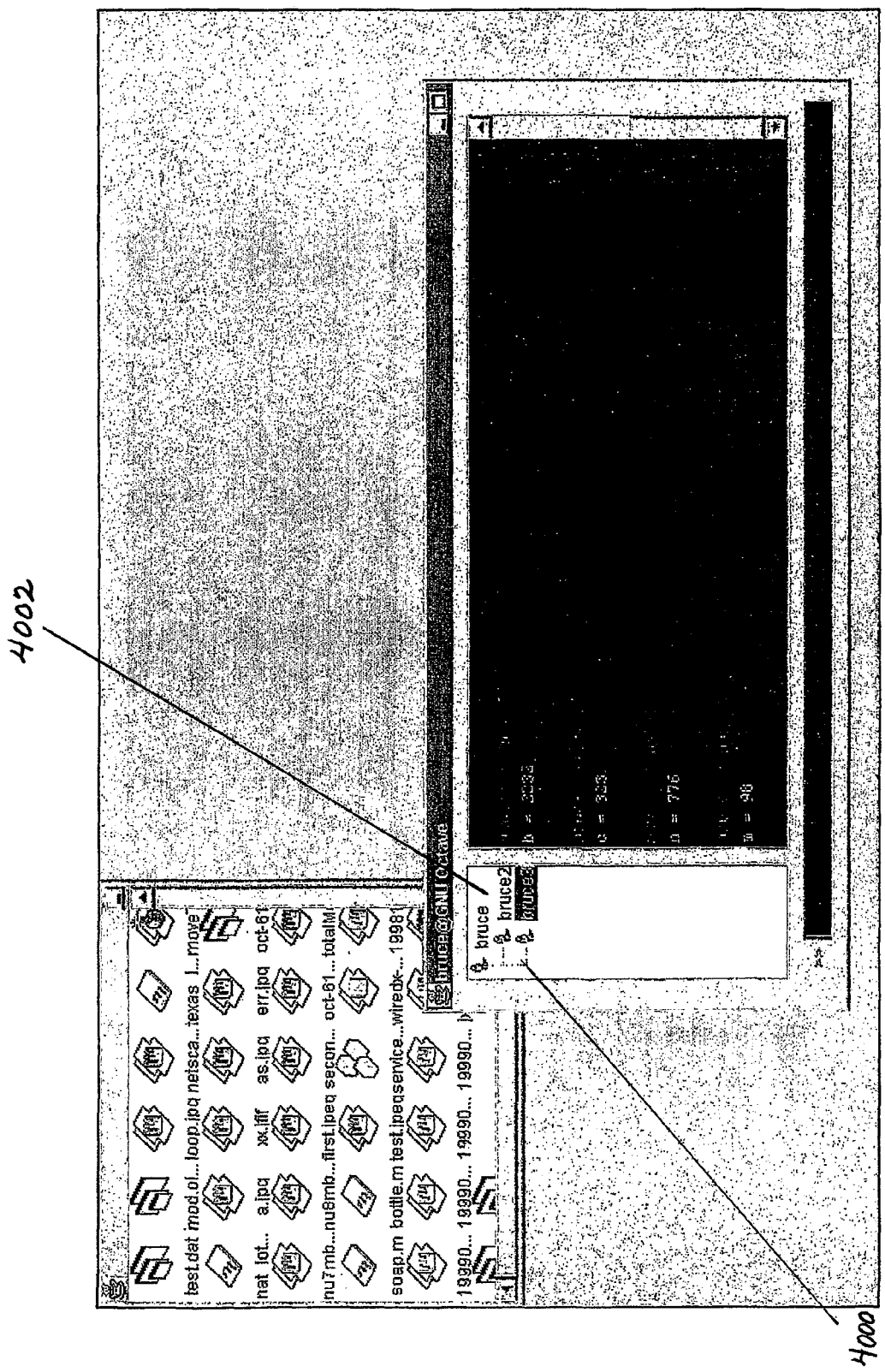
FIG. 40 depicts part of a screen display available to a user in the supervisor mode.

A Supervisor user can oversee a number (class) of Supervised users. A Supervising user possesses no copy of the Native process his/her students are using. Instead, the supervisor who has a list of icons corresponding to the names of the students be/she supervises, can take control of the input and output of a student's copy of the Native process. This can be done by double clicking on the desired student's icon 4000 on the tree control 4002 (to the left of the console panel) as best seen in the screen display shown in FIG. 40. This causes input to the process to be handed over to the Supervisor and a history of the student's commands and output to be displayed on the Supervisor's console. All output from the process thereafter is sent to both the Supervised and Supervising users consoles until the Supervisor decides to return control to the student (by double clicking on the tutor icon on the tree).

Shared Mode

Shared mode allows multiple users to use a Native process and see the output regardless of who is providing the input. Control of input can be switched between users although one particular user (usually the first to join the session) has complete control and can grab control when desired. The switch between Active and Passive modes manifests itself in the user interface, blocking input from users when in Passive mode. Toggling the Active/Passive button either polls the Active user in the session for control of the process or offers control of the process to any of the currently passive users in the session who want it.

Figure 41A:
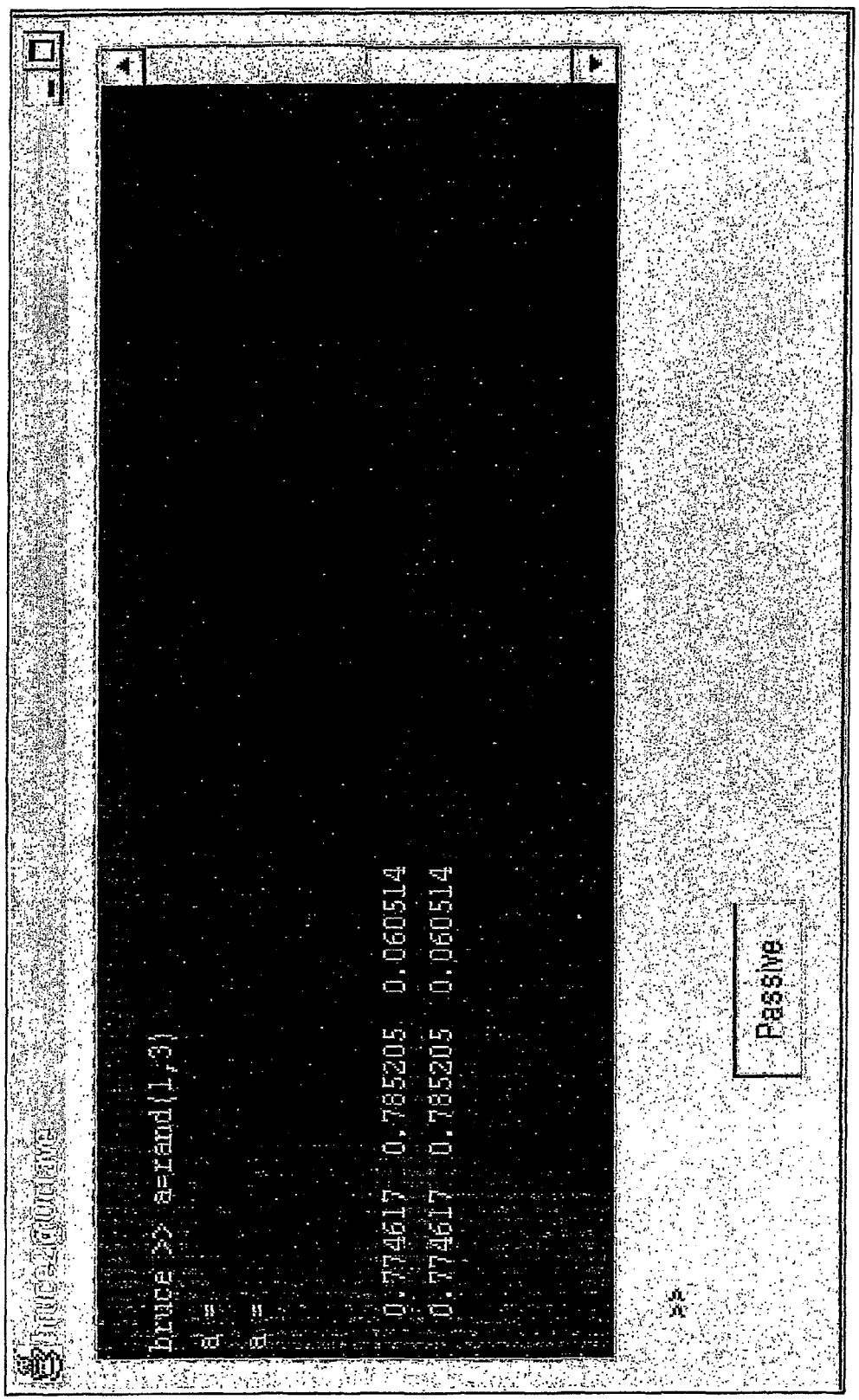
FIGS. 41a and 41b depict part of screen displays seen by a passive user and an active user respectively in the shared mode when the program accessed is Octave.
Figure 41B:
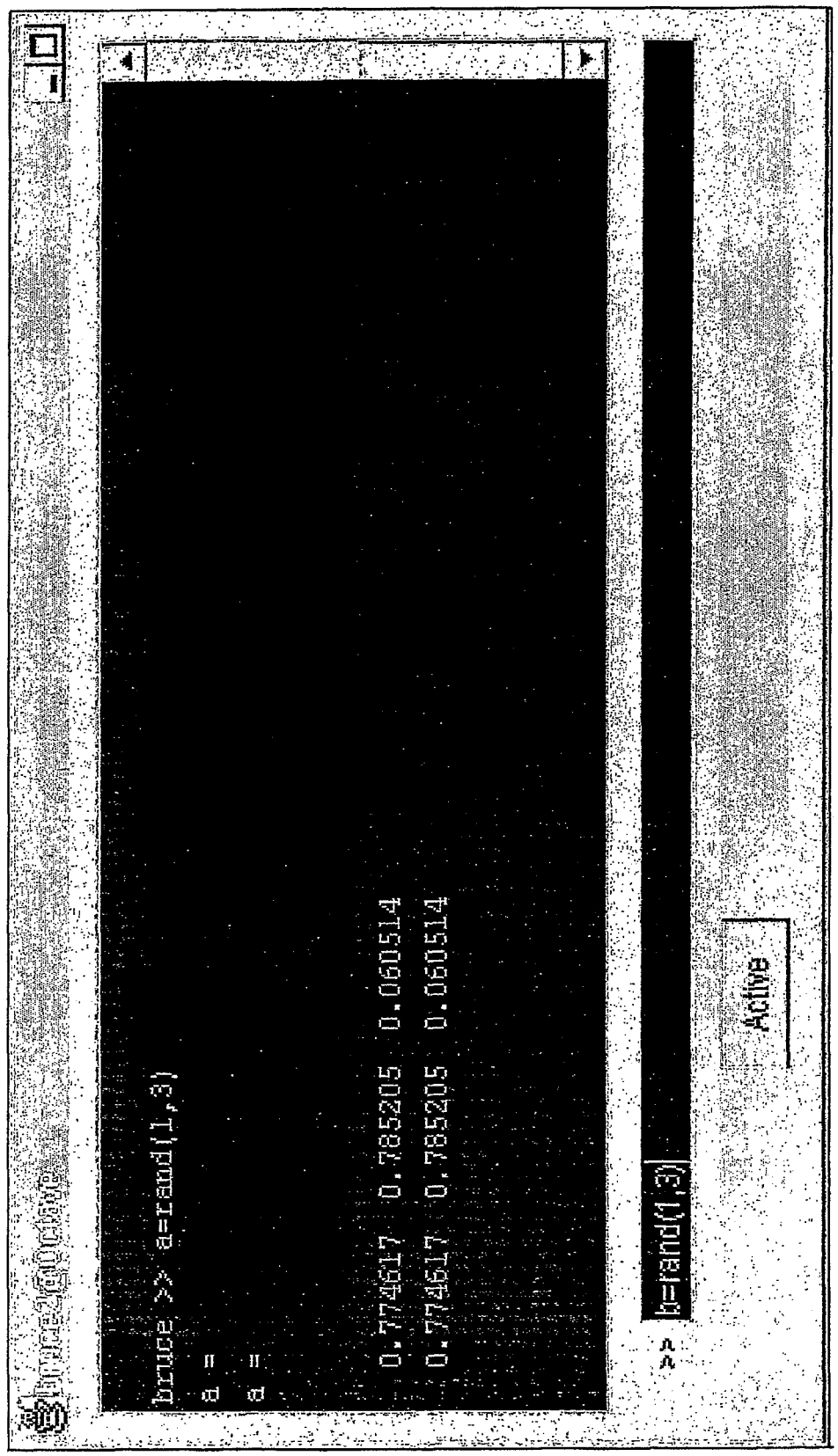

FIG. 41a shows a client in the passive state and FIG. 41b shows a client controlling a copy of Octave.

Code execution will now be described. Neither J-Sim nor WebClass handle any mathematical computation aspects of simulations; this is entirely handled by the software they are being used with, namely Matlab and Octave.

WebClass uses a purely string based approach to handling evaluation with text based input and output being continually copied from source to destination.

With J-Sim, all variables are treated as objects. Expressions in the stack obtained in the previous section are evaluated in order, with the result (if any) being returned and stored. Once all expressions have been evaluated, the list of Java variables returned is passed to all remote users concerned where they are plotted at the point of destination.

Where Octave is used as the mathematical engine to evaluate the code produced, input and output is performed through pipes to STDIN and STDOUT. Expressions are evaluated by piping their string representations into Octave through STDIN. Java Object representations of workspace variables are obtained from output by parsing the resulting character strings coming from STDOUT.

In the case of Matlab, an external interface API written in C is provided to allow direct access to Matlab's computational engine from applications written in C. J-Sim is not written in C but there exists a technology known as JNI (Java Native Interface) that allows methods declared in Java to have their bodies written in native code (code that is compiled into the binary compatible solely with the host platform). Since Java is based on C, runtime variables within Java code can be created, accessed and manipulated in C code. This allows the C data structures representing variables within Matlab to be used to create Java objects representing the aforementioned variables (values, dimensions, real or complex etc.). Methods can be written in J-Sim that allow functions to pass the Java variable representations to Matlab and return the result of an evaluation as a Java object representation of a Matlab variable.

In the special case of Matlab/GNU Octave it is important to realize that both in the case of J-Sim and WebClass no graphics are sent over network connections. Instead plot data information (this is in textual form) is broadcast to clients and the information is plotted at the client end through a compatible Graphics Plotting System described below for WebClass and J-Sim. In this way, faster exchange of information between server and clients is effected and the exchanged data can easily be compressed if necessary. If essential, the system can also transmit graphical output data directly to the clients, although it is preferable not to do so because it is desirable to preserve bandwidth. Due to the fact that both textual and graphic output can be transmitted, the program according to the invention is, in general, applicable to other server applications (e.g. LabView, Autocad, 3DMax or other types of software) where all information can be sent through network connections.

Recently, Sun produced Java2 Open Source, which has allowed numerous ports of Java2/Java1.2 to be undertaken—currently these include Linux, Irix, FreeBSD and others. They apply to the main Java Development Kit, Java3D and the Java Plug-in as well as some of the more specialised extension APIs (JavaSound, Java Advanced Imaging). However, there is still no Macintosh version of Java2 available.

The described development, both client and server, has been implemented entirely in Java 1.2 and C++ enabling it to be used without modification across platforms. At server side this is achieved using standard tools for running Java applications, such as the JRE (Java Runtime Environment) provided by Sun. Client side execution of the Java applet is handled by the Sun JRE plug-in which is invoked by special tags embedded in the HTML page in which the applet is contained. The JRE plug-in is universal and can be invoked from within any web browser.

The serialization mechanism in Java is also utilised. This is a convenient means of saving an object's state out with memory. Objects can then be written and read from disk and used alongside other runtime objects in the Java Virtual Machine.

As will be described, the graph plotting facilities accommodate packages which are graphic intensive or have a specialised GUI (e.g. Matlab and LabView). In the case of Octave it was essential (the package has only a rudimentary plotting system), but it can also be used with other packages if required. Its purpose is to provide Octave with better plotting facilities, but its generic use means that it can be utilised to conserve bandwidth usage, since all plotting and exporting of graphics to image files is done at the client side.

WebClass GLPlotter

The plot facilities for WebClass are contained within a single stand-alone executable that utilises OpenGL for both the two-dimensional and three-dimensional plots. Graphic export in both still JPEG format is available for all plots and animated MPEG format is possible for XY plots.

XYPlots

XY plots provided by WebClass are drawn in the same way as those in J-Sim detailed below. WebClass provides the means of drawing 3-dimensional data as an animated XY plot with time displaying the third dimension. The rendered plot can then be exported as an MPEG encoded video and saved to disk. Each frame of the animated plot is rendered as an array of three byte (each byte representing red, green and blue values of a given pixel) elements of length equal to the width multiplied by the height of the frame. Each array is passed into the MPEGe library, an MPEG-1 encoding library written by Alex Knowles (http://www.bloodyeck.com/mpegelib/) based on the Berkeley software MPEG encoder (http://bmrc.berkeley.edu/frame/research/mpeg) that creates an MPEG movie when the final frame of the animated plot is added.

Contour Plots

Contour plots draw lines connecting points of some constant property in 2D space. WebClass utilises the CONREC algorithm for generating contour plots written by Paul D. Bourke (http://astronomy.swin.edu.au/pbourke/projection-lconrec/) initially in Fortran but ported to C++ by Nicholas Yue.

Surface Plots

Figure 42:
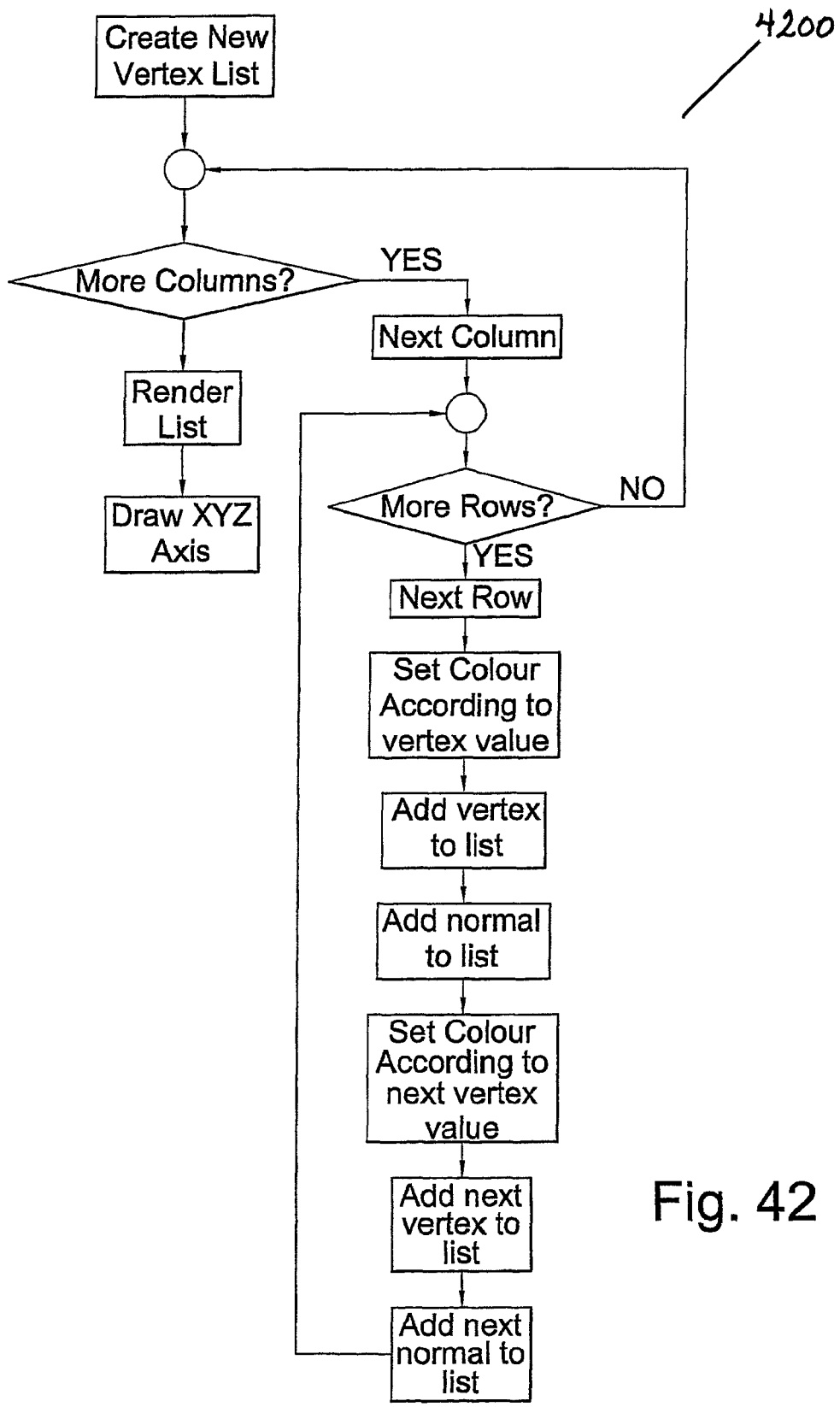
FIG. 42 is a flowchart of the steps used to create a surface plot by the WebClass plotter using Vertex lists.

The surface plot takes a 2 dimensional array of data and plots its normalised peaks colouring the mesh according to the height of the peak at a given point. The bulk of the computation is performed by the underlying OpenGL code that relies heavily on the concept of vertex lists which is best explained with reference to the flowchart 4200 shown in FIG. 42.

J-Sim Workspace Graphical Interface

The workspace is used to store (both visually and in memory) a representation of the simulation being built. The drawing surface that comprises the workspace acts as both a "drop target" (a GUI component that receives objects dragged from other GUI components or other applications) and as a destination for key and mouse input events.

In order to animate modules being moved around and connectors changing shape, the whole drawing surface must be buffered.

Modules

Modules are brought into the workspace by dragging them from the tool palette. The tool palette acts as the "drag source", while the workspace acts as the "drop target". The actual sequence of input commands that comprises a "drag and drop" action is as follows:

a) Mouse button is held down with the pointer over the drag component (in this case a leaf node of the toolbox tree).

b) The pointer is moved (with the button held down).

c) When the pointer is over the drop target of choice (in this case the point on the workspace where the module is to go) the button being held down is released.

d) At the instant the previous action occurs, any data stored as the "payload" of the "drag and drop" action is transferred from the drag source to the drop target.

The actual data transferred between the "drag source" and the "drop target" is the module data, which upon being dropped onto the workspace becomes a module with the top left hand corner being drawn at the drop point. The module data consists of the name of the function the module is bound to, the number of arguments the function takes, a mapping of the origins of values for these arguments (through an input or from the properties dialog) and image data for both the toolbox and workspace representations.

Modules, depending on the function to which they are bound, can have any number of input and output ports. When a Module is created (at the drop point) the number of input and output ports is used to calculate the position in 2D space relative to the top left corner of the module. All modules are represented by a 40×40 pixel image bounded by a 40×40 pixel rectangle, which means that the position of each port is obtained by:

NumberOfInputs=1:(TopLeftXCoord,TopLeftYCoord+20)
Number OfInputs>1:TopLeftXCoord,TopLeftYCoord+5+InputNumber*30

NumberOfInputs—1 For the inputs while the output port positions are found by:NumberOfOutputs=1:(TopLeftXCoord,+40,TopLeftYCoord+20) Number OfOutputs>1: TopLeftXCoord+40,TopLeftYCoord+5+OutputNumber*30

NumberOfOutputs—1

The bounding rectangle is responsible for the bulk of the mouse interaction with modules. When a user clicks, double clicks or drags on a module it is the bounding rectangle that is used to test if the mouse event occurred within the bounds of a modules rectangle. When a user clicks on the workspace, all modules in the workspace are tested to see if the point at which the mouse was clicked intersects with any one of the modules. If it does then the module is marked as selected (denoted by an extra border around the rectangle). Pressing the "Delete" key while a module is selected causes the module to be removed from the workspace along with any connectors attached to it. Dragging the mouse (moving the mouse with the left button held down) causes the module (if any) whose bounding rectangle contains the first point of the drag motion to be the selected module and each continuing movement of the mouse causes the coordinates of the top left corner of the module to be incremented by the change in mouse position. Each change in module position causes the workspace to be repainted onto the buffer then the contents of the buffer to be swapped with the contents of the workspace causing the drag operation to animate smoothly.

Double clicking on the selected module makes the modules properties dialog visible. It is through this dialog that function parameters can be viewed or altered. The dialog box itself is generated dynamically from an XML document.

FIG. 46 shows a typical XML document that describes the layout of a properties dialog. When the module is loaded it uses the document stored within the data contained in the drag action mentioned previously. The top level XML tag is used to store the dialog dimensions and title, so upon reading this tag a dialog of the specified size is created and its title set accordingly. The top-level tag can have children of two types: components or variables. Children that are of type component represent GUI components to be added to the dialog. The tag for a component child contains an attribute stating its class name (Panel, Textbox, Label etc.) and an attribute stating its variable name. Upon reading this tag, a component of type specified by the class name attribute is created with its name denoted by the variable name attribute. Child nodes of this tag are only going to be of type "method". A node of this type contains the name of a function to be invoked on this object and its child nodes, which will all be of type "variable", contain values for the arguments of this function. Child nodes of type "variable" will contain the class name of the variable, the variable name and the actual value for it.

As an example, when traversing the XML document tree describing the dialog box it is common to find a text box added to a panel. This would be found and parsed in the following way:

1. A node of type component of the class "javax.swing.JPanel" and variable name "JPanelO1" is turned into a runtime object by invoking the constructor of this class.

2. The child nodes of this node are enumerated. All are of type "method", the first usually being representative of the "setBounds" method—a function that positions and sizes a component within its parent. The parent in this case being the dialog itself—the panel being the first (and usually the only) child.

3. A child node of type "method" with name "add" is usually present within the tree. This has only one child node of type "component" which forms its sole argument.

4. In this case the argument to "add" is a "component" node with a class attribute "javax.swing.JTextField". This will contain a mixture of "variable" and "method" child nodes, the "variable" nodes being used as arguments to the components constructor.

5. With the textbox constructed any methods contained in its child nodes can be invoked. The most likely method to be invoked is "setBounds", a node which will itself have four children representing its function arguments denoting x position, y position, width and height respectively.

6. Once all methods have been invoked on the argument to the "add" method node, the add method can be invoked on the panel using the textbox as its argument. The result being the panel having a textbox within it.

The traversing operation of the tree is carried out depth first, that is objects are initiated from the leaf nodes up so that they are not null when they are passed to their parent nodes.

The other type of node that occurs immediately under the root is the type "OctaveFunctionArgument", a node that contains information to map variables obtained from input to graphical components to the argument position of the function the module represents. This node contains four attributes: "source"—the name of the component from which it gets its data, "action"—the name of the function invoked on the component to obtain data from it, "reaction" the name of the function used to post data into the component (for setting default values etc) and "index"—the position in the functions argument list that this data takes.

Figure 43:
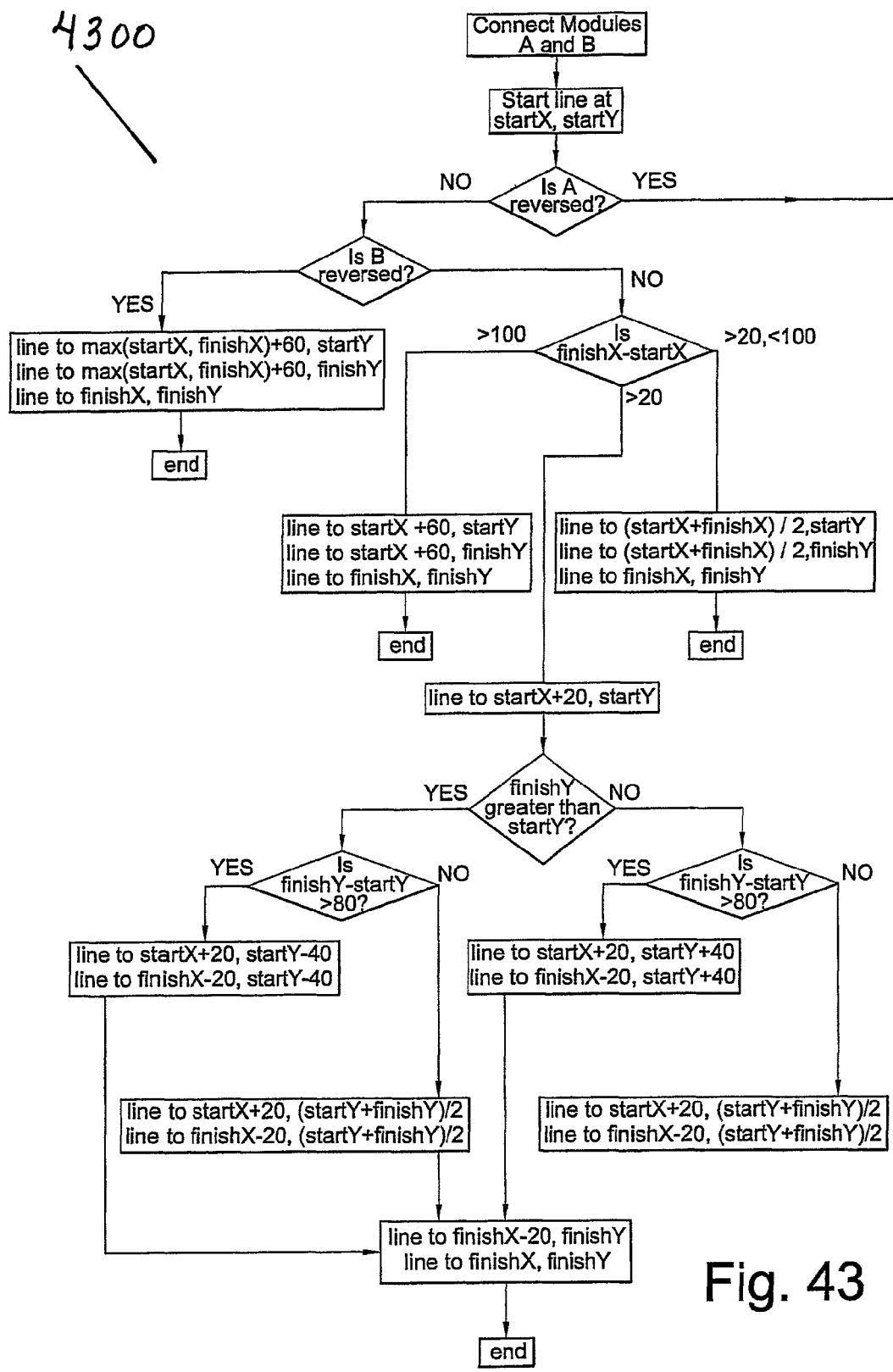
FIG. 43 is a flowchart of the steps used to connect two modules used with the J-Sim Workspace Graphical User Interface.
Figure 43:
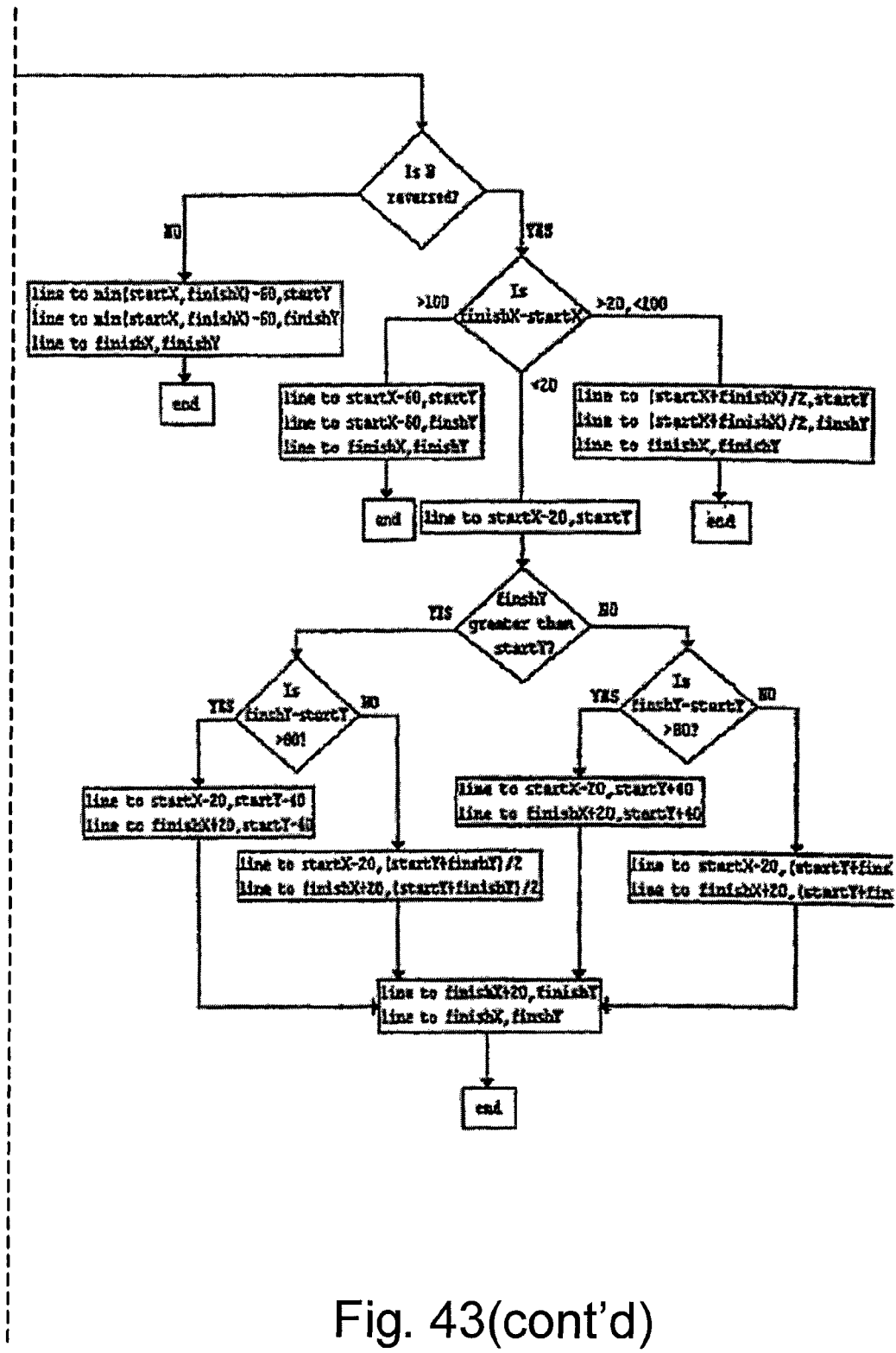

Connectors are used to join modules together sequentially to represent the flow of data between the functions/processes that the modules represent. As modules are moved, the connector joining them moves as well so that two modules are always joined by a connector made up of no more than five straight line segments. Connectors are redrawn when either one of their attached modules is dragged. The flowchart 4300 shown in FIG. 43 depicts a sequence of steps used when connecting two modules A and B.

J-Sim Plotter

Figure 44:
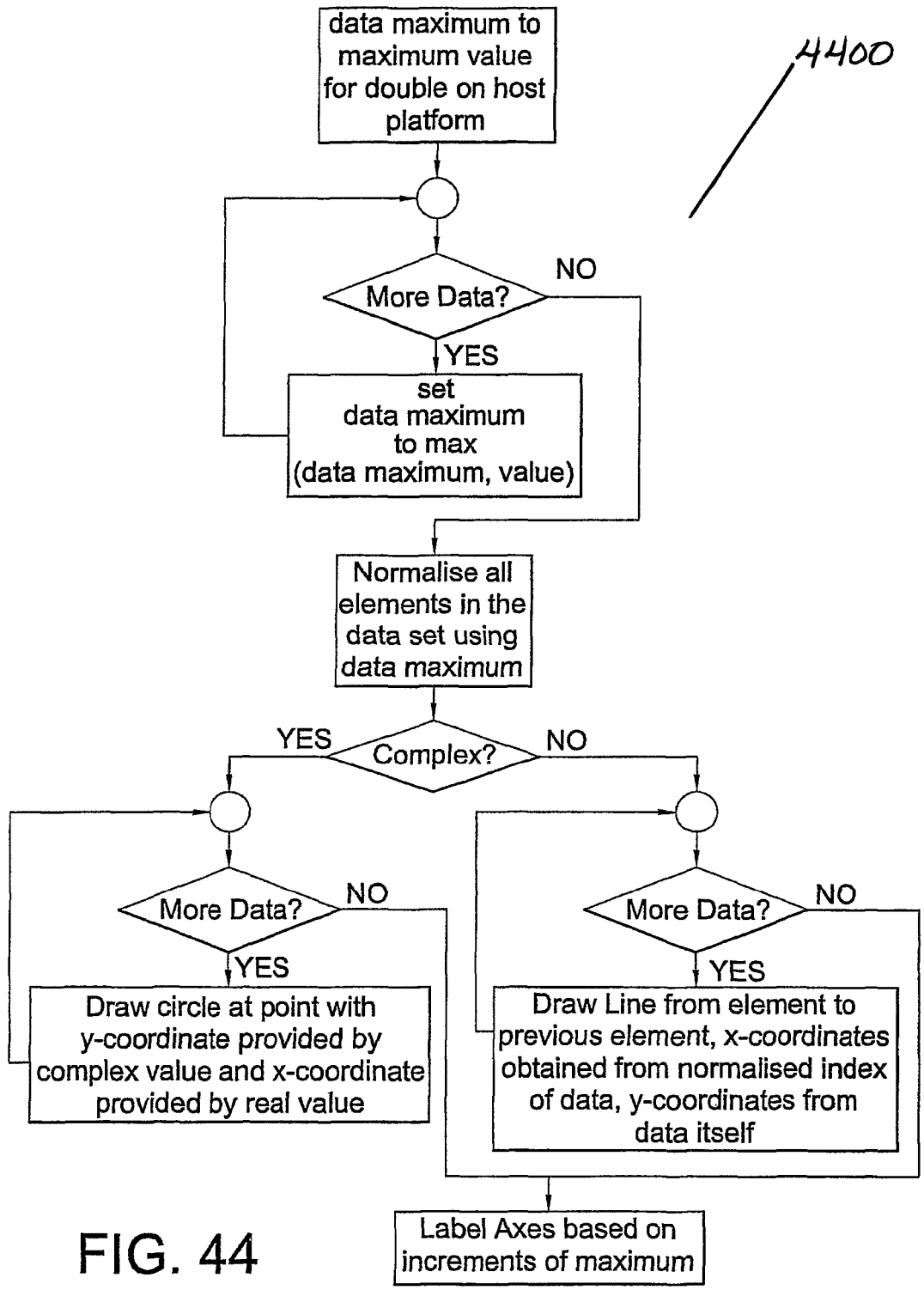
FIG. 44 is a flowchart of the steps used in the J-Sim plotter to create a display plot from incoming data.

As with the WebClass plotter J-Sim plotter also resides on the client side. However, this plotter is implemented purely in Java and receives incoming data not in pure text format but in the form of Java object representations of Matlab/Octave variables. FIG. 44 shows a flowchart 4400 of the steps used in the J-Sim plotter to create a display plot. These objects store the dimensions and contents of a particular variable along with the name to which it is referred in a simulation and whether or not it is real or complex. The plotter decides which type of plot to display upon receiving a variable determining its type. Data for both the x and y coordinates of the graph is normalised so that the graph can easily be scaled when its containing window is seized.

XY Plots

If a variable is 1-dimensional and consists of real numbers, the variable is plotted on the y-axis of an XY plot against a linear spaced x-axis. The points obtained are joined lowest to highest according to their x coordinate.

Complex Plots

If a variable is a 1-dimensional complex matrix, then its real component is plotted on the x-axis against each corresponding complex component plotted on the y-axis. The points obtained are marked with a circle.

Power Spectrogram

For 2-dimensional matrices treated with the spectrogram function, a 'waterfall' plot can be produced. An isometric view of the plot is produced with power (in dB) represented on the y-axis, frequency represented on the x-axis and time on the z-axis. In order to get the isometric view, each graph for the each time value is offset along a line 45 degrees to the origin. The distance along this line is dependent on the normalised time value. The graphs are drawn in the same way the 2-dimensional ones are, the only differences being the offset from the origin and that they are drawn from back (highest time value), to front (0) to alleviate the need for a z-buffer.

Figure 45B:
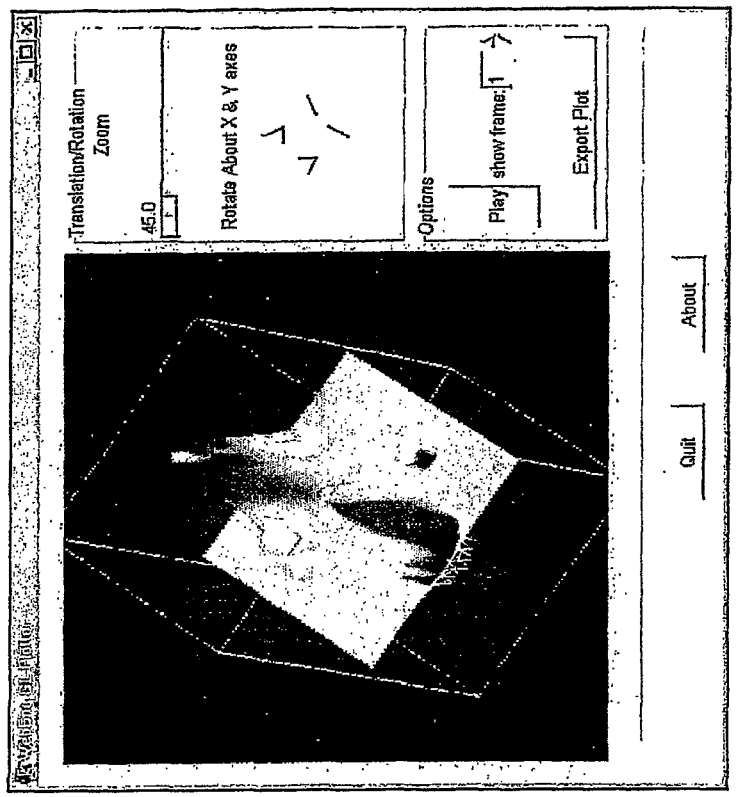
FIG. 45a,45b are output displays obtained using the WebClass and J-Sim plotting facilities.
Figure 45A:
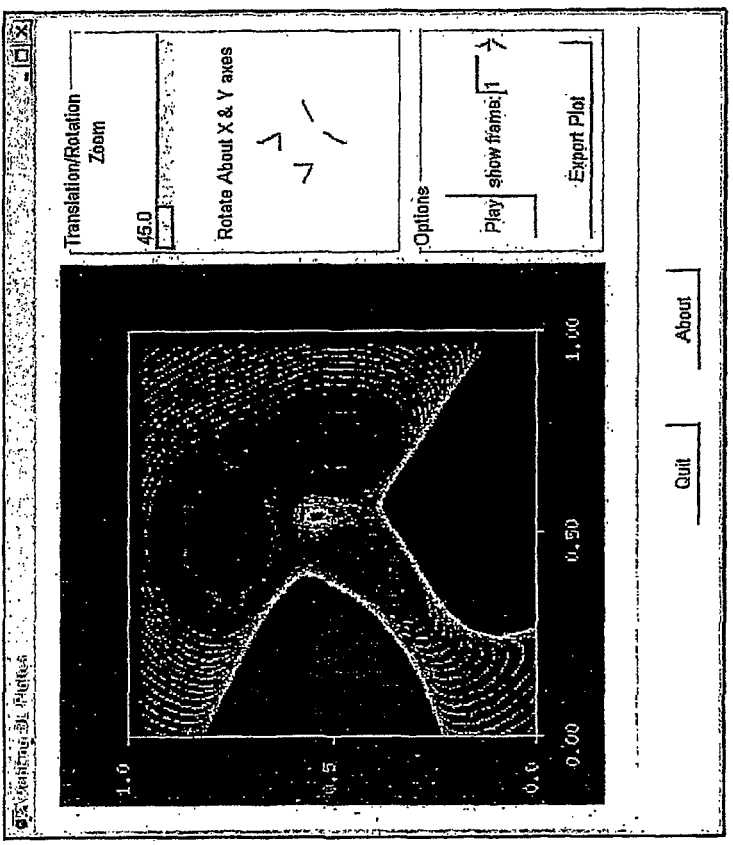
Figure 47:
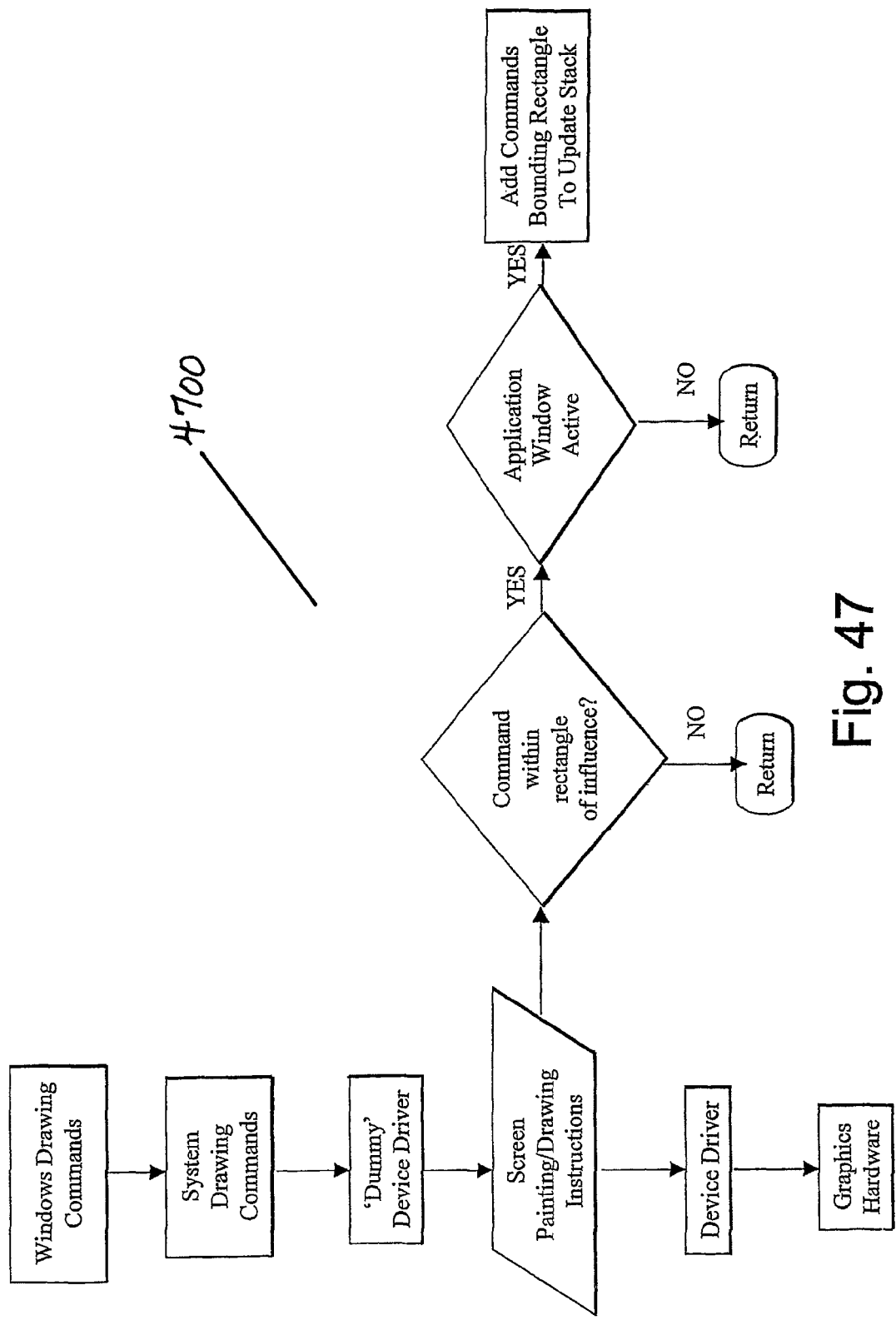
FIG. 47 is a flowchart of the steps required to capture window-redrawing commands generated by remote sharing of multicasts applications running on a server in accordance with a further embodiment of the invention.
Figure 48:
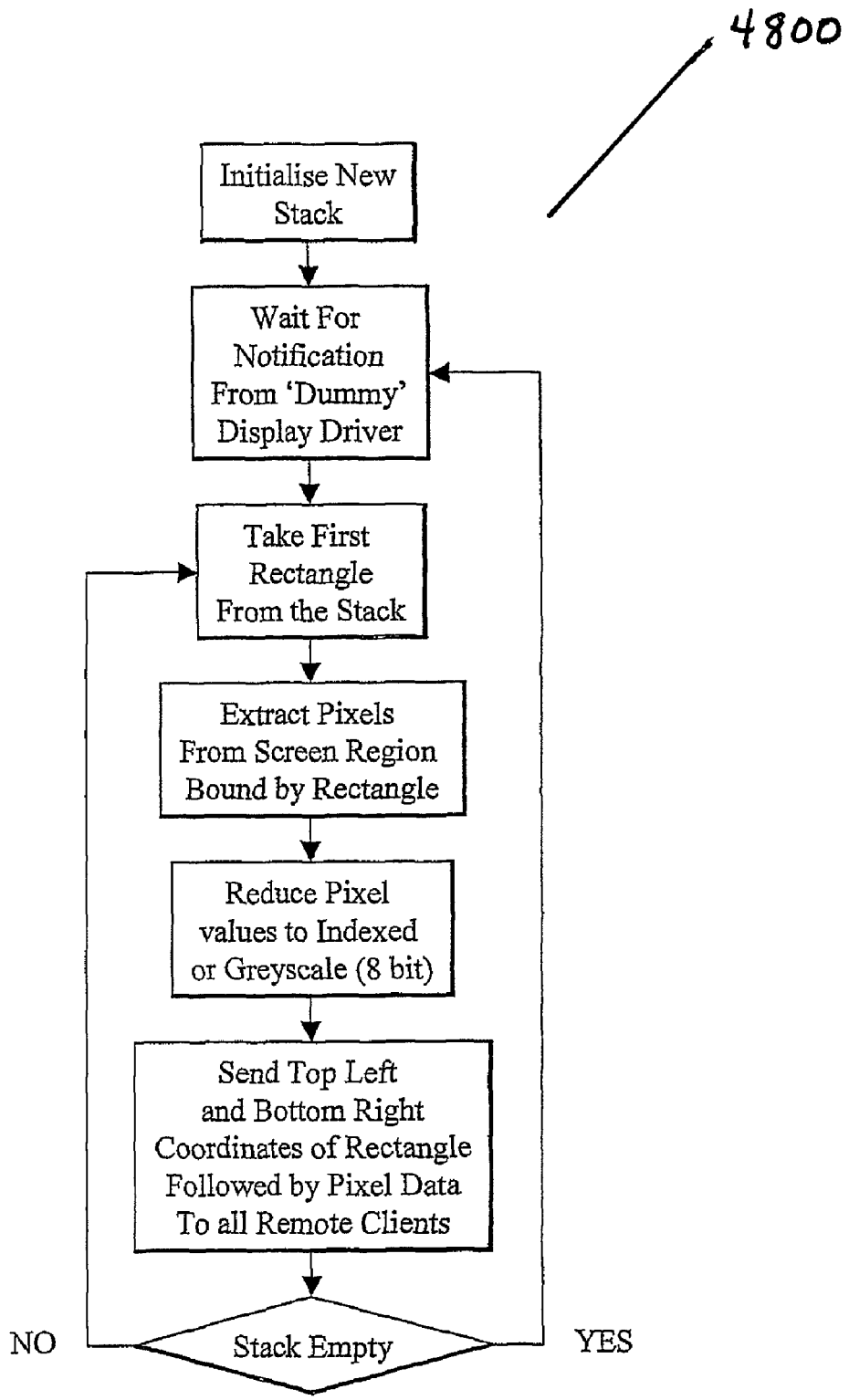
FIG. 48 is a flowchart of the procedure for sequentially processing screen updates of the stack in the stack updating initialisation window of FIG. 47.

FIGS. 45*a*,45*b* depict output displays achieved with the plotting facilities described above.

Reference is now made to FIGS. 47-63 which relate to a modification of the embodiment shown in FIGS. 1-46 which retain the features of the application server daemon, but now also runs an HTTP daemon (web server), which serves a single web page in which a client java applet is embedded. This applet contains everything that a client needs to start sharing applications immediately. This approach integrates the application and web hosting daemon services as well as all software needed by the clients to share applications immediately in one easy server-based set up process.

Clients can thus start sharing applications through their web browsers immediately, as will be later described, by simply pointing their client-based browser to the server's web page and specifying the application to be shared. All required software are then automatically transferred to the client system to enable sharing of applications. Hence no explicit installation procedure is required by the client user provided that the computer software version encompassing Java 1.1 (currently the most common version of Java) is used. The use of the latest software version encompassing Java 1.2 implies the possible use of plug-ins for some operating systems (notably Sun workstations).

One advantage of the modified system is that it is still platform independent and no prior client installation requirement is necessary. The procedures for loading, connecting and authenticating clients are the same as in the original development but client handling procedures can, in the new development, vary according to the client requirements and purpose.

In this modified embodiment inputs to the clients from the server are handled in much the same way as disclosed in the embodiment of FIGS. 1-46. The difference is that in the modified system, inputs to the clients can also be low level events (e.g. mouse, keyboard actions, etc) associated with the contents of the windows in which the shared application(s) run.

All drawings during games are handled at client level as they are received and therefore no graphical content is sent across the network. The client contains all possible graphics that need be drawn in the duration of the game. All that is sent are details of the changes.

The modification will be described with reference to two applications:

a) Remote Sharing—Multicasting of applications running on server.

Server Side

When a client connects to the server three actions are carried out:

1. Initialisation of 'Dummy' device driver

2. System message queue window event listener is instantiated

3. Updating of stack initialisation takes place

The purpose of action (1) above is to capture window-redrawing commands generated by the application being shared. This process is explained in the flowchart 4700 of FIG. 47. During this process the bounding rectangle of the main window of any shared application is passed to the 'dummy' driver when the application (to be shared) is instantiated. Instantiation of shared applications is covered in the flowchart 4900 of FIG. 49.

Figures 49, 50:
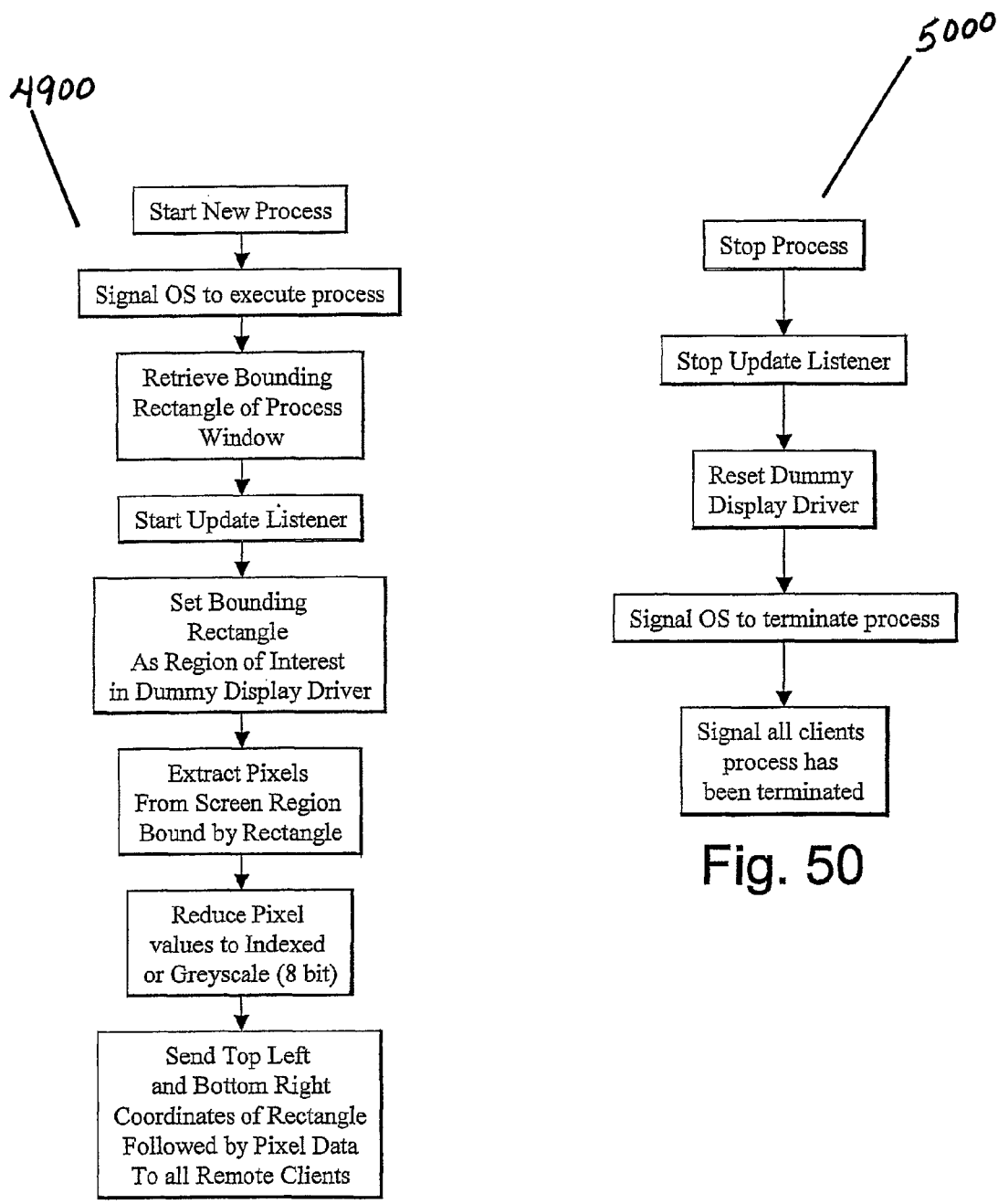
FIG. 49 is a flowchart of the instantiation of shared applications for the further embodiment.
FIG. 50 is a flowchart of the procedure for closing shared applications for the further embodiment.

The purpose of the event listener in the system message queue (action 2 above) is manifold and its operation is fully shown in the flowchart 5000 of FIG. 50. It mainly serves to capture:

1. the creation of windows associated with any shared applications (to send their bounding rectangles to the 'dummy' driver), 2. the "killing" of windows associated with shared applications (to remove the specified windows bounding rectangle from the 'dummy' driver's list of regions of interest)

3. changes in Z-order of windows (to inform the server to notify the remote clients of changes in Z-order and to ensure obscured windows are not repainted with the contents of the windows obstructing them).

Finally the purpose of the stack updating initialisation (action 3 above) is to sequentially pass updates to all connected clients in the order they have occurred. This operation is fully outlined in the flowchart 4800 in FIG. 48. These components deal with all clients attached to the system regardless of whether or not they have an active or passive user status.

Figure 51:
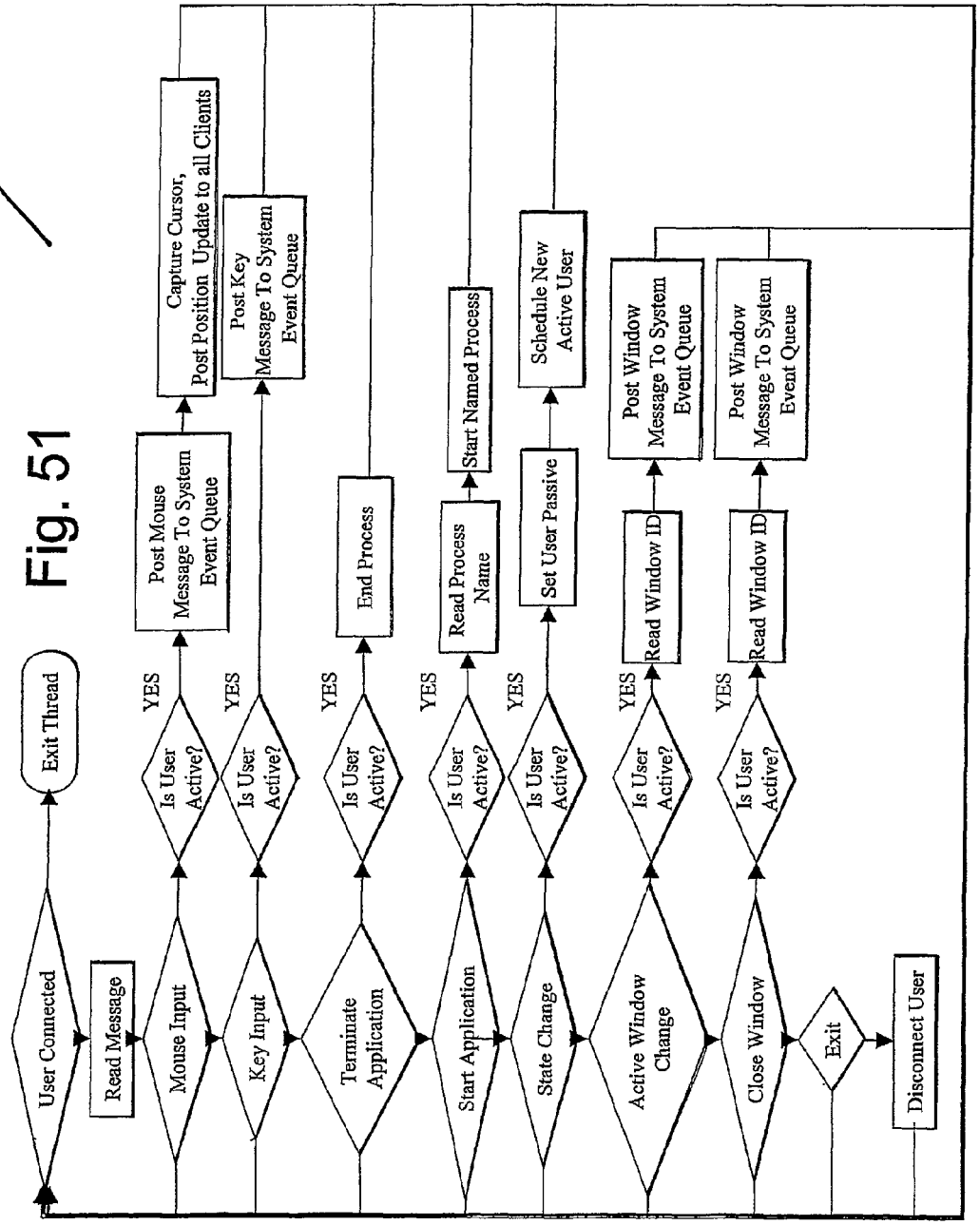
FIG. 51 is a flowchart of a chart handler procedure for each new remote connect for the embodiment shown in FIGS. 47-50.
Figure 52:
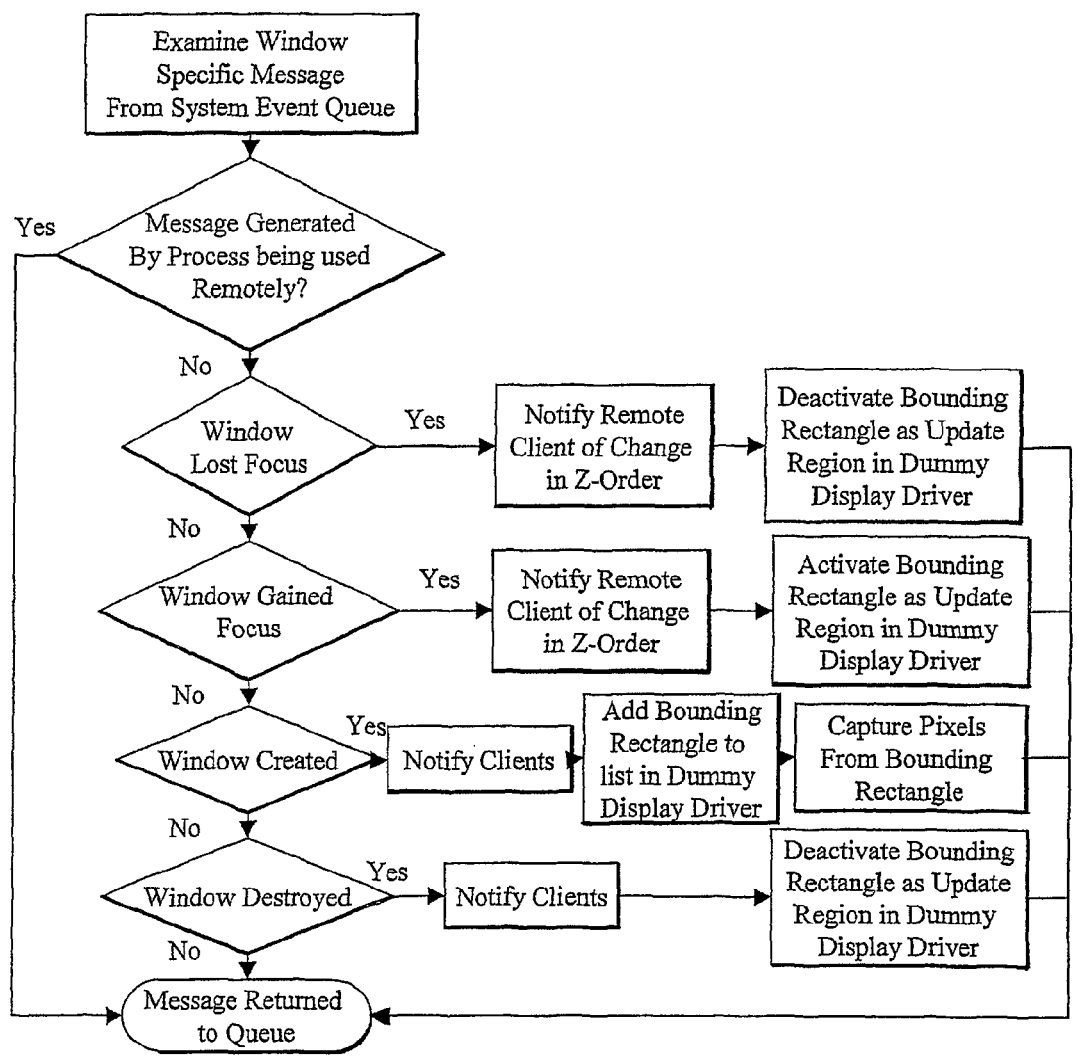
FIG. 52 is a flowchart of the event listener for monitoring window activity of a remote shared application referred to in FIG. 49 and FIG. 50.
Figure 53:
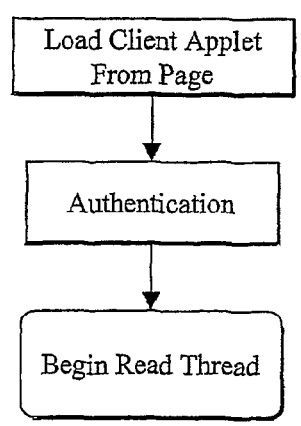
FIG. 53 is a flowchart of the steps for loading, on the client side, a page with desktop embedded from a remote server host.
Figure 54:
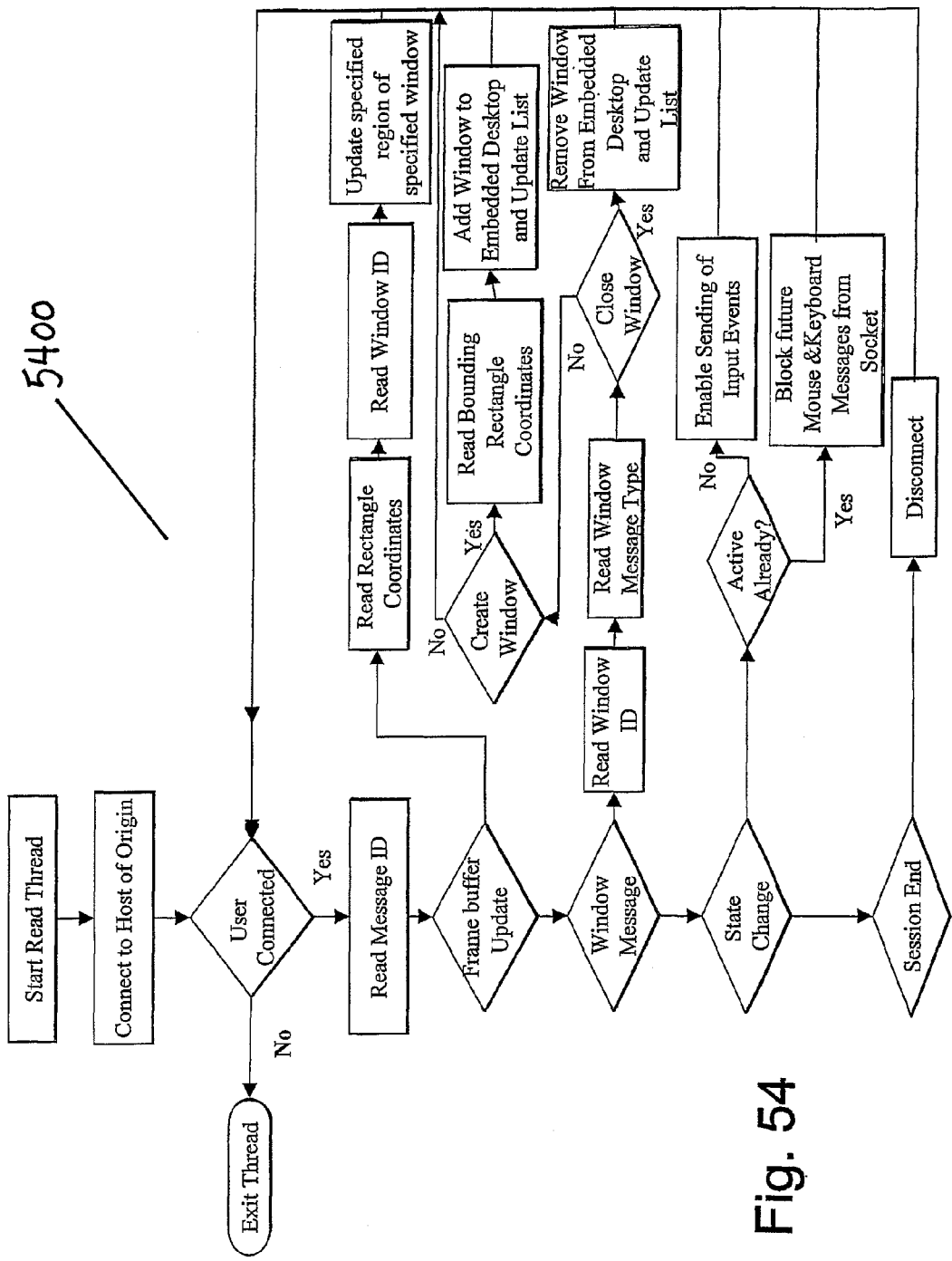
FIG. 54 is a flowchart of the steps of the client side remote application read thread.
Figure 55:
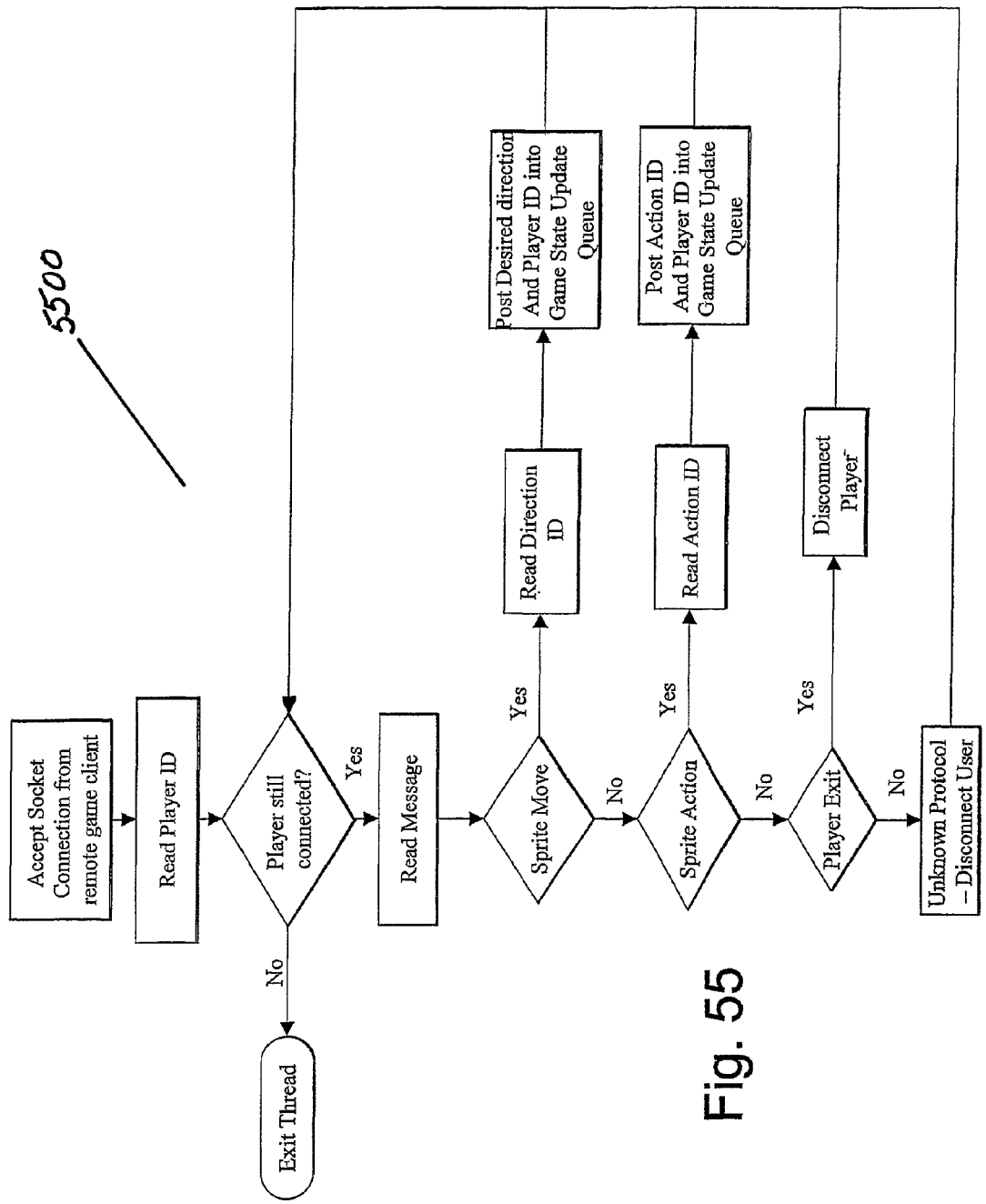
FIG. 55 is a flowchart of a game server player thread for a networked multiplayer game server where all players provide active input at all times.
Figure 56:
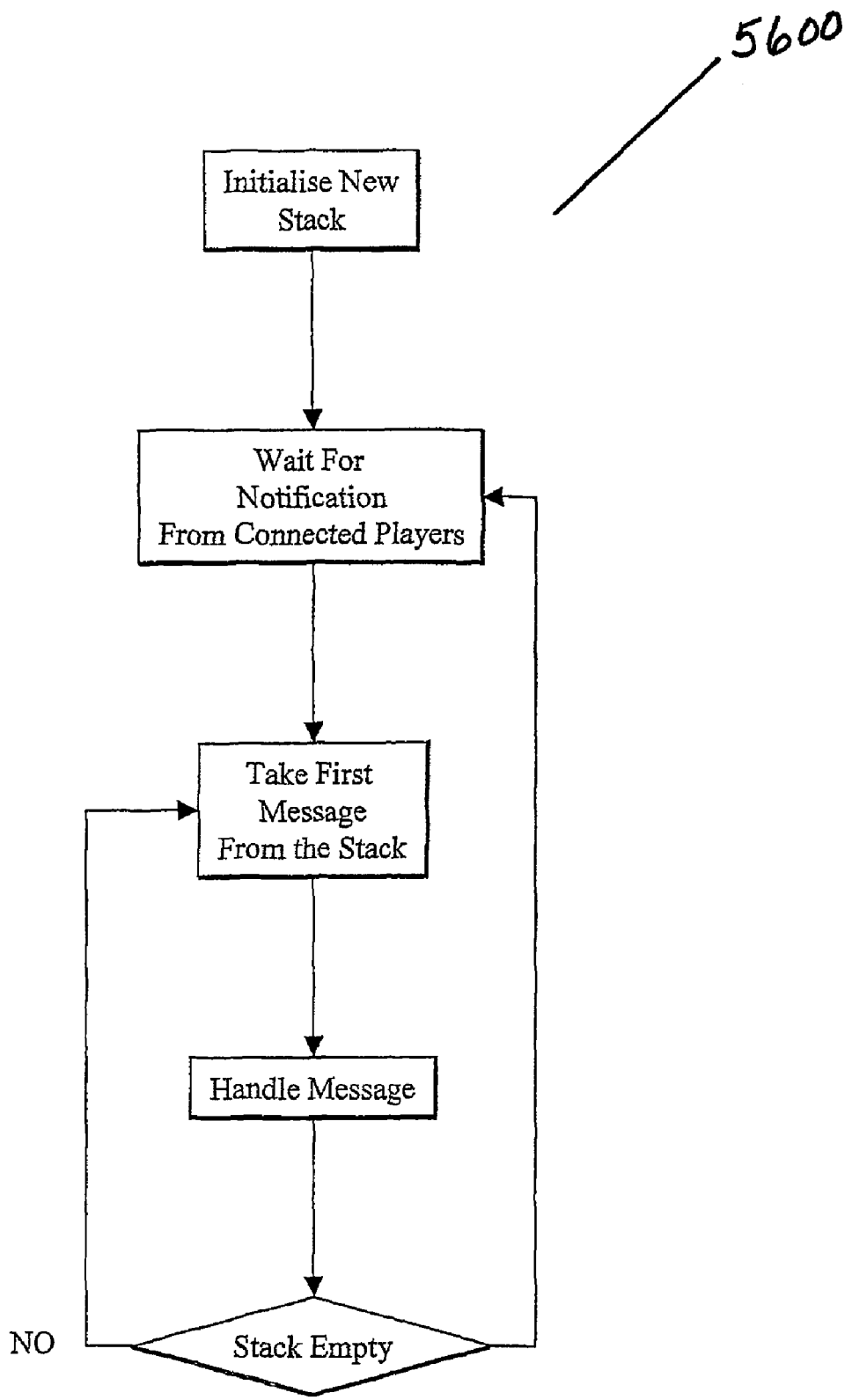
FIG. 56 is a flowchart of the game state change listener thread for the game server depicting the steps of adding players inputs to the game update stack.

Specific to each client is the client thread procedure—spawned for each new remote connection (see flowchart 5100 in FIG. 51). As with the original system, it is possible for users to switch from active to passive status at any time and vice-versa.

Client Side

The client takes the form of a desktop embedded within the web page loaded from the remote server host. After the initialisation/authentication process (outlined in the flowchart 5300 of FIG. 53) the client, if the user is an active user, displays no applications. Instead, it pops up a menu with all applications on the remote server host that are available for remote use. Upon selecting one of said applications the client sends the server the name of the application as shown in FIG. 51. If the client happens to be a passive user then a list of currently shared applications appear and the client is asked to select one to share.

All clients active or passive are constantly listening for incoming messages. Such messages include frame buffer updates and window messages, as outlined in the flowchart 5400 of FIG. 54. Window control is dictated by the active user—there is a window manager system to allow movement or changes in the Z-order or the opening or closure of windows. For this reason only the client area of application windows is required (frames, titles bars, etc are discarded).

b) Networked/Multiplayer Game Server Application

Server Details

For the purpose of this part of the development, any server-hosted game is considered as just another application. When the first remote client connects to the server and starts a game, the state of that game is initialised. The details of the game state are dictated by the game in question but typically a game state for a multiplayer game includes:

1. Player ID List (contains score, number of lives, etc.)

2. Sprite List (contains position, image to display, etc.)

3. Mapping between the above two items

Figure 57:
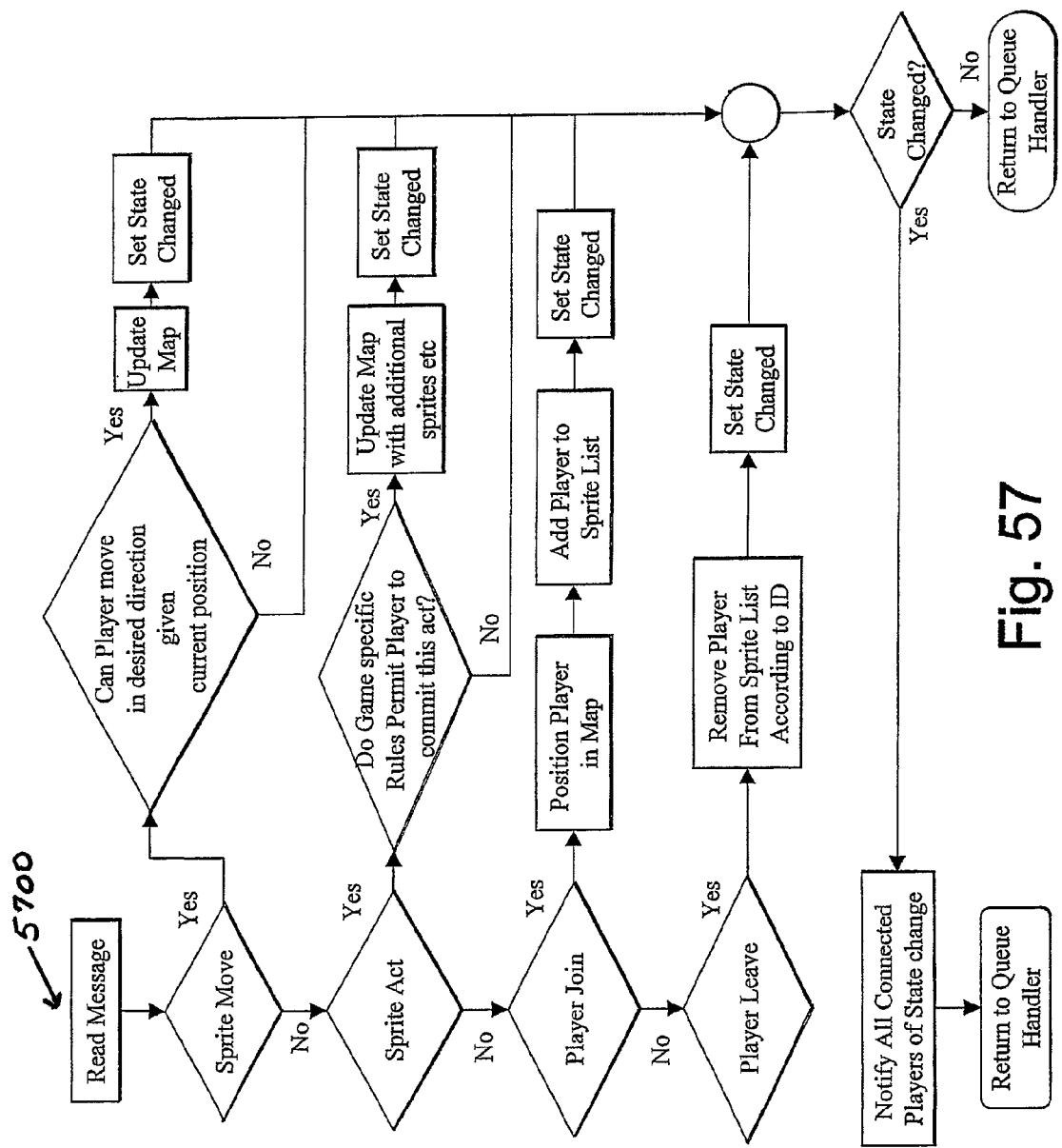
FIG. 57 is a flowchart of the game state change handler for updating all layers connected to the game server.

4. Map of the playing domain (positions of objects, terrain, etc.)

Where this approach differs from all previous discussed approaches is that all players are providing active input at all times—there is no passive state on this occasion. As before, however, each client has a client thread procedure spawned on a new thread by the server at the instance they connect. This is clearly illustrated in the flowchart 5500 of FIG. 55. As each player 'plays' the game, their inputs are added to the game state update stack. This stack is continually emptied on a separate thread and dealt with in the order they arrive. This is illustrated in the flowchart 5600 of FIG. 56. The game state update message handler 5700 takes each input as shown in FIG. 57 and decides if the game state is to be updated as a result of this action (e.g. a request to move a sprite) and then notifies all connected players if it does.

Client Details

Figure 58:
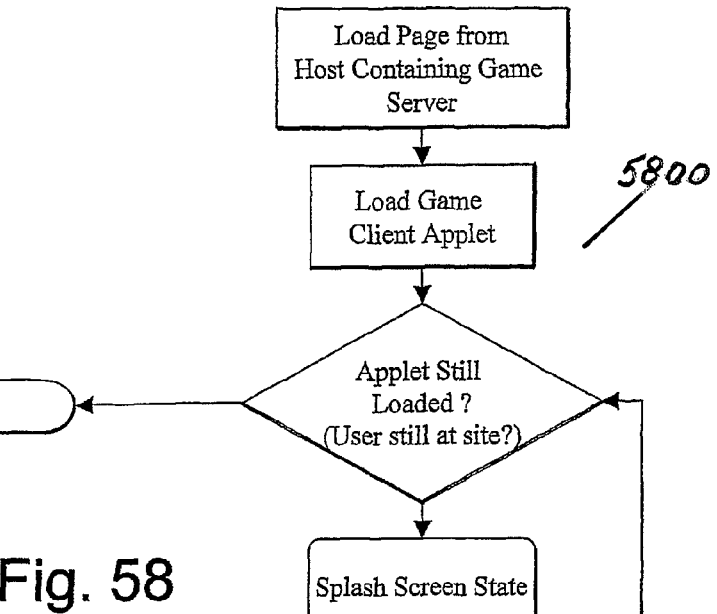
FIG. 58 depicts a flowchart of the main game networked applet thread for the client process.

The flowchart 5800 in FIG. 58 details the operation of the main application thread of game playing. The client process simply loops through this cycle continuously for the duration of its life.

Figure 59:
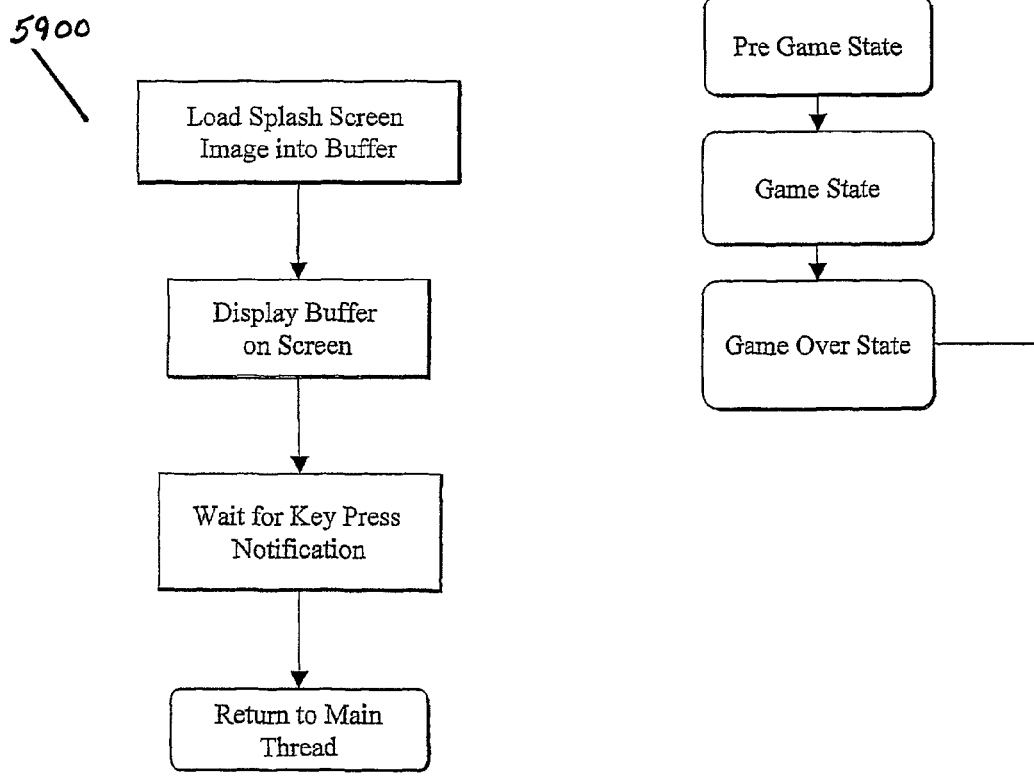
Figure 62:
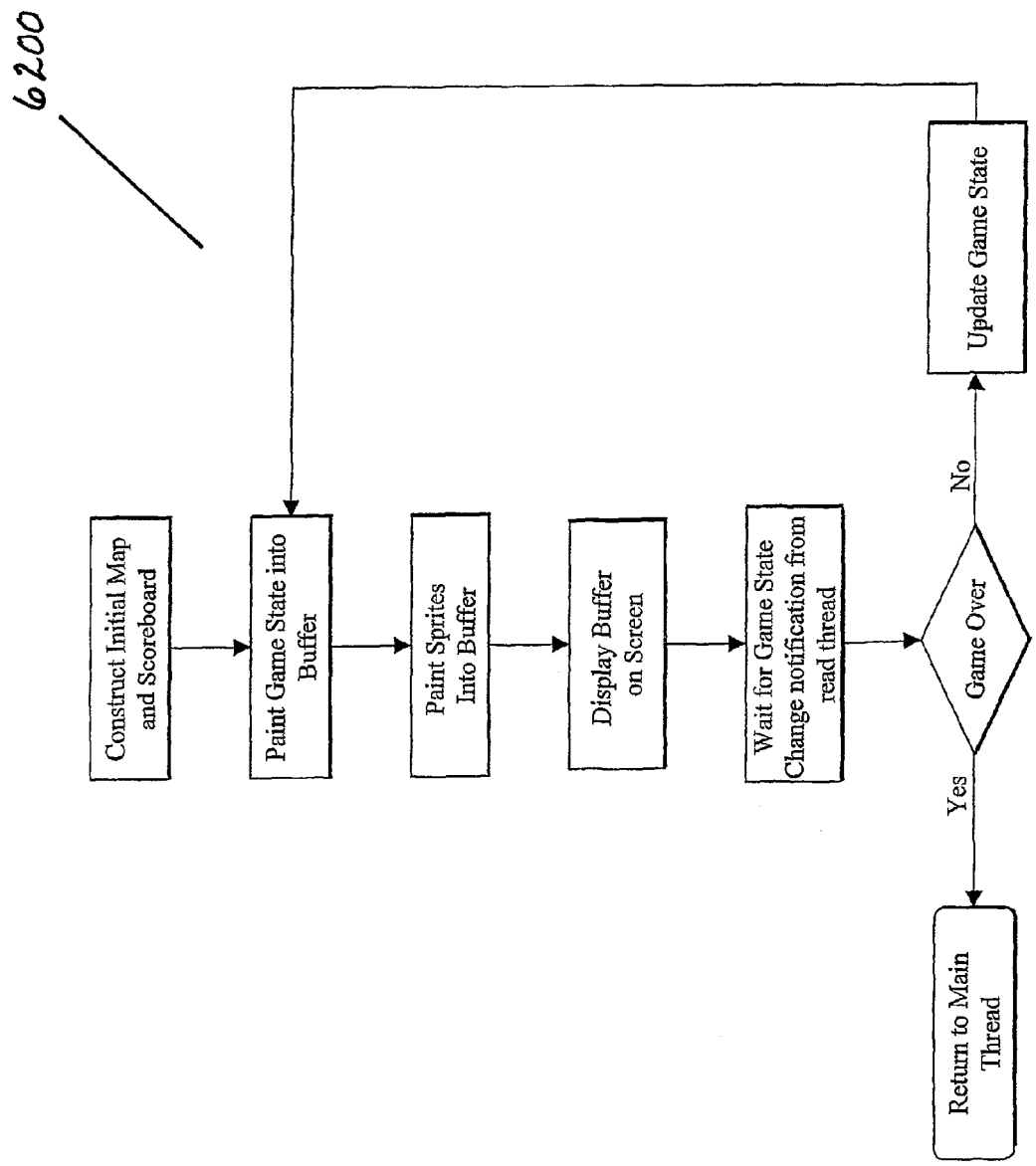
FIG. 62 depicts a flowchart of keyboard notification steps to cause advancement to the next state of the game.
Figure 63:
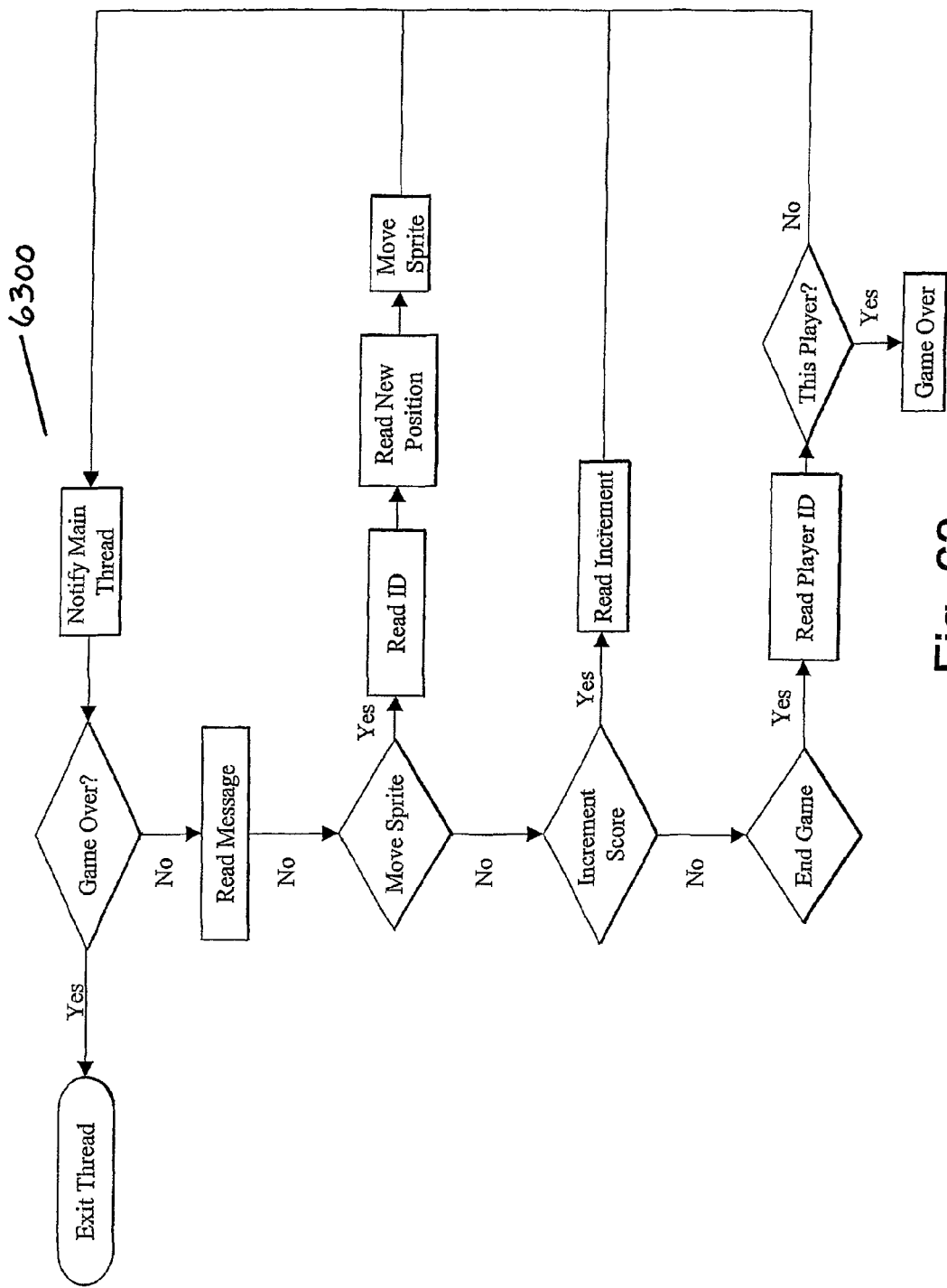
FIG. 63 is a flowchart of the update read thread, which shows the steps in updating the remote game state, which is broadcast to all clients.

Flowcharts 5900, 6000, and 6100 in FIGS. 59, 60 and 61 detail the 'static' states which only display information. The flowchart 6200 in FIG. 62 indicates keyboard notification which causes advancement to the next state of the game. The flowchart in FIG. 62 details actual game play—this is updated by the concurrent read process (shown in the flowchart 6300 of FIG. 63) as the remote game state is updated and sends the corresponding messages to all clients. During game procedure the cycle shown in the flowchart in FIG. 63 is followed until the game ends. In this case the system returns to the main thread shown in FIG. 58 to start another game or disconnect from the server altogether.

Various modifications may be made to embodiments described without departing from the scope of the invention. For example, the latest versions of the computer program are written in Java 1.2 or later and C++—other versions of the computer program also exist in earlier Java versions. For best results browsers should be Java 1.2 (or later versions) enabled, but browsers with earlier versions of Java enablement may also be used either with the corresponding computer program version or with suitable plug ins. In addition, the system, disclosed with reference to FIGS. 1 to 63, can be used to share all kinds of software not just Matlab and Octave, for example graphics processing software, such as Autocad, 3DMax, MatrixX, Mathematica and LabView and text processing software such as Word for Windows, and WordPerfect.

Also the system described with reference to FIGS. 47 to 63 can be used with a plurality of active user machines or a mixture of active and passive user machines. There needs to be at least two user machines, one being an active user machine and the other being an active or a passive user machine. The system of FIGS. 47-63 can be used for game playing, co-designing and education as well.

The embodiments of the invention have a number of technical advantages over the prior art. Active and passive user machines can be mixed freely and this allows more flexibility for sharing users. The low bandwidth cost enables faster operation on low capacity networks thus allowing the system to be used with a broadband network or with a low capacity network, e.g. a 56k line, for game playing or co-design, resulting in flexibility of use and installation into existing networks. An arbitrarily large number of users are allowed to share any computer application in real-time (through multicasting) and to take turns in controlling the software.

The system is browser-based which provides a familiar and simple user interface and is totally platform independent. This enables users to share software even on non-homogeneous client-server networks.

The software permits selection of applications to be shared and allows users to enter multiple sharing sessions (i.e. a user can share several different applications with several other users simultaneously).

The development permits cross-sharing of applications between two or more users at the same time. For example a user can make available for sharing a software application (e.g. Word for Windows) and another user can make available for sharing another application (e.g. PowerPoint). Both these applications can coexist in all sharing users screens and interactive activity on both these software can be observed by all users in real-time. Normal conditions of permitting control of these applications by other users apply as described above Surrendering control of applications to other users does not impede normal computer activity such as also surrendering control of hardware (e.g. keyboard input and mouse), which can be used in all other windows apart from the window of the application which has been taken over by another user.

Also for the embodiment shown in FIGS. 1-63 the software is platform independent and for the embodiment shown in FIGS. 47-63 no explicit prior client installation is needed; linking is made via a web browser which permits all software to be transferred automatically to a client linking in to allow immediate sharing of software. This minimises the local memory requirement of each client machine. In this embodiment low level events, mouse, keyboard actions may also be transferred from the server to the client which are associated with the window contents in which the shared applications run. The embodiment of FIGS. 47-63 allows a large number of users to share software and allows all users to be simultaneously active (i.e. it allows all or some of the users to provide input to the software simultaneously) as in game playing or co-working. As previously described, no explicit graphic information need usually be transmitted during game playing. However, when transmission of graphics is essential, such transmission is minimised by transmitting only the required localised changes to effect the graphic update. This requires less data transfer and allows the use of lower capacity networks such as 56k modem lines. If required the information transfer can be improved by using known compression techniques and algorithms.

The invention claimed is:

1. A system for sharing software comprising:
    a server, including a processor, having or allowing access to at least one computer program to be shared by at least two user machines, all of the user machines having a Java enabled browser program;
    computer readable code for identifying at least one of the user machines as an active user machine;
    computer readable code, executed by the processor of the server, for allowing a connection between each user machine to be opened for presenting one or more sharable programs to each user through the browser at each user machine and allowing the or each active user to interact with the sharable program in substantially real-time;
    computer readable code, executed by the processor of the server, for listening for and receiving, at the server, signals from a user browser interface indicative of active user interactions with a shared program that is at the server or accessible via the server, and
    computer readable, executed by the processor of the server, for using the signals indicative of active user interactions to generate window screen redrawing commands comprising pixel data, and for broadcasting the pixel data for each interaction by an active user to all user machines in substantially real time, so that any screen changes are presented substantially simultaneously to the active user and all other users, wherein the pixel data is broadcast in response to receipt of the signals indicative of the active user interactions.

2. The system according to claim 1 wherein there are at least two active user machines and interactions from the active users are acted on sequentially as and when they are received at the server so that all the active user machines appear to be interacting substantially simultaneously.

3. The system according to claim 1 wherein the sharable program is a computer game or computer product.

4. The system according to claim 1 wherein active and passive user machines are permitted to assume and relinquish control of the computer program in response to user inputs.

5. The system according to claim 1 wherein the computer readable code is written in Java 1.2 or a later version or C++.

6. The system claimed according to claim 1 wherein the computer readable code comprises a client application embedded within a web page for allowing a user machine to access the one or more sharable programs.

7. The system according to claim 6 wherein the client application is located at each user machine and contains graphics software for drawing images, for example in the course of a computer game.

8. The system according to claim 7 that is operable to send to the client application details of localized changes to cause a graphics up-date.

9. The system according to claim 1 further including the server comprising code for allowing a user machine to share one or more applications with one or more users and substantially simultaneously with this to share one or more other applications with one or more different users on entirely different sharing sessions.

10. The system according to claim 1 wherein the software sharing system is operable or configured to transmit input information such as low level system events, such as keyboard events or mouse events, to the user machine.

11. The system according to claim 1 wherein the software sharing system is operable or configured to transmit input information such as intermediate level system events, such as window state events comprising creation, minimization, sizing, moving, destruction, to the user machine.

12. The system according to claim 1 wherein surrendering control of an application to one or more other users does not impede normal computer activity.

13. A method for sharing software in a system that has a server having or allowing access to at least one computer program to be shared by at least two user machines, all of the user machines having a Java enabled browser program, the method comprising:
    identifying at least one of the user machines as an active user machine;
    allowing a connection between each user machine to be opened;
    allowing the or each active user to interact with the sharable program in substantially real-time;
    listening for and receiving, at a processor of the server, signals from a browser interface indicative of active user interactions with a shared program that is at the server or accessible via the server for using the signals indicative of active user interactions to generate window screen redrawing commands comprising pixel data; and
    broadcasting the pixel data for each interaction by an active user to all user machines in substantially real time, so that any screen changes are presented substantially simultaneously to the active user and all other users, wherein the pixel data is broadcast in response to receipt of the pixel data from the active user's screen signals indicative of active user interactions.

14. The method according to claim 13 further comprising acting on interactions from a plurality of active users sequentially as and when they are received at the server so that all the active user machines appear to be interacting substantially simultaneously.

15. The method according to claim 13 further comprising permitting active and passive user machines to assume and relinquish control of the computer program in response to user inputs.

16. The method according to claim 13 further comprising downloading a client application embedded within a web page to a user machine, the client application being operable to allow access to the one or more sharable programs.

17. The method according to claim 16 wherein the client application is located at each user machine and contains graphics software for drawing images, for example in the course of a computer game.

18. The method according to claim 17 further comprising sending to the client application on each user machine details of localized changes to cause a graphics up-date.

19. The method according to claim 13 comprising allowing a user machine to share one or more applications with one or more users and substantially simultaneously with this to share one or more other applications with one or more different users on entirely different sharing sessions.

20. The method according to claim 13 further comprising transmitting input information such as low level system events, such as keyboard events or mouse events, to each user machine.

21. The method according to claim 13 further comprising transmitting input information such as intermediate level system events, such as window state events including creation, minimization, sizing, moving, destruction, to the user machine.

22. A computer program product for allowing computer software to be shared in a system that has a server having or allowing access to at least one computer program to be shared by at least two user machines, all of the user machines having a Java enabled browser program, the computer program product comprising a non-transitory computer-readable storage medium having code or instructions stored therein, the code or instructions being for:
  identifying at least one of the user machines as an active user machine;
  allowing a connection between each user machine to be opened;
  allowing the or each active user to interact with the sharable program in substantially real-time;
  listening for and receiving signals from a browser interface indicative of active user interactions with a shared program that is at the server or accessible via the server for using the signals indicative of active user interactions to generate window screen redrawing commands comprising pixel data; and
  broadcasting the pixel data for each interaction by an active user to all user machines in substantially real time, so that any screen changes are presented substantially simultaneously to the active user and all other users, wherein the pixel data is broadcast in response to receipt of the pixel data from the active user's screen signals indicative of active user interactions.

* * * * *

UNITED STATES PATENT AND TRADEMARK OFFICE
CERTIFICATE OF CORRECTION

PATENT NO. : 7,761,506 B2  
APPLICATION NO. : 10/483703  
DATED : July 20, 2010  
INVENTOR(S) : Petropoulakis et al.

Page 1 of 1

It is certified that error appears in the above-identified patent and that said Letters Patent is hereby corrected as shown below:

Column 39,
Line 53, "computer readable" should read --computer readable code--.

Signed and Sealed this
First Day of March, 2011

David J. Kappos
*Director of the United States Patent and Trademark Office*